US012426128B2

(12) United States Patent
Takeda et al.

(10) Patent No.: US 12,426,128 B2
(45) Date of Patent: Sep. 23, 2025

(54) CROSS-CARRIER SCHEDULING TECHNIQUES FOR MULTIPLE DISCONTINUOUS RECEPTION GROUPS

(71) Applicant: QUALCOMM Incorporated, San Diego, CA (US)

(72) Inventors: Kazuki Takeda, Minato-ku (JP); Heechoon Lee, San Diego, CA (US); Jae Ho Ryu, San Diego, CA (US); Changhwan Park, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 18/351,778

(22) Filed: Jul. 13, 2023

(65) Prior Publication Data

US 2024/0114589 A1    Apr. 4, 2024

Related U.S. Application Data

(60) Provisional application No. 63/412,287, filed on Sep. 30, 2022.

(51) Int. Cl.
*H04W 76/28* (2018.01)
*H04W 72/12* (2023.01)
*H04W 72/20* (2023.01)

(52) U.S. Cl.
CPC ....... *H04W 76/28* (2018.02); *H04W 72/1221* (2013.01); *H04W 72/20* (2023.01)

(58) Field of Classification Search
CPC ........... H04W 72/1221; H04W 74/004; H04W 74/002; H04W 72/20; H04W 80/00; H04W 76/28
See application file for complete search history.

(56) References Cited

U.S. PATENT DOCUMENTS

| | | | |
|---|---|---|---|
| 2011/0044261 A1* | 2/2011 | Cai | H04L 5/0091 370/329 |
| 2020/0275375 A1* | 8/2020 | Liu | H04W 52/0216 |
| 2021/0105857 A1* | 4/2021 | He | H04W 76/28 |
| 2021/0298114 A1* | 9/2021 | Nam | H04W 72/23 |
| 2022/0086752 A1* | 3/2022 | Cui | H04W 8/24 |
| 2022/0394734 A1* | 12/2022 | MolavianJazi | H04W 72/0446 |

* cited by examiner

*Primary Examiner* — Kamran Afshar
(74) *Attorney, Agent, or Firm* — Holland & Hart LLP

(57) ABSTRACT

Methods, systems, and devices for wireless communications are described, in which a communication device (e.g., a user equipment (UE), a network entity) may perform carrier aggregation, and cross-carrier scheduling provides that a first carrier may provide scheduling information for one or more other carriers, in which the one or more other carriers may have different discontinuous reception (DRX) configurations than the first carrier. One or more DRX-related timers of different DRX groups may be started or restarted based on a control information reception on the first carrier, or on a different carrier of a different DRX group. Additionally, or alternatively, control information transmissions on the first carrier may be provided based on one or more DRX-related timers that are associated with the first carrier, or that are associated with a carrier of another DRX group than the DRX group of the first carrier, or any combinations thereof.

30 Claims, 29 Drawing Sheets

CROSS-CARRIER SCHEDULING TECHNIQUES FOR MULTIPLE DISCONTINUOUS RECEPTION GROUPS

CROSS REFERENCE

The present Application for Patent claims the benefit of U.S. Provisional Patent Application No. 63/412,287 by TAKEDA et al., entitled "CROSS-CARRIER SCHEDULING TECHNIQUES FOR MULTIPLE DISCONTINUOUS RECEPTION GROUPS," filed Sep. 30, 2022, assigned to the assignee hereof, and expressly incorporated by reference herein.

FIELD OF TECHNOLOGY

The following relates to wireless communications, including cross-carrier scheduling techniques for multiple discontinuous reception groups.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities, each supporting wireless communication for communication devices, which may be known as user equipment (UE). Some wireless communications systems may support carrier aggregation, in which multiple carriers may be combined into a single data channel to increase the data capacity of a communications network. Efficient techniques for carrier aggregation operations may help to enhance network throughput and efficiency.

SUMMARY

The described techniques relate to improved methods, systems, devices, and apparatuses that support cross-carrier scheduling techniques for multiple discontinuous reception groups. For example, the described techniques provide for a communication device (e.g., a user equipment (UE), a network entity) to perform carrier aggregation in which cross-carrier scheduling provides that a first carrier may provide scheduling information for one or more other carriers, in which the one or more other carriers may have different discontinuous reception (DRX) configurations. In some cases, one or more DRX-related timers of different DRX groups may be adjusted (e.g., started or restarted) based on a control information reception on the first carrier, or on a different carrier of a different DRX group. Additionally, or alternatively, control information transmissions on the first carrier may be transmitted, and monitored, based on one or more DRX-related timers of a DRX group associated with the first carrier, based on one or more DRX-related timers of a different DRX group than the DRX group of the first carrier, or any combinations thereof.

DETAILED DESCRIPTION

Figure 1:
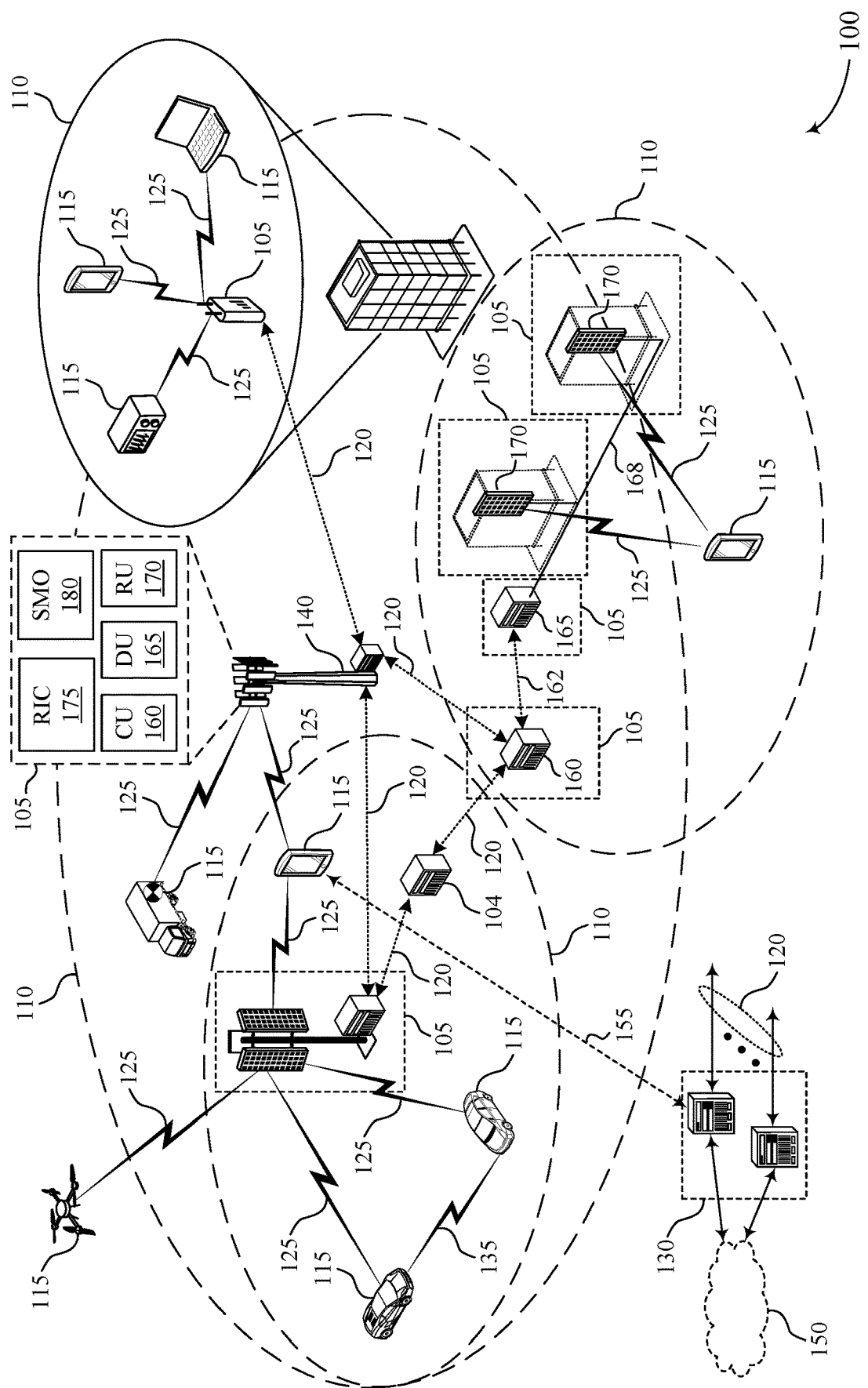
FIG. 1 illustrates an example of a wireless communications system that supports cross-carrier scheduling techniques for multiple discontinuous reception (DRX) groups in accordance with one or more aspects of the present disclosure.

In some wireless communications systems, to reduce latency and improve communications throughput, a user equipment (UE) and one or more network entities may perform carrier aggregation, in which two or more component carriers (CCs) may be configured to provide for concurrent communications. Further, in some wireless communications systems, a discontinuous reception (DRX) procedure may be implemented in which network devices (e.g., UEs, network entities) may maintain various receive and/or transmit (Rx/Tx) components (e.g., power amplifiers, low noise amplifiers, filters, phase shifters, analog-to-digital converters, and the like) in an on or active state during DRX active times (e.g., based on one or more of a configured DRX on-duration timer, DRX inactivity timer, DRX retransmission timer, DRX feedback timer, or any combinations thereof), and may power down or inactivate some of all of such Rx/Tx components outside of DRX active times. Such DRX techniques may reduce power consumption of network devices.

In some cases, different carriers in carrier aggregation may be configured in different DRX groups. Further, carriers in different DRX groups may be configured in different frequency bands (e.g., in frequency range one (FR1) frequencies(410 MHz to 7.125 GHz), frequency range two (FR2) frequencies (24.25 GHz to 52.6 GHz), frequency range four (FR4) frequencies (52.6 GHz to 71 GHz)), with different subcarrier spacing (SCS), or both. These different DRX groups may have multiple timers that result in associated DRX active times that are independent of each other. In cases where cross-carrier scheduling is implemented, scheduling information transmitted via a first carrier in a first DRX group may provide resource allocations for a second carrier in a second DRX group.

However, some existing DRX procedures provide that scheduling information is provided for carriers in a group during DRX active times, and cross-carrier scheduling for different DRX groups may result in ambiguity. For example, a UE may detect of control information (e.g., physical downlink control channel (PDCCH) information) in a scheduling cell of a DRX group (e.g., a first carrier that carries scheduling information for the first carrier and one or more other carriers that may be in different DRX groups). The detection of such control information on the scheduling cell may affect one or more DRX timers (e.g., a DRX inactivity timer, which is started upon a PDCCH reception and a DRX active time is maintained while the timer is unexpired) of the DRX group of the scheduling cell, but timer adjustments of the other DRX group may also be beneficial. Further, DRX timer adjustments of the scheduling cell may be beneficial in cases where the DRX group for the scheduling cell is in a DRX active time but the other DRX group is outside of a DRX active time. Likewise, DRX timer adjustment for the scheduling cell may be beneficial when the DRX group of the scheduling cell is outside of the DRX active time but the other DRX group is in a DRX active time.

In accordance with various aspects, DRX timers and DRX monitoring for multiple carriers in different DRX groups may be based on a DRX state of one or more of the DRX groups. In some cases, a scheduling cell, which may be an example of a first cell or first carrier, may be associated with a first DRX group, and one or more other cells or carriers may be associated with one or more other DRX groups. In some cases, the one or more other cells or carriers of the one or more other DRX groups may also carry scheduling information for a carrier of the other DRX group. In accordance with some aspects discussed herein, a control information (e.g., PDCCH) reception on a serving cell in the other DRX group (e.g., carrier in a second DRX group) may start or restart DRX-related timers for the other DRX group, and DRX-related timers of the first DRX group are not affected by the other DRX group. For example, a PDCCH on the scheduling cell in the first DRX group does not start or restart DRX-related timers for the second DRX group, and a PDCCH on a serving cell of the second DRX group may not start or restart DRX-related timers of the first DRX group. In other aspects, a control information reception for a carrier in the second DRX group may start or restart DRX-related timers for the second DRX group, such as a PDCCH on the scheduling cell in the first DRX group that may start or restart the DRX-related timers of the second DRX group.

Additionally, or alternatively, a control information transmission (e.g., a PDCCH transmission) for cross-carrier scheduling on a cell in the first DRX group may not be monitored, or not be required to be monitored, by a UE for a carrier in another DRX group that is outside a DRX active time. For example, PDCCH monitoring for cross-carrier scheduling from a cell in the first DRX group to a cell in the second DRX group may be based on the DRX active time of the second DRX group. In other cases, a UE may monitor for control information on a carrier in the first DRX group for cross-carrier scheduling to cell in the second DRX group that is outside the DRX active time of the second DRX group. For example, PDCCH monitoring for cross-carrier scheduling from a cell in the first DRX group to a cell in the second DRX group is based on the DRX active time of the first DRX group.

Additionally, or alternatively, in cases where a scheduling cell of a first DRX group is outside of a DRX active time but a second DRX group is in a DRX active time, a control information transmission (e.g., a PDCCH transmission) for cross-carrier scheduling on the scheduling cell in the first DRX group may not be monitored, or may not be required to be monitored, by a UE for a carrier in the second DRX group. For example, PDCCH monitoring for cross-carrier scheduling from the scheduling cell in the first DRX group to a different carrier in the second DRX group is based on the DRX active time of the first DRX group. Additionally, or alternatively, the UE may monitor for a control information transmission on the scheduling cell in the first DRX group for cross-carrier scheduling to the carrier in the second DRX group outside the DRX active time of the first DRX group. For example, PDCCH monitoring for cross-carrier scheduling from the scheduling cell in the first DRX group to the carrier in the second DRX group may be based on the DRX active time of the second DRX group.

In some cases, a network entity may configure a UE with DRX timer and DRX monitoring parameters for different carriers in different DRX groups for cross-carrier scheduling. For example, configuration information may be provided in one or more system information blocks, via radio resource control (RRC) signaling, via a medium access control (MAC) control element (CE), or any combinations thereof, that indicates DRX-related timer functions based on DRX states of carriers in different DRX groups, and/or that indicates DRX monitoring based on DRX-related timers of one or more DRX groups.

Such techniques may allow for efficient cross-carrier scheduling for different component carriers that may be configured in different DRX groups. Further, such techniques may allow for DRX-related timers and monitoring for control information for different carriers that may be located in different frequency bands. Such techniques may provide for enhanced network efficiency through scheduling of multiple carriers via a scheduling carrier that may be located in a different frequency band and in a different DRX group than one or more scheduled carriers. Further, such techniques may provide for reduced power consumption, such as through reduced DRX active times on one or more carriers in a higher frequency band (e.g., one or more FR2 carriers) that consume relatively higher power than a carrier on a lower frequency band (e.g., a scheduling carrier on FR1).

Aspects of the disclosure are initially described in the context of wireless communications systems. Aspects of the disclosure are further illustrated by and described with reference to DRX groups for different carriers in carrier aggregation, apparatus diagrams, system diagrams, and flowcharts that relate to cross-carrier scheduling techniques for multiple DRX groups.

FIG. 1 illustrates an example of a wireless communications system 100 that supports cross-carrier scheduling techniques for multiple DRX groups in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support cross-carrier scheduling techniques for multiple DRX groups as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $\Delta_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or multiple aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, a UE 115 or network entity 105 may communicate using carrier aggregation with cross-carrier scheduling, in which a first carrier may provide scheduling information for one or more other carriers. Further, the one or more other carriers may have different DRX configurations (e.g., be in different DRX groups). In some cases, one or more DRX-related timers of different DRX groups may be adjusted (e.g., started or restarted) based on a control information reception on the first carrier, or on a different carrier of a different DRX group. Additionally, or alternatively, control information transmissions on the first carrier may be transmitted, and monitored, based on one or more DRX-related timers of a DRX group associated with the first carrier, based on one or more DRX-related timers of a different DRX group than the DRX group of the first carrier, or any combinations thereof.

Figure 2:
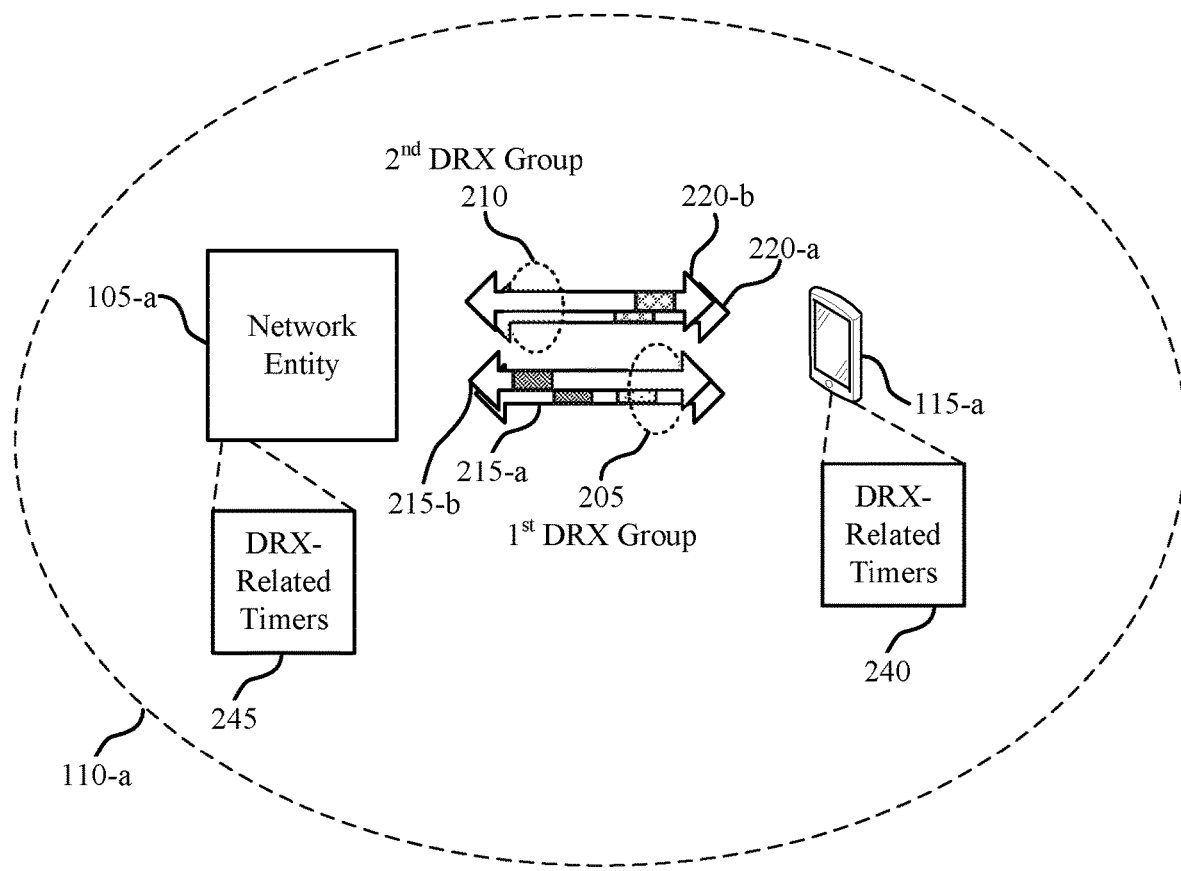
FIG. 2 illustrates an example of a wireless communications system that supports cross-carrier scheduling techniques for multiple DRX groups in accordance with one or more aspects of the present disclosure.
Figure 2:
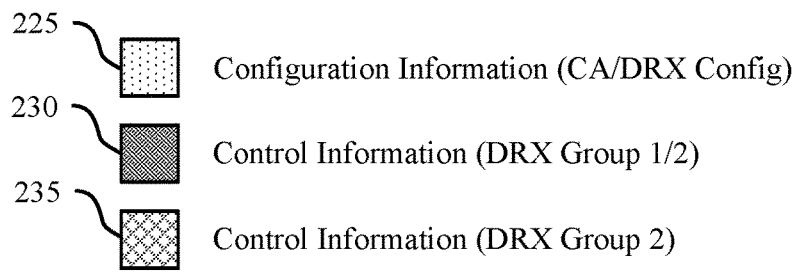

FIG. 2 illustrates an example of a wireless communications system 200 that supports cross-carrier scheduling techniques for multiple DRX groups in accordance with one or more aspects of the present disclosure. In some examples, the wireless communications system 200 may implement or be implemented by one or more aspects of the wireless communications system 100. For example, the wireless communications system 200 may include a UE 115-*a*, which may be an example of a UE 115 described with reference to FIG. 1. The wireless communications system 200 may also include a network entity 105-*a*, which may be an example of one or more network entities 105 (e.g., a CU, a DU, an RU, a base station, an IAB node, or one or more other network nodes) as described with reference to FIG. 1. The network entity 105-*a* and the UE 115-*a* may communicate within a coverage area 110-*a*, which may each be an example of a coverage area 110 as described with reference to FIG. 1. The wireless communications system 200 may include features for improved communications between the network entity 105-*a* and the UE 115-*a* through cross-carrier scheduling of carriers in multiple DRX groups, among other benefits.

In some examples, to increase the data capacity of the network, the wireless communications system 200 may support carrier aggregation, in which multiple carriers (e.g., component carriers) may be used for concurrent communications (e.g., combined into a single data channel). Further, to reduce power consumption, multiple DRX configurations may be provided in which different carriers may be associated with different DRX groups. For example, the UE 115-*a* may be configured with a first DRX group 205 and a second DRX group 210. In the example of FIG. 2, the first DRX group 205 may have multiple component carriers 215 including a first component carrier 215-*a* and a second component carrier 205-*b*, and the second DRX group 210 may have multiple component carriers including a third component carrier 220-*a* and a fourth component carrier 220-*b*. The component carriers 215, 220 may be uplink carriers, downlink carriers, or provide both uplink and downlink. In some examples, the first component carrier 215-*a* and second component carrier 215-*b* of the first DRX group 205 may operate in a first frequency band (e.g., FR1) and have a first SCS (e.g., 30 kHz), and the third component carrier 220-*a* and fourth component carrier 220-*b* of the second DRX group 210 may operate in a second frequency band (e.g., FR2) and have a second SCS (e.g., 120 kHz). In some examples, carrier aggregation deployments may improve user experience and system efficiency by increasing data capacity of the network, and increased power consumption associated with carrier aggregation may be mitigated through the use of DRX.

For example, operations performed by the network (e.g., a cellular network) and UE 115-*a*, such as concurrent uplink and/or downlink communications via multiple carriers, may consume relatively large amounts of energy, and may lead to relatively high costs for the network and reduced battery life for battery-powered devices. As such, DRX-based techniques as discussed herein may reduce power consumption (e.g., provide network energy savings and enhanced battery life) and may be desirable. Further, techniques discussed herein may provide enhanced flexibility for a network to provide different DRX configurations for different frequency ranges (e.g., a DRX configuration with a reduced DRX active time at higher frequency ranges (e.g. FR2) may provide for enhanced power reduction while allowing scheduling flexibility for carriers with such DRX configurations.

In some cases, a carrier aggregation and DRX configuration may be provided to the UE 115-*a* in configuration information 225 (e.g., provided via the first carrier 215-*a* of the first DRX group 205, although the configuration may be provided, or changed, by another carrier). The configuration information 225 may be provided, for example, via RRC signaling, via a MAC-CE, via other shared or control channel communications, or any combinations thereof. Each DRX configuration may provide one or more timers or offset values that impact DRX active time. As discussed herein, if a DRX group 205, 210, is in DRX active time, the UE 115-*a* is to monitor for control information on serving cells within the DRX group, such as control information 230 that may provide scheduling information for the first DRX group 205 or cross-carrier scheduling for the second DRX group 210, and control information 235 that may provide scheduling information for one or more carriers in the second DRX group 210. The DRX active time may be based on one or more timers, such as DRX-related timers 240 at the UE 115-*a* and DRX-related timers 245 at the network entity. Such timers may include, for example, a DRX on-duration timer, a DRX inactivity timer, one or more feedback timers (e.g., for HARQ feedback, such as a drx-HARQ-RTT-TimerDL, drx-RetransmissionTimerDL, drx-HARQ-RTT-TimerUL, and/or drx-RetransmissionTimerUL), or any combinations thereof.

In some cases, the first DRX group 205 and the second DRX group 210 may have separate configurations for one or more timers (e.g., the DRX groups each include independently configured on-duration timers and inactivity timers), and may have common configurations for one or more parameters such as a slot offset associated with a start of an on-duration, a retransmission timer, a round trip timer, and the like. In some deployments, common configurations for different DRX groups may be provided for parameters: drx-SlotOffset, drx-RetransmissionTimerDL, drx-RetransmissionTimerUL, drx-LongCycleStartOffset, drx-ShortCycle, drx-ShortCycleTimer, drx-HARQ-RTT-TimerDL, drx-HARQ-RTT-TimerUL, uplinkHARQ-Mode, of any combinations thereof.

In some cases, the first DRX group 205 may include carriers 215 in FR1, and the second DRX group 210 may include carriers 220 in FR2, and the UE 115-*a* may be configured with cross-carrier scheduling from a FR1 cell (e.g., first carrier 215-*a*) in the first DRX group 205 to a FR2 cell (e.g., third carrier 220-*a*) in the second DRX group 210. While cross-carrier scheduling from the first carrier 215-*a* to the third carrier 220-*a* is discussed for various examples, such an example is for purposes of discussion and illustration, and numerous other examples may provide cross-carrier scheduling of different carriers (e.g., from an FR2 cell in the second DRX group 210 to a FR1 cell in the first DRX group 205). Various techniques as discussed herein provide for establishing and adjusting (e.g., starting or restarting) various timers based on PDCCH detection in a scheduling cell of a DRX group that affects DRX-related timers for the other DRX group for the scheduled cell. Additionally, or alternatively, techniques may provide for UE 115-*a* monitoring of control information (e.g., PDCCH) in a scheduling cell of a DRX group if the DRX group for the scheduling cell is in a DRX active time with the other DRX group for the scheduled cell outside of a DRX active time. Additionally, or alternatively, techniques may provide for UE 115-*a* monitoring of control information (e.g., PDCCH) in the scheduling cell of a DRX group if the DRX group for the scheduling cell is outside of the DRX active time but the other DRX group for the scheduled cell is in the DRX active time. Various of examples of timer management and control information monitoring are discussed with reference to FIGS. 3 through 8.

In other cases, in the event of cross-carrier scheduling from a serving cell in the first DRX group 205 to another serving cell in the second DRX group 210, the UE 115-*a* may monitor for control information 230 on the serving cell in the first DRX group 205 for cross-carrier scheduling to the serving cell in the second DRX group 210 only when both DRX groups are in DRX active time (e.g., if either of DRX group is not in DRX active time, the UE 115-*a* may not monitor for a PDCCH with cross-carrier scheduling). In still other cases, cross-carrier scheduling may only be provided if a scheduling cell and scheduled cell are in a same DRX group.

Figure 3:
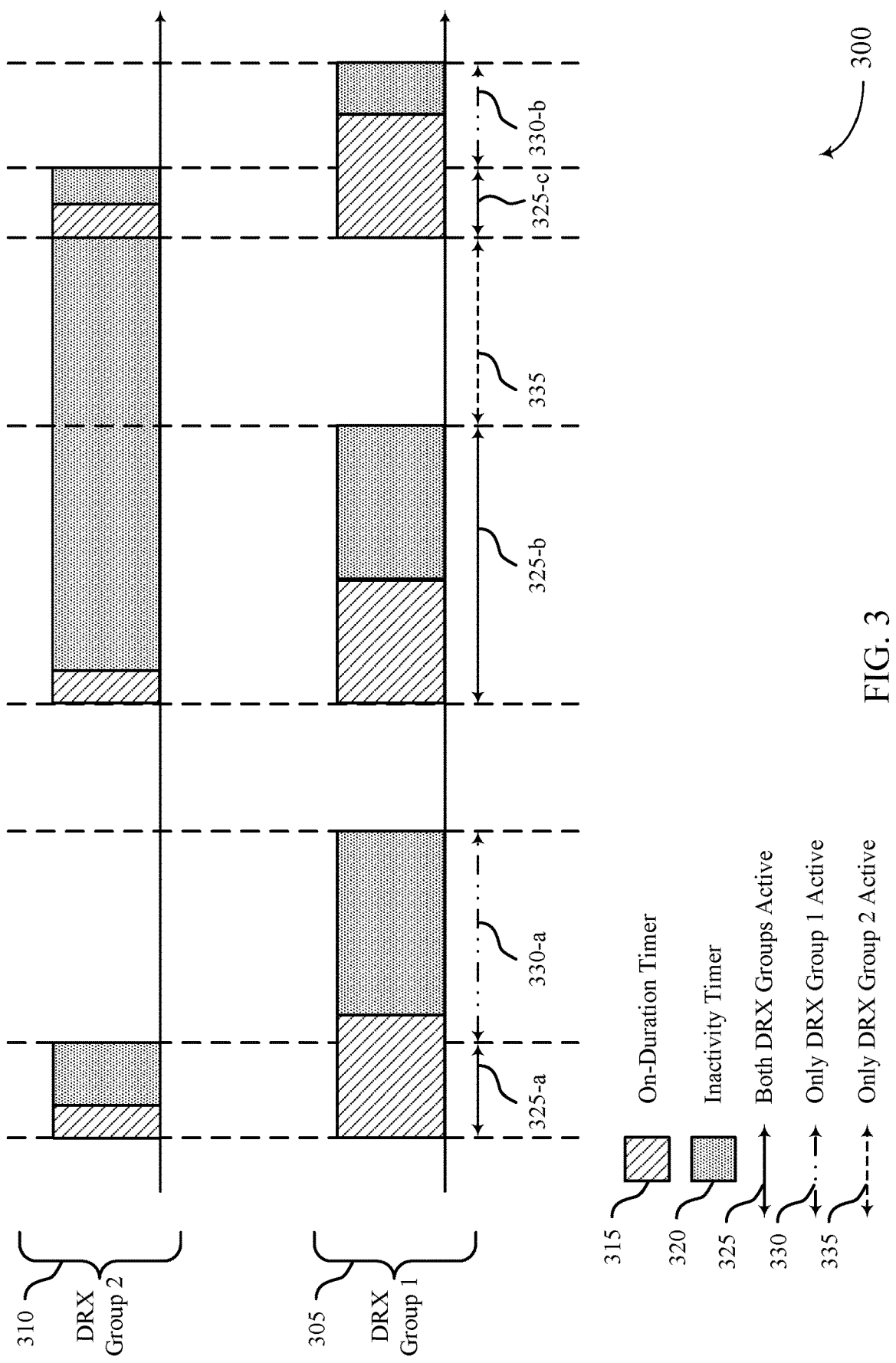
FIG. 3 illustrates an example of DRX configurations and timing that support cross-carrier scheduling techniques for multiple DRX groups in accordance with one or more aspects of the present disclosure.

FIG. 3 illustrates an example of DRX configurations and timing 300 that supports cross-carrier scheduling techniques for multiple DRX groups in accordance with one or more aspects of the present disclosure. In some examples, the DRX configurations and timing 300 may implement or be implemented by one or more aspects of the wireless communications system 100 or the wireless communications system 200. For example, the DRX configurations and timing 300 may be implemented by a UE 115 or a network entity 105, which may be examples of the corresponding devices as described with reference to FIGS. 1 and 2. In the example of FIG. 3, the network entity 105 may be an example of a CU, a DU, an RU, a base station, an IAB node, or one or more other network nodes as described with reference to FIG. 1.

In this example, a first DRX group 305 may include one or more carriers and may use a first DRX configuration, and a second DRX group 310 may include one or more carriers and may use a second DRX configuration. Each of the first DRX group 305 and second DRX group 310 may have an on-duration timer 315, and an inactivity timer 320, the duration of which may be configured separately for each group. Further, a carrier in the first DRX group 305 may provide scheduling information for a carrier in the second DRX group 310. In the example of FIG. 3, the different DRX groups 305 and 310 may have time periods 325 in which both the first DRX group 305 and second DRX group 310 are active (e.g., first time period 325-a, second time period 325-b, and third time period 325-c), time periods 330 in which only the first DRX group 305 is active (e.g., fourth time period 330-a and fifth time period 330-b), and a time period 335 in which only the second DRX group 310 is active (e.g., sixth time period 335). Various aspects as discussed herein provide for UE monitoring of control information on a scheduling cell that may provide cross-carrier scheduling of other cells in a same DRX group or different DRX groups.

Figure 4:
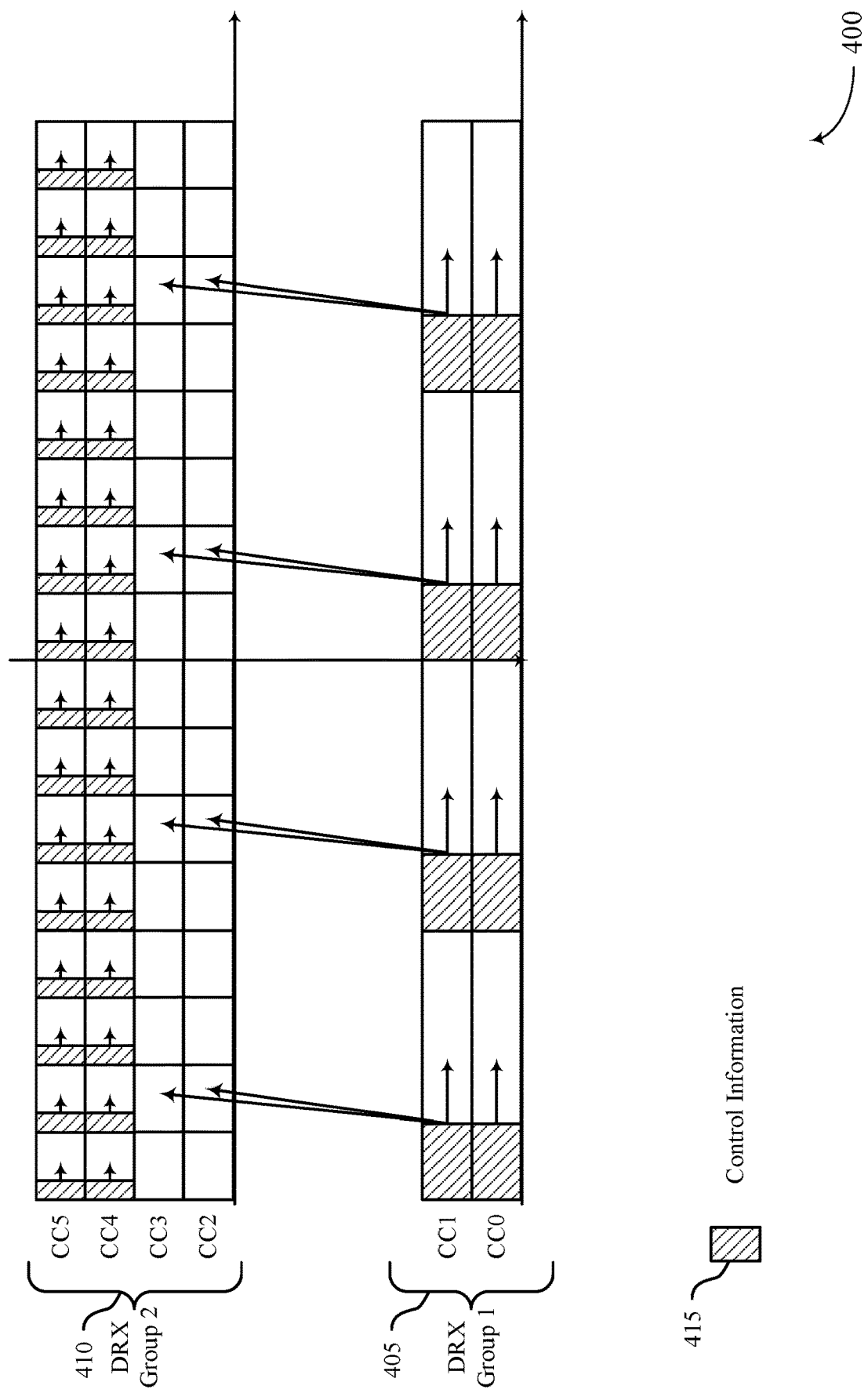
FIG. 4 illustrates an example of a cross-carrier scheduling for different component carriers in accordance with one or more aspects of the present disclosure.

FIG. 4 illustrates an example of cross-carrier scheduling 400 for different component carriers in accordance with one or more aspects of the present disclosure. In some examples, the cross-carrier scheduling 400 may implement or be implemented by one or more aspects of the wireless communications system 100 or the wireless communications system 200. For example, the cross-carrier scheduling 400 may be implemented by a UE 115 or a network entity 105, which may be examples of the corresponding devices as described with reference to FIGS. 1 and 2. In the example of FIG. 4, the network entity 105 may be an example of a CU, a DU, an RU, a base station, an IAB node, or one or more other network nodes as described with reference to FIG. 1.

In this example, a first DRX group 405 may contain two component carriers, CC0 and CC1, and a second DRX group 410 may contain four component carriers, CC2, CC3, CC4, and CC5. Cross-carrier scheduling may be provided from the second component carrier CC1 to the third component carrier CC2 and the fourth component carrier CC3, in this example, as indicated by arrows from control information 415 to the component carriers. Thus, in this example, within the first DRX group 405, the first component carrier CC0 may carry control information 415 that provides scheduling information for the first component carrier CC0, and the second component carrier CC1 may carry control information 415 that provide scheduling information for the second component carrier CC1, the third component carrier CC2, and the fourth component carrier CC3. Further, in this example, within the second DRX group 410, the fifth component carrier CC4 may carry control information 415 that provides scheduling information for the fifth component carrier CC4, and the sixth component carrier CC5 may carry control information 415 that provides scheduling information for the sixth component carrier CC5.

A UE may monitor for the control information for the different component carriers, for example, by performing blind decoding one or more configured PDCCH candidates (e.g., a group of consecutive control channel elements (CCEs) that are allocated to a PDCCH) for control information that is scrambled with an identifier associated with the UE and the carrier (e.g., a radio network temporary identifier (RNTI) assigned to the UE for each configured cell or carrier). Upon detection of control information, the UE may decode the control information to obtain scheduling information, such as a resource allocation for communications via the associated carrier. As discussed herein, if the UE detects a PDCCH for a cell, it may start or restart one or more DRX-related timers (e.g., a DRX inactivity timer) in accordance with techniques discussed herein.

Figure 5A:
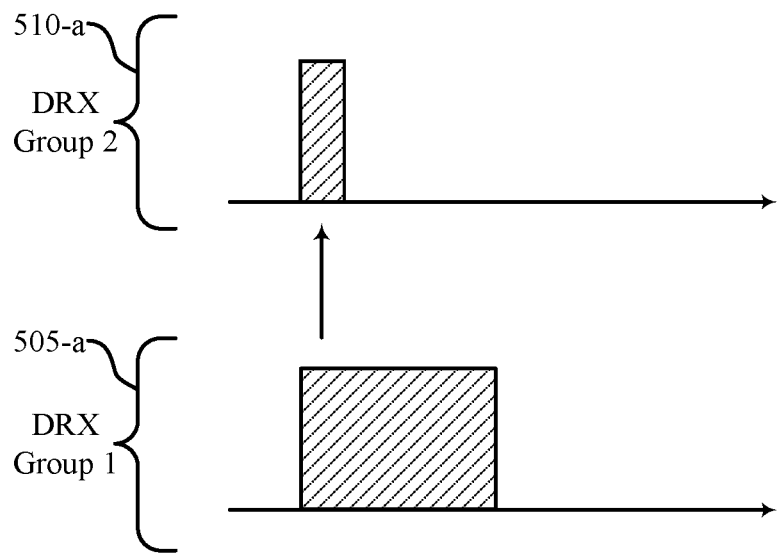
FIGS. 5A and 5B illustrate examples of DRX active times and inactivity timer that support cross-carrier scheduling techniques for multiple DRX groups in accordance with one or more aspects of the present disclosure.
Figure 5B:
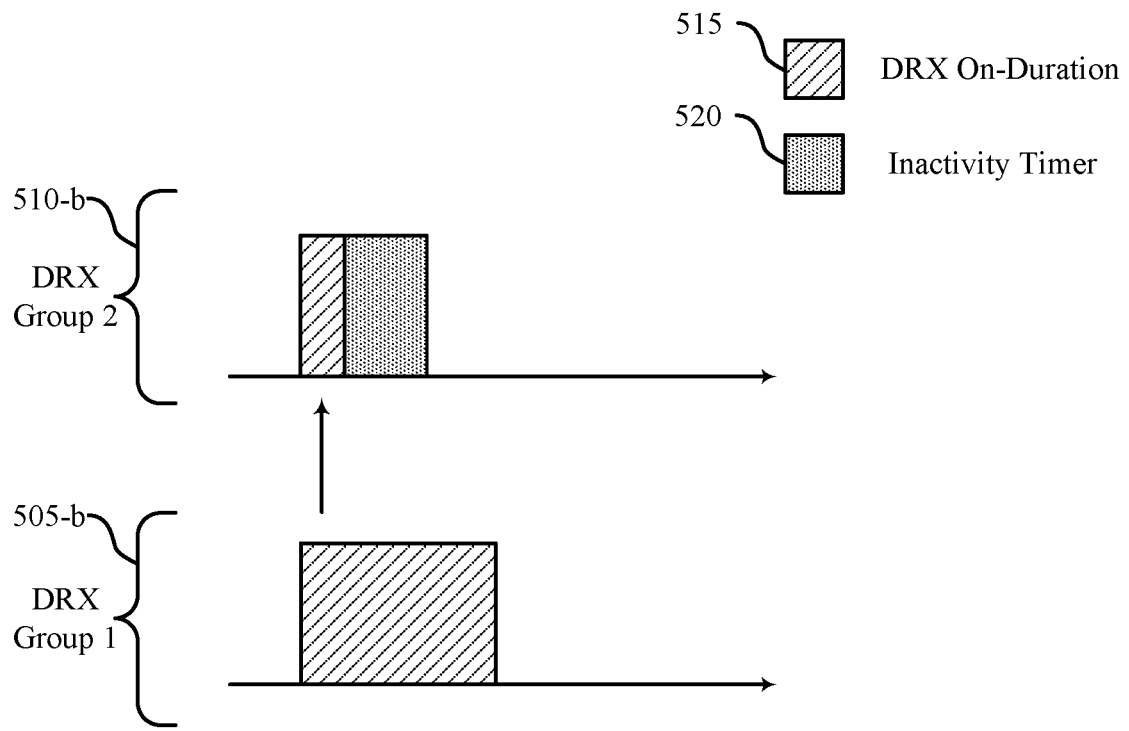

FIGS. 5A and 5B illustrate examples of DRX active times 500 and 550 that support cross-carrier scheduling techniques for multiple DRX groups in accordance with one or more aspects of the present disclosure. In some examples, the cross-carrier DRX active times 500 and 550 may be implemented by one or more aspects of the wireless communications system 100 or the wireless communications system 200. For example, the DRX active times 500 and 550 may be implemented by a UE 115 or a network entity 105, which may be examples of the corresponding devices as described with reference to FIGS. 1 and 2. In the example of FIGS. 5A and 5B, the network entity 105 may be an example of a CU, a DU, an RU, a base station, an IAB node, or one or more other network nodes as described with reference to FIG. 1.

In a first example of FIG. 5A, a first DRX group 505-a and a second DRX group 510-a may each have associated DRX on durations 515 that result in the second DRX group 510-a having a period during which it is outside of a DRX active time while the first DRX group 505-a is in a DRX active time. In some cases, a carrier of the first DRX group 505-a (e.g., a first carrier or a scheduling carrier) may be configured to provide cross-carrier scheduling for a carrier of the second DRX group 510-a. Further, one or more other carriers of the second DRX group 510-a may be configured to provide scheduling for one or more carriers of the second DRX group 510-a.

In some cases, a control information reception (e.g., PDCCH reception) on a carrier (e.g., on a serving cell) in the second DRX group 510-a may start or restart DRX-related timers for the second DRX group 510-a. As such, a control information reception of a serving cell in the first DRX group 505-a does not start or restart DRX-related timers for the second DRX group 510-a. In some cases, a DRX inactivity timer may have an inactivity timer duration 520 for DRX group 2, and may be started or restarted if the UE receives control information on a serving cell in the second DRX group 510-a for a new transmission on the serving cell in the second DRX group 510-a. Further, in some cases one or more DRX feedback timers may be adjusted based on the control information reception (e.g., a round trip timer such as drx-HARQ-RTT-TimerDL may be started or restarted, and a retransmission timer such as drx-RetransmissionTimerDL may be stopped) for the corresponding feedback (e.g., HARQ process), if the UE receives control information on a serving cell in the second DRX group 510-a for a downlink transmission, one-shot HARQ feedback, or a retransmission of HARQ feedback. Likewise, one or more DRX timers for feedback may be adjusted based on control information for an uplink transmission (e.g., drx-HARQ-RTT-TimerUL is started or restarted and drx-RetransmissionTimerUL is stopped, for the corresponding HARQ process), if the UE receives control information on a serving cell in the second DRX group 510-a for an uplink transmission.

In another example, illustrated in FIG. 5B, the first DRX group 505-b and the second DRX group 510-b may each have associated DRX on durations 515 and the second DRX group 510-b may have an inactivity timer duration 520, that result in the second DRX group 510-b having a period during which it is outside of a DRX active time while the first DRX group 505-b is in a DRX active time. In this example, a control information reception for a serving cell in the second DRX group 510-b may start or restart DRX-related timers for the second DRX group 510-b. For example, a PDCCH reception on a serving cell in the first DRX group 505-b for a serving cell in the second DRX group 510-*b* may start or restart DRX-related timers for the second DRX group 510-*b*. Examples of timer adjustments for such cases may include inactivity timer (e.g., drx-InactivityTimer) for the second DRX group 510-*b* being started or restarted if the UE receives PDCCH on a serving cell in the first DRX group 505-*b* or in the second DRX group 510-*b* for a serving cell in the second DRX group 510-*b* for a new transmission on the serving cell in the second DRX group 510-*b*. Other timer adjustments may include one or more feedback timers, such as a downlink round trip timer (e.g., drx-HARQ-RTT-TimerDL) that is started or restarted and a retransmission timer (e.g., drx-RetransmissionTimerDL) that is stopped, for the corresponding HARQ process, if the UE receives PDCCH for a serving cell in the second DRX group 510-*b* for a DL transmission, one-shot HARQ feedback, or a retransmission of HARQ feedback. Further, timer adjustments may include one or more uplink-related timers, such as a round trip timer (e.g., drx-HARQ-RTT-TimerUL) that is started or restarted and a retransmission timer (e.g., drx-RetransmissionTimerUL) that is stopped, for the corresponding HARQ process, if the UE receives PDCCH for a serving cell in the second DRX group 510-*b* for an uplink transmission. In some cases, control channel communications may be based on a DRX state of one or more DRX groups, such as illustrated in FIGS. 6, 7, 8A, and 8B.

Figure 6:
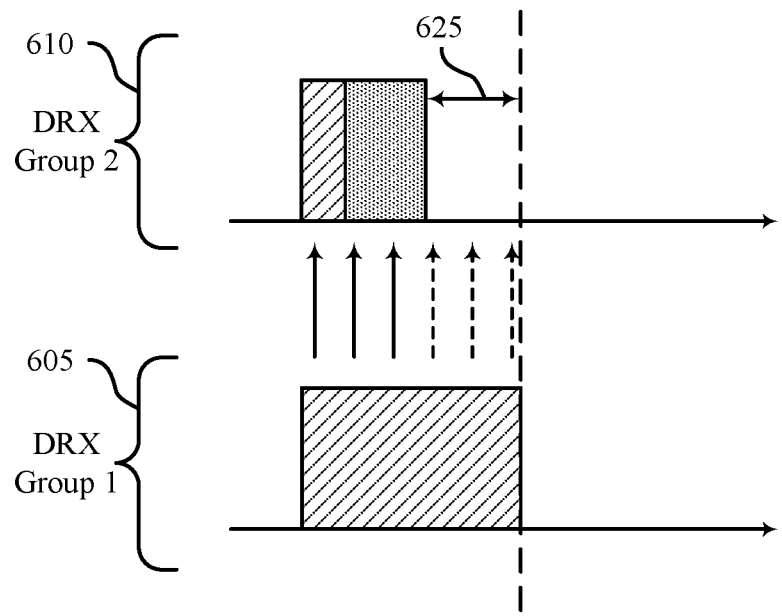
FIGS. 6, 7, 8A and 8B illustrate examples of DRX active times and control channel monitoring that support cross-carrier scheduling techniques for multiple DRX groups in accordance with one or more aspects of the present disclosure.
Figure 6:

FIG. 6 illustrates an example of DRX active times and control channel monitoring 600 that supports cross-carrier scheduling techniques for multiple DRX groups in accordance with one or more aspects of the present disclosure. In some examples, the DRX active times and control channel monitoring 600 may be implemented by one or more aspects of the wireless communications system 100 or the wireless communications system 200. For example, the DRX active times and control channel monitoring 600 may be implemented by a UE 115 or a network entity 105, which may be examples of the corresponding devices as described with reference to FIGS. 1 and 2. In the example of FIG. 6, the network entity 105 may be an example of a CU, a DU, an RU, a base station, an IAB node, or one or more other network nodes as described with reference to FIG. 1.

In this example, a first DRX group 605 may include one or more carriers, and a second DRX group 610 may include one or more carriers, where a first carrier (e.g., a scheduling carrier) of the first DRX group 605 may provide scheduling information for cross-carrier scheduling of a second carrier of the second DRX group 610. In some aspects, a UE may not monitor (or, is not required to monitor) for control channel information (e.g., PDCCH) on the scheduling carrier in the first DRX group 605 for cross-carrier scheduling the second carrier in the second DRX group 610 outside of a DRX active time of the second DRX group 610. In the example of FIG. 6, the active time of the second DRX group 610 may include a DRX on-duration time 615 and a time associated with an inactivity timer 620. In this example, the first DRX group 605 may have a DRX on-duration time 615 that extends beyond the DRX active time of the second DRX group, and thus a timer period 625 may be present where the scheduling carrier is not monitored for control information for cross-carrier scheduling the second carrier in the second DRX group 610. Thus, in such aspects, PDCCH monitoring for cross-carrier scheduling from a cell in the first DRX group 605 to a cell in the second DRX group 610 is based on the DRX active time of the second DRX group 610.

As discussed, in some cases the DRX active time of the second DRX group 610 is extended outside of the DRX on-duration time 615 due to other timers (e.g., drx-InactivityTimer, drx-RetransmissionTimerDL, drx-RetransmissionTimerUL, etc.), and in such cases, as illustrated in FIG. 6, the UE may monitor for control information on the cell in the first DRX group 605 for cross-carrier scheduling to a cell in the second DRX group 610 during an entire duration of the DRX active time of the second DRX group 610. In some cases, control information monitoring on a cell in the first DRX group 605 for self-scheduling, or for cross-carrier scheduling to the other cell(s) in the first DRX group 605, is not impacted by the DRX on/off state of the second DRX group 610.

Figure 7:
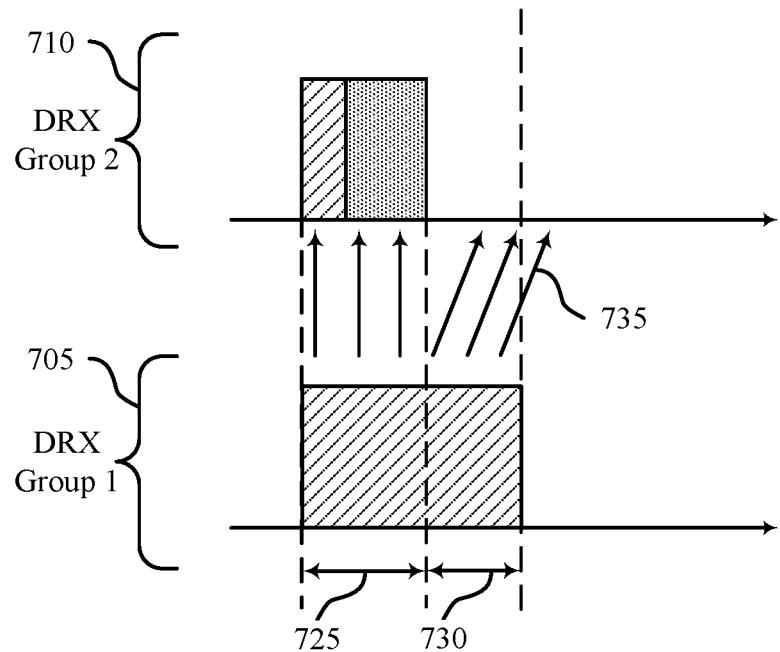
Figure 7:
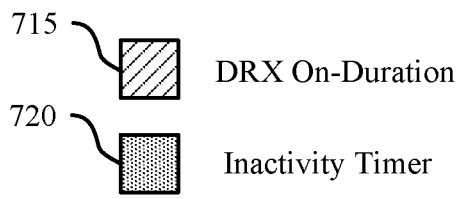

FIG. 7 illustrates another example of DRX active times and control channel monitoring 700 that supports cross-carrier scheduling techniques for multiple DRX groups in accordance with one or more aspects of the present disclosure. In some examples, the DRX active times and control channel monitoring 700 may be implemented by one or more aspects of the wireless communications system 100 or the wireless communications system 200. For example, the DRX active times and control channel monitoring 700 may be implemented by a UE 115 or a network entity 105, which may be examples of the corresponding devices as described with reference to FIGS. 1 and 2. In the example of FIG. 7, the network entity 105 may be an example of a CU, a DU, an RU, a base station, an IAB node, or one or more other network nodes as described with reference to FIG. 1.

In this example, a first DRX group 705 may include one or more carriers, and a second DRX group 710 may include one or more carriers, where a first carrier (e.g., a scheduling carrier) of the first DRX group 705 may provide scheduling information for cross-carrier scheduling of a second carrier of the second DRX group 710. In some aspects, a UE may monitor for control channel information on a cell in the first DRX group 705 for cross-carrier scheduling to a cell in the second DRX group 710 at times that outside the DRX active time of the second DRX group 710 (e.g., outside of the DRX active time associated with DRX on-duration time 715 and inactivity timer 720). Thus, in such cases, PDCCH monitoring for cross-carrier scheduling from a cell in the first DRX group 705 to a cell in the second DRX group 710 may be based on the DRX active time of the first DRX group 705, including a first portion of the active time 725 that corresponds to a DRX active time of the second DRX group 710 and a second portion of the active time 730 that is outside of the DRX active time of the second DRX group 710, that corresponds to DRX active time of the first DRX group 705.

Thus, in such cases, control information on a scheduling carrier in the first DRX group 705 can schedule data on a cell in the second DRX group 710 even during the second portion of the active time 730 where the second DRX group 710 is not inside of a DRX active time. In some cases, when the first DRX group 705 is in a DRX active time while the second DRX group 710 is outside of a DRX active time, a control information transmission 735 on a cell in the first DRX group 705 during the second portion of the active time 730 that schedules data on a cell in the second DRX group 710 may need to indicate a scheduling delay (e.g., a K0 or K2 value) that is larger than a certain value (e.g., n as the number of slot(s)). The value can be, for example, n slot(s) where the value of n is specified or is reported as part of UE capability signaling. In some cases, The value n can depend on the SCS of either or both of the scheduling cell or the scheduled cell. Once there is a data scheduled on a cell in the second DRX group 710, the inactivity timer 720 for the second DRX group 710 may be started or restarted from a particular timing (e.g., the first slot when the data on the cell is scheduled), which may effectively act as a DRX active time extension of the second DRX group 710 based on dynamic signaling. Once the second DRX group 710 is in a DRX active time due to such scheduling, the longer scheduling delay may no longer be needed, and scheduling information may be provided without the delay until the second DRX group 710 is again outside of a DRX active time while the first DRX group is in a DRX active time.

Figure 8A:
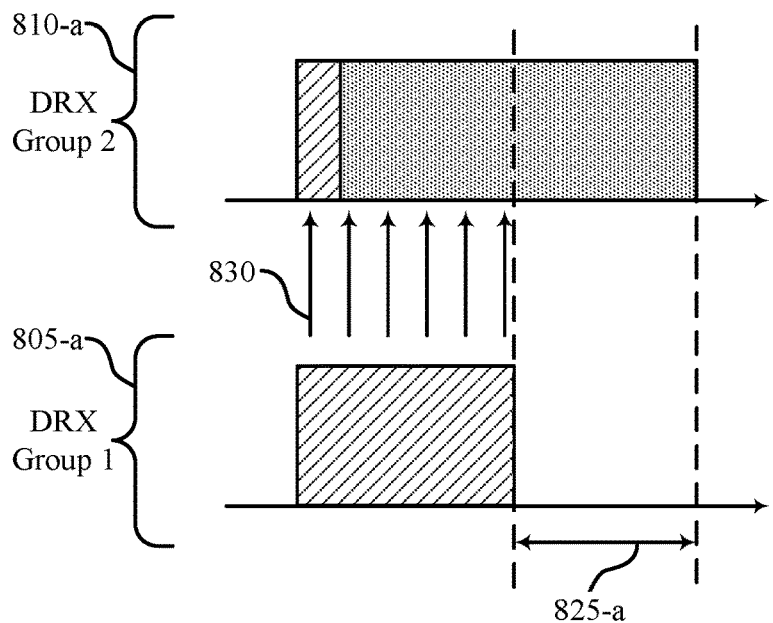
Figure 8B:
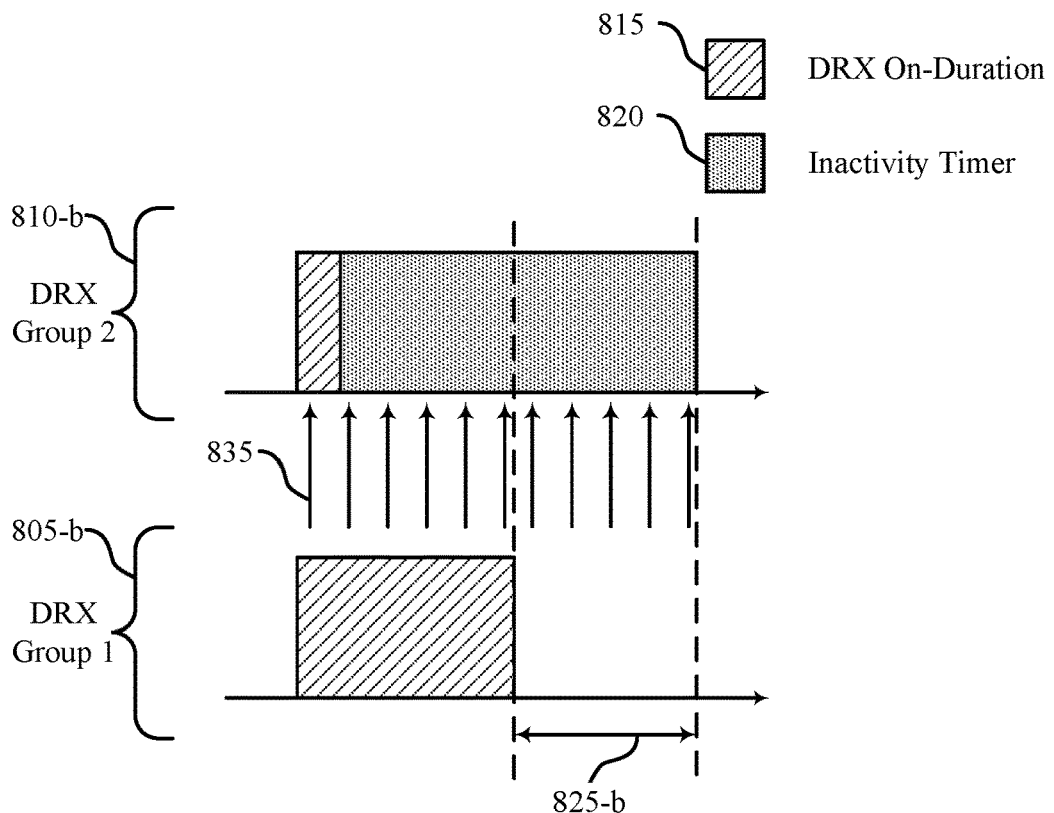

FIGS. 8A and 8B illustrate additional examples of DRX active times and control channel monitoring 800 and 850 that support cross-carrier scheduling techniques for multiple DRX groups in accordance with one or more aspects of the present disclosure. In some examples, the DRX active times and control channel monitoring 800 and 850 may be implemented by one or more aspects of the wireless communications system 100 or the wireless communications system 200. For example, the DRX active times and control channel monitoring 800 and 850 may be implemented by a UE 115 or a network entity 105, which may be examples of the corresponding devices as described with reference to FIGS. 1 and 2. In the example of FIGS. 8A and 8B, the network entity 105 may be an example of a CU, a DU, an RU, a base station, an IAB node, or one or more other network nodes as described with reference to FIG. 1.

In the example of FIG. 8A, a first DRX group 805-a may include one or more carriers, and a second DRX group 810-a may include one or more carriers, where a first carrier (e.g., a scheduling carrier) of the first DRX group 805-a may provide scheduling information for cross-carrier scheduling of a second carrier of the second DRX group 810-a. In this example, the first DRX group 805-a of the scheduling cell is outside of a DRX active time, but the second DRX group 810-a of the scheduled cell is in a DRX active time for a time period 825-a beyond the DRX active time of the first DRX group 805-a. In some aspects, the UE may not monitor (or, is not required to monitor) for control information on the cell in the first DRX group 805-a for cross-carrier scheduling to a cell in the second DRX group 810-a outside the DRX active time of the first DRX group 805-a. As such, PDCCH monitoring for cross-carrier scheduling from a cell in the first DRX group 805-a to a cell in the second DRX group 810-a (e.g., indicated by arrows 830 in FIG. 8A) is based on the DRX active time of the first DRX group 805-a. In some cases, the DRX active time of the first DRX group 805-a may be extended outside of a DRX on-duration time 815 due to other timers, such as inactivity timer 820 or other timers such as a retransmission timer (e.g., drx-InactivityTimer, drx-RetransmissionTimerDL, drx-RetransmissionTimerUL, etc.).

In some other aspects, as illustrated in the example of FIG. 8B, a first DRX group 805-b may include one or more carriers, and a second DRX group 810-b may include one or more carriers, where a first carrier (e.g., a scheduling carrier) of the first DRX group 805-b may provide scheduling information for cross-carrier scheduling of a second carrier of the second DRX group 810-b. In this example, the first DRX group 805-b of the scheduling cell is outside of a DRX active time, but the second DRX group 810-b of the scheduled cell is in a DRX active time for a time period 825-b beyond the DRX active time of the first DRX group 805-b. In some cases, a UE may monitor for control information on a cell in the first DRX group 805-b for cross-carrier scheduling to a cell in the second DRX group 810-b (e.g., indicated by arrows 835 in FIG. 8B) outside the DRX active time of the first DRX group 805-b. As such, control information monitoring for cross-carrier scheduling from a cell in the first DRX group 805-b to a cell in the second DRX group 810-b may be based on the DRX active time of the second DRX group 810-b. In some cases, is the DRX active time of the second DRX group 810-b is extended outside of DRX on-duration time 815 due to other timers (e.g., inactivity timer 820, drx-RetransmissionTimerDL, drx-RetransmissionTimerUL, etc.), the control information monitoring occasions on a cell in the first DRX group 805-b for cross-carrier scheduling to a cell in the second DRX group 810-b may also be extended. In some cases, control information monitoring on a cell in the first DRX group 805-a for self-scheduling, or for cross-carrier scheduling to the other cell(s) in the first DRX group 805-b, are not impacted by the DRX on/off state of the second DRX group 810-b. In some cases, alternatively, control information monitoring on a cell in the first DRX group 805-b for self-scheduling, or for cross-carrier scheduling to the other cell(s) in the first DRX group 805-b, may also be impacted by the DRX on/off state of the second DRX group 810-b.

In some cases, the UE may monitor for control information on a cell in the first DRX group 805-b for cross-carrier scheduling to a cell in the second DRX group 810-b outside the DRX active time of the first DRX group 805-b. Thus, in some examples if the first DRX group 805-b is an a DRX off state (e.g., outside of a DRX active time) but the second DRX group 810-b is a DRX on state (e.g., in a DRX active time), the UE may monitors PDCCH on a carrier of the first DRX group 805-b for cross-carrier scheduling to cell(s) of the second DRX group 810-b but does not monitor PDCCH on any carriers in the first DRX group 805-b for cross-carrier scheduling to carriers in the second DRX group 810-b. In other examples, the UE may monitor PDCCH on a first carrier of the first DRX group 805-b that is configured with cross-carrier scheduling to at least a second carrier in the second DRX group 810-b but does not monitor PDCCH on any other carriers in the first DRX group 805-b that are not configured with cross-carrier scheduling to one or more carriers in the second DRX group 810-b. In some examples, the UE may monitor PDCCH on a search space set that is configured with cross-carrier scheduling to one or more carriers in the second DRX group 810-b but does not monitor PDCCH on any other search space sets in the first DRX group 805-b that are not configured with cross-carrier scheduling to the one or more carriers in the second DRX group 810-b. In further examples, the UE may monitor PDCCH on each carrier of the first DRX group 805-b as well as one or more carriers of the second DRX group 810-b that are configured with cross-carrier scheduling as long as the UE monitors PDCCH on one carrier of the first DRX group 805-b. In still further examples, the UE may monitor PDCCH on any search space set as well as on a search space set that is configured with cross-carrier scheduling to the second DRX group 810-b as long as the UE monitors PDCCH on the search space set that is configured with cross-carrier scheduling.

Figure 9:
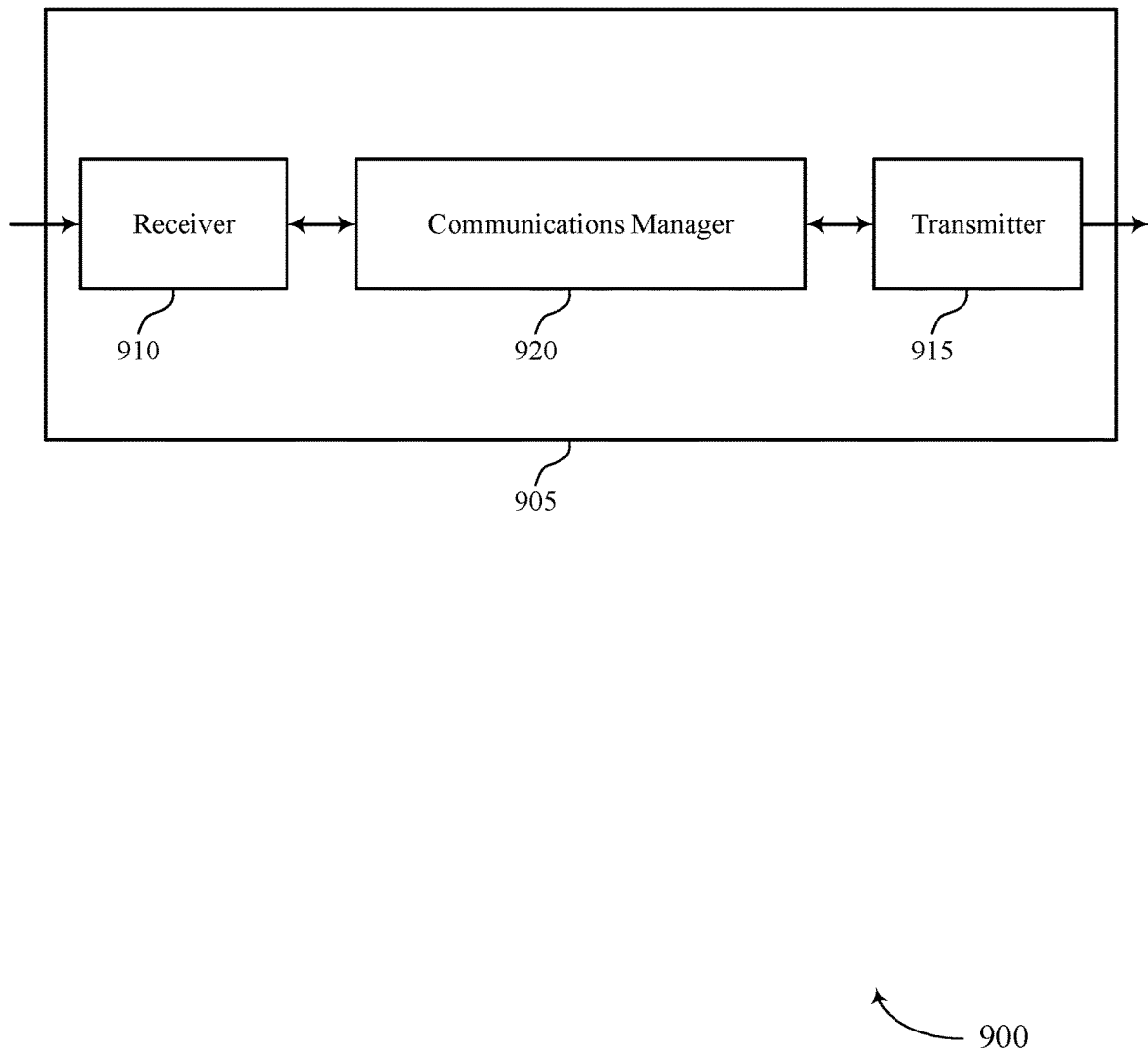
FIGS. 9 and 10 illustrate block diagrams of devices that support cross-carrier scheduling techniques for multiple DRX groups in accordance with one or more aspects of the present disclosure.

FIG. 9 illustrates a block diagram 900 of a device 905 that supports cross-carrier scheduling techniques for multiple DRX groups in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to cross-carrier scheduling techniques for multiple DRX groups). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to cross-carrier scheduling techniques for multiple DRX groups). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of cross-carrier scheduling techniques for multiple DRX groups as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. For example, the communications manager 920 may be configured as or otherwise support a means for receiving configuration information for at least a first carrier associated with a first DRX group and a second carrier associated with a second DRX group, the configuration information including at least a first timer associated with the first DRX group and a second timer associated with the second DRX group, where scheduling information associated with the second carrier is provided via the first carrier. The communications manager 920 may be configured as or otherwise support a means for monitoring the first carrier for a first control information communication that indicates a resource allocation for communications via the second carrier, the monitoring based on the first timer, the second timer, or both the first timer and the second timer. The communications manager 920 may be configured as or otherwise support a means for communicating via the second carrier based on a resource allocation provided with the first control information communication received via the first carrier.

Additionally, or alternatively, the communications manager 920 may support wireless communications at a UE in accordance with examples as disclosed herein. For example, the communications manager 920 may be configured as or otherwise support a means for receiving configuration information for at least a first carrier associated with a first DRX group, a second carrier associated with a second DRX group. The communications manager 920 may be configured as or otherwise support a means for monitoring, responsive to the first DRX group and the second DRX group having different timers for associated active times at each respective DRX group, the first carrier for a first control information communication and the second carrier for a second control information communication, wherein the first control information communication indicates a resource allocation only for communications via one or more carriers in the first DRX group, and the second control information communication indicates a resource allocation only for communications via one or more carriers in the second DRX group.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for cross-carrier scheduling for different component carriers that may be configured in different DRX groups. Such techniques may provide for enhanced network efficiency through scheduling of multiple carriers via a scheduling carrier that may be located in a different frequency band and in a different DRX group than one or more scheduled carriers. Further, such techniques may provide for reduced power consumption, such as through reduced DRX active times on one or more carriers in a higher frequency band (e.g., one or more FR2 carriers) that consume relatively higher power than a carrier on a lower frequency band (e.g., a scheduling carrier on FR1).

Figure 10:
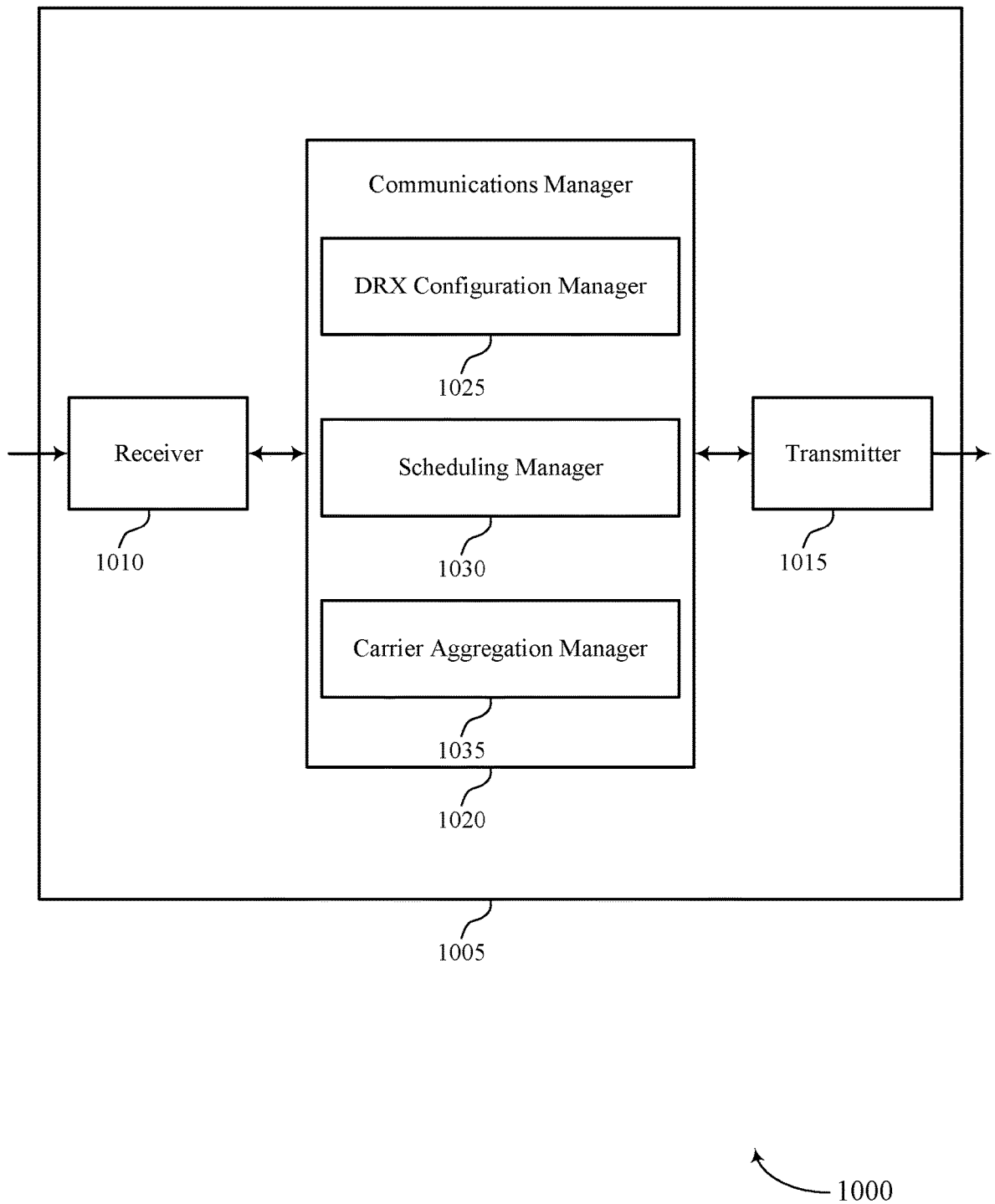

FIG. 10 illustrates a block diagram 1000 of a device 1005 that supports cross-carrier scheduling techniques for multiple DRX groups in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to cross-carrier scheduling techniques for multiple DRX groups). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to cross-carrier scheduling techniques for multiple DRX groups). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of cross-carrier scheduling techniques for multiple DRX groups as described herein. For example, the communications manager 1020 may include a DRX configuration manager 1025, a scheduling manager 1030, a carrier aggregation manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. The DRX configuration manager 1025 may be configured as or otherwise support a means for receiving configuration information for at least a first carrier associated with a first DRX group and a second carrier associated with a second DRX group, the configuration information including at least a first timer associated with the first DRX group and a second timer associated with the second DRX group, where scheduling information associated with the second carrier is provided via the first carrier. The scheduling manager 1030 may be configured as or otherwise support a means for monitoring the first carrier for a first control information communication that indicates a resource allocation for communications via the second carrier, the monitoring based on the first timer, the second timer, or both the first timer and the second timer. The carrier aggregation manager 1035 may be configured as or otherwise support a means for communicating via the second carrier based on a resource allocation provided with the first control information communication received via the first carrier.

Additionally, or alternatively, the communications manager 1020 may support wireless communications at a UE in accordance with examples as disclosed herein. The carrier aggregation manager 1035 may be configured as or otherwise support a means for receiving configuration information for at least a first carrier associated with a first DRX group, a second carrier associated with a second DRX group. The scheduling manager 1030 may be configured as or otherwise support a means for monitoring, responsive to the first DRX group and the second DRX group having different timers for associated active times at each respective DRX group, the first carrier for a first control information communication and the second carrier for a second control information communication, wherein the first control information communication indicates a resource allocation only for communications via one or more carriers in the first DRX group, and the second control information communication indicates a resource allocation only for communications via one or more carriers in the second DRX group.

Figure 11:
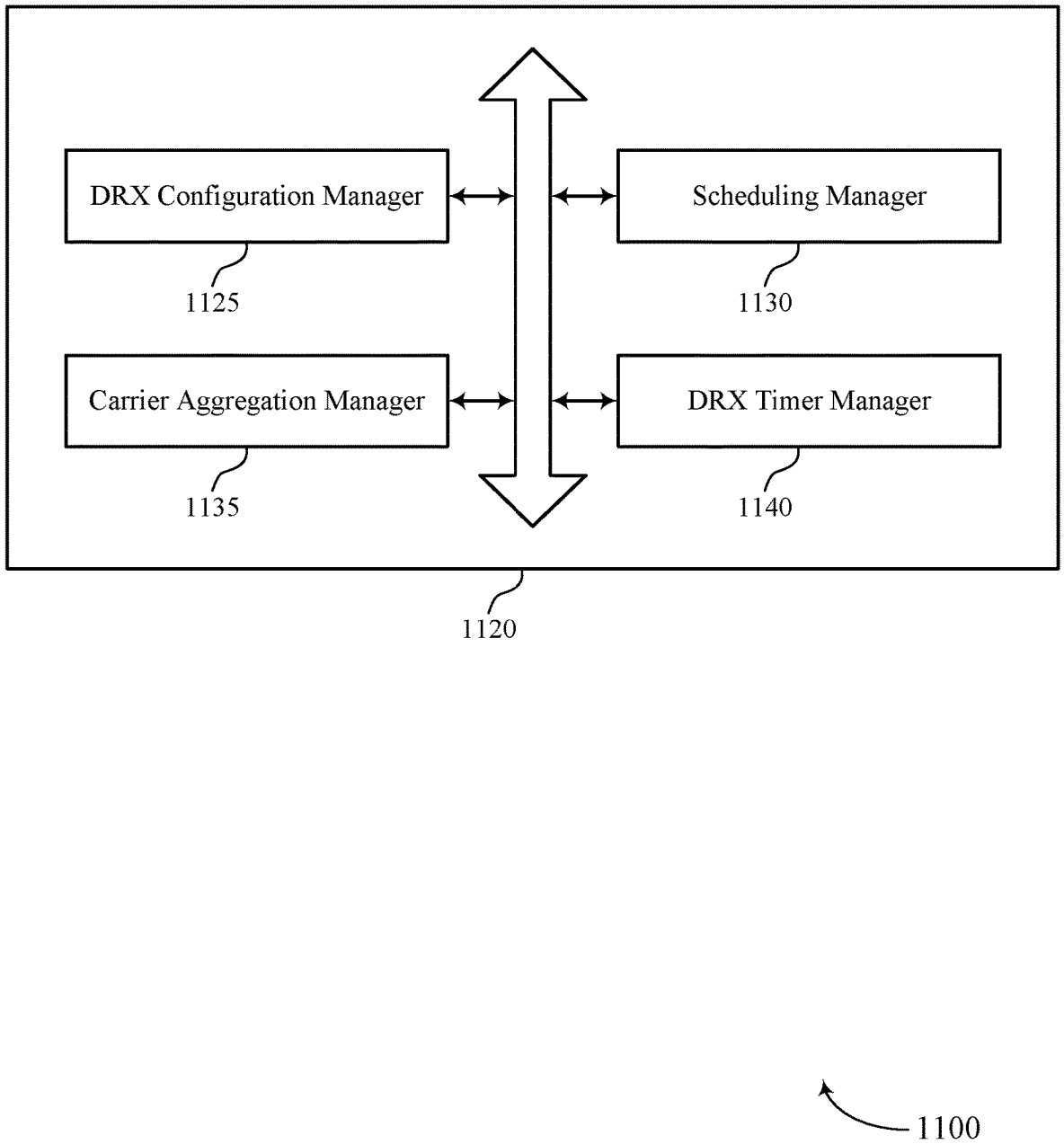
FIG. 11 illustrates a block diagram of a communications manager that supports cross-carrier scheduling techniques for multiple DRX groups in accordance with one or more aspects of the present disclosure.

FIG. 11 illustrates a block diagram 1100 of a communications manager 1120 that supports cross-carrier scheduling techniques for multiple DRX groups in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of cross-carrier scheduling techniques for multiple DRX groups as described herein. For example, the communications manager 1120 may include a DRX configuration manager 1125, a scheduling manager 1130, a carrier aggregation manager 1135, a DRX timer manager 1140, or any combination thereof. Each of these components may communicate, directly or indirectly, with one another (e.g., via one or more buses).

The communications manager 1120 may support wireless communications at a UE in accordance with examples as disclosed herein. The DRX configuration manager 1125 may be configured as or otherwise support a means for receiving configuration information for at least a first carrier associated with a first DRX group and a second carrier associated with a second DRX group, the configuration information including at least a first timer associated with the first DRX group and a second timer associated with the second DRX group, where scheduling information associated with the second carrier is provided via the first carrier. The scheduling manager 1130 may be configured as or otherwise support a means for monitoring the first carrier for a first control information communication that indicates a resource allocation for communications via the second carrier, the monitoring based on the first timer, the second timer, or both the first timer and the second timer. The carrier aggregation manager 1135 may be configured as or otherwise support a means for communicating via the second carrier based on a resource allocation provided with the first control information communication received via the first carrier.

In some examples, the scheduling manager 1130 may be configured as or otherwise support a means for detecting a second control information communication on at least one carrier of one or more carriers in the second DRX group. In some examples, the DRX timer manager 1140 may be configured as or otherwise support a means for updating the second timer based on the second control information communication, where the first timer is updated based on the first control information communication irrespective of the second control information communication, and the second timer is updated based on the second control information communication irrespective of the first control information communication.

In some examples, the first timer and the second timer include one or more of a DRX inactivity timer, a downlink acknowledgment feedback timer, an uplink acknowledgment feedback timer, or any combinations thereof, associated with the first DRX group or the second DRX group, that are started or restarted responsive to a control channel transmission on a serving cell of the associated first DRX group or second DRX group.

In some examples, the scheduling manager 1130 may be configured as or otherwise support a means for detecting the first control information communication on the first carrier. In some examples, the DRX timer manager 1140 may be configured as or otherwise support a means for updating the second timer based on the first control information communication. In some examples, the second timer includes one or more of a DRX inactivity timer, a downlink acknowledgment feedback timer, an uplink acknowledgment feedback timer, or any combinations thereof, associated with the second DRX group, that are started or restarted responsive to the first control information communication or a control information communication received via a carrier in the second DRX group.

In some examples, to support monitoring the first carrier, the DRX timer manager 1140 may be configured as or otherwise support a means for monitoring the first carrier for the first control information communication based on the second timer associated with the second DRX group, and where the first carrier is not monitored for control information associated with the second carrier outside of an active time associated with the second DRX group. In some examples, the active time associated with the second DRX group is based on one or more of an on-duration timer, a DRX inactivity timer, a downlink acknowledgment feedback timer, an uplink acknowledgment feedback timer, or any combinations thereof, associated with the second DRX group.

In some examples, the scheduling manager 1130 may be configured as or otherwise support a means for monitoring the first carrier for scheduling information for the first carrier or one or more other carriers of the first DRX group based on the first timer irrespective of whether the second carrier is inside or outside of the active time associated with the second DRX group.

In some examples, to support monitoring the first carrier, the DRX timer manager 1140 may be configured as or otherwise support a means for monitoring the first carrier for the first control information communication based on both the first timer associated with the first DRX group and the second timer associated with the second DRX group, and where the first carrier is monitored for control information associated with the second carrier outside of an active time associated with the second DRX group when the first DRX group is active.

In some examples, the first control information communication is received outside of the active time associated with the second DRX group and where the second timer is restarted to reinitiate the active time associated with the second DRX group. In some examples, the resource allocation for communications via the second carrier has an associated scheduling delay between a reception time of the first control information communication and a start of communications via resources indicated in the resource allocation. In some examples, the scheduling delay is an indicated or predefined number of slots, and where a value of the number of slots is based on a subcarrier spacing of one or more of the first carrier or the second carrier. In some examples, the scheduling delay is applied for control information received for the second carrier outside of the active time associated with the second DRX group, and is not applied subsequent to restarting the second timer.

In some examples, to support monitoring the first carrier, the DRX timer manager 1140 may be configured as or otherwise support a means for monitoring the first carrier for the first control information communication based on the first timer associated with the first DRX group irrespective of whether the second timer associated with the second DRX group indicates the second DRX group is inside or outside of a DRX active time. In some examples, to support monitoring the first carrier, the DRX timer manager 1140 may be configured as or otherwise support a means for monitoring the first carrier for the first control information communication during a period associated with an extended active time of the first DRX group. In some examples, to support monitoring the first carrier, the DRX timer manager 1140 may be configured as or otherwise support a means for monitoring the first carrier for the first control information communication based on the second timer associated with the second DRX group irrespective of whether the first timer associated with the first DRX group indicates the first DRX group is inside or outside of a DRX active time. In some examples, to support monitoring the first carrier, the DRX timer manager 1140 may be configured as or otherwise support a means for monitoring the first carrier for the first control information communication during a period associated with an extended active time of the second DRX group.

In some examples, to support monitoring the first carrier, the scheduling manager 1130 may be configured as or otherwise support a means for monitoring the first carrier for scheduling information for the first carrier or one or more other carriers of the first DRX group based on the first timer irrespective of whether the second carrier is inside or outside of the active time associated with the second DRX group. In some examples, to support monitoring the first carrier, the scheduling manager 1130 may be configured as or otherwise support a means for monitoring the first carrier for scheduling information for the first carrier or one or more other carriers of the first DRX group during a period associated with an extended active time of the second DRX group.

In some examples, to support monitoring the first carrier, the scheduling manager 1130 may be configured as or otherwise support a means for monitoring the first carrier for scheduling information for the first carrier or the second carrier during periods in which the first DRX group and the second DRX group are both in an active time. In some examples, to support monitoring the first carrier, the scheduling manager 1130 may be configured as or otherwise support a means for determining that at least one or the first DRX group or the second DRX group is inactive. In some examples, to support monitoring the first carrier, the scheduling manager 1130 may be configured as or otherwise support a means for discontinuing monitoring the first carrier for scheduling information for the second carrier responsive to the determining.

Additionally, or alternatively, the communications manager 1120 may support wireless communications at a UE in accordance with examples as disclosed herein. In some examples, the carrier aggregation manager 1135 may be configured as or otherwise support a means for receiving configuration information for at least a first carrier associated with a first DRX group, a second carrier associated with a second DRX group. In some examples, the scheduling manager 1130 may be configured as or otherwise support a means for monitoring, responsive to the first DRX group and the second DRX group having different timers for associated active times at each respective DRX group, the first carrier for a first control information communication and the second carrier for a second control information communication, wherein the first control information communication indicates a resource allocation only for communications via one or more carriers in the first DRX group, and the second control information communication indicates a resource allocation only for communications via one or more carriers in the second DRX group.

In some examples, each of two or more carriers in each of the first DRX group and the second DRX group are within a same frequency band. In some examples, a first carrier of the first DRX group and a second carrier of the first DRX group are in different frequency bands. In some examples, each of two or more carriers in each of the first DRX group and the second DRX group have a same subcarrier spacing. In some examples, different carriers within one or more of the first DRX group or the second DRX group have different subcarrier spacings.

Figure 12:
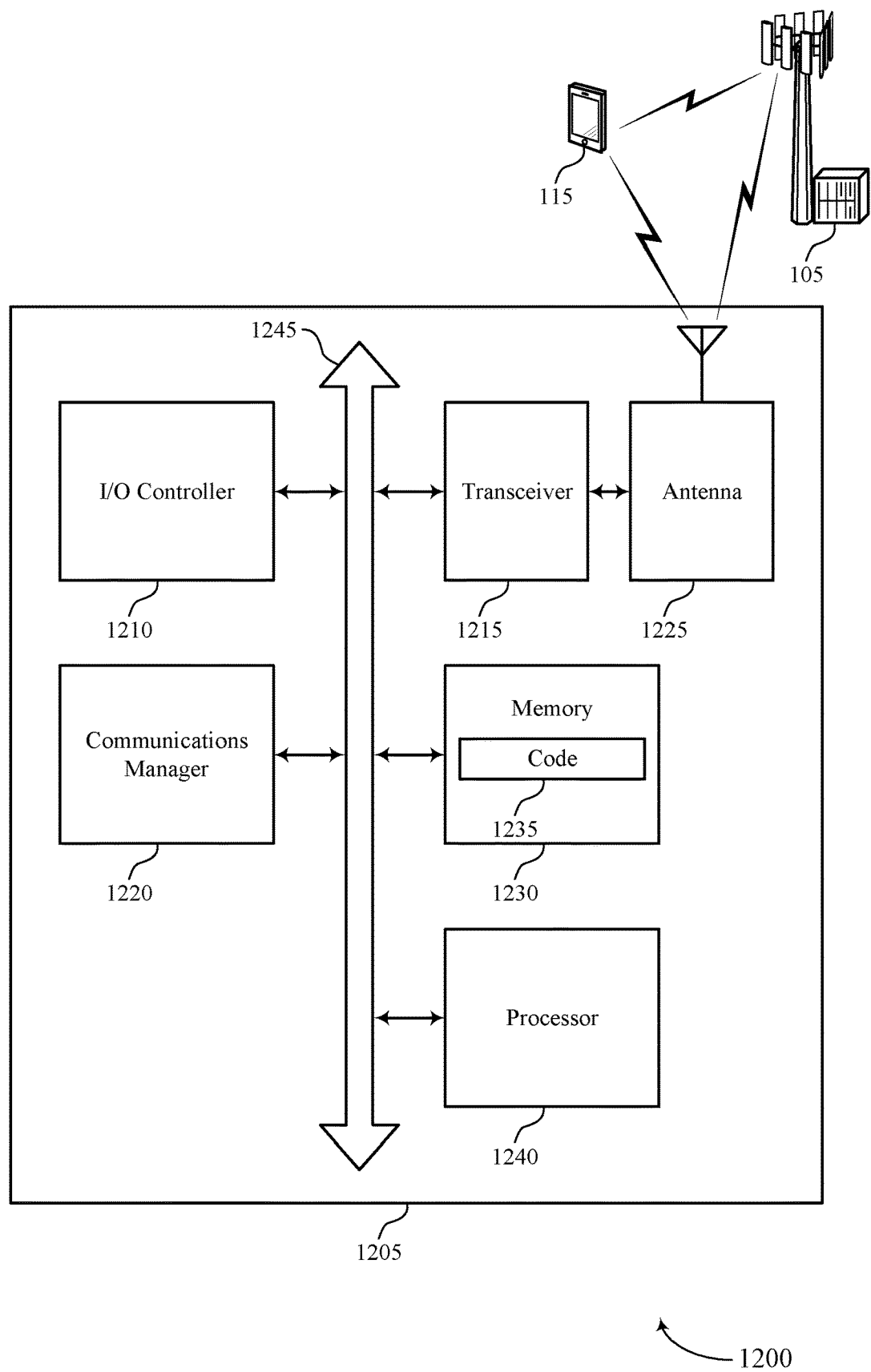
FIG. 12 illustrates a diagram of a system including a device that supports cross-carrier scheduling techniques for multiple DRX groups in accordance with one or more aspects of the present disclosure.

FIG. 12 illustrates a diagram of a system 1200 including a device 1205 that supports cross-carrier scheduling techniques for multiple DRX groups in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting cross-carrier scheduling techniques for multiple DRX groups). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving configuration information for at least a first carrier associated with a first DRX group and a second carrier associated with a second DRX group, the configuration information including at least a first timer associated with the first DRX group and a second timer associated with the second DRX group, where scheduling information associated with the second carrier is provided via the first carrier. The communications manager 1220 may be configured as or otherwise support a means for monitoring the first carrier for a first control information communication that indicates a resource allocation for communications via the second carrier, the monitoring based on the first timer, the second timer, or both the first timer and the second timer. The communications manager 1220 may be configured as or otherwise support a means for communicating via the second carrier based on a resource allocation provided with the first control information communication received via the first carrier.

Additionally, or alternatively, the communications manager 1220 may support wireless communications at a UE in accordance with examples as disclosed herein. For example, the communications manager 1220 may be configured as or otherwise support a means for receiving configuration information for at least a first carrier associated with a first DRX group, a second carrier associated with a second DRX group. The communications manager 1220 may be configured as or otherwise support a means for determining that the first DRX group and the second DRX group have different timers for associated active times at each respective DRX group. The communications manager 1220 may be configured as or otherwise support a means for monitoring, responsive to the determining, the first carrier for a first control information communication that indicates a resource allocation only for communications via one or more carriers in the first DRX group. The communications manager 1220 may be configured as or otherwise support a means for monitoring, responsive to the determining, the second carrier for a second control information communication that indicates a resource allocation only for communications via one or more carriers in the second DRX group.

By including or configuring the communications manager 1220 in accordance with examples as described herein, the device 1205 may support techniques for cross-carrier scheduling for different component carriers that may be configured in different DRX groups. Such techniques may provide for enhanced network efficiency through scheduling of multiple carriers via a scheduling carrier that may be located in a different frequency band and in a different DRX group than one or more scheduled carriers. Further, such techniques may provide for reduced power consumption, such as through reduced DRX active times on one or more carriers in a higher frequency band (e.g., one or more FR2 carriers) that consume relatively higher power than a carrier on a lower frequency band (e.g., a scheduling carrier on FR1).

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of cross-carrier scheduling techniques for multiple DRX groups as described herein, or the processor 1240 and the memory 1230 may be otherwise configured to perform or support such operations.

Figure 13:
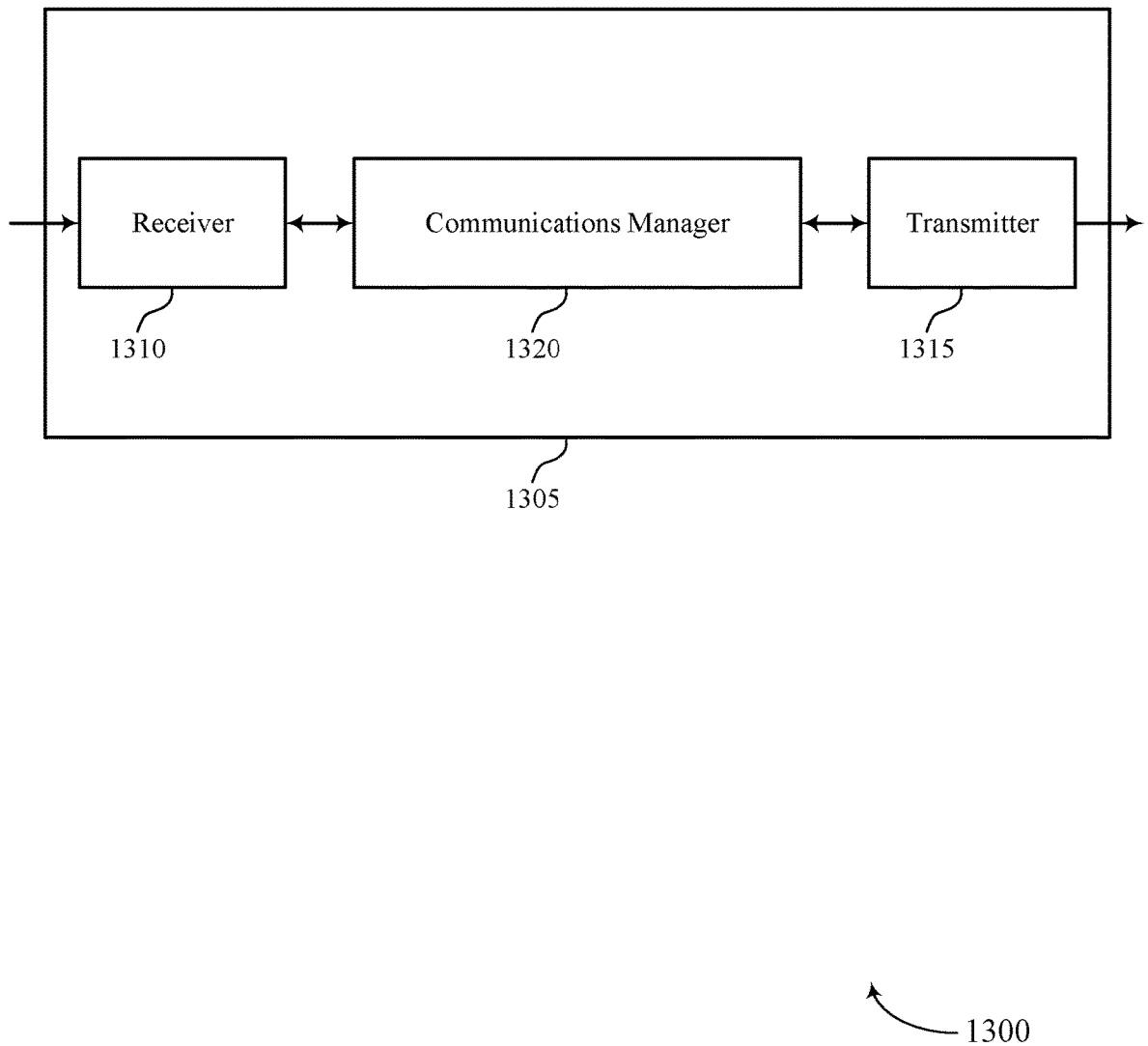
FIGS. 13 and 14 illustrate block diagrams of devices that support cross-carrier scheduling techniques for multiple DRX groups in accordance with one or more aspects of the present disclosure.

FIG. 13 illustrates a block diagram 1300 of a device 1305 that supports cross-carrier scheduling techniques for multiple DRX groups in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of cross-carrier scheduling techniques for multiple DRX groups as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. For example, the communications manager 1320 may be configured as or otherwise support a means for transmitting configuration information to at least a first UE for at least a first carrier in a first DRX group and a second carrier in a second DRX group, the configuration information including at least a first timer associated with the first DRX group and a second timer associated with the second DRX group, where scheduling information associated with the second carrier is provided via the first carrier. The communications manager 1320 may be configured as or otherwise support a means for transmitting, via the first carrier, a first control information communication that indicates a resource allocation for communications via the second carrier based on the first timer associated with the first DRX group, the second timer associated with the second DRX group, or both the first timer and the second timer. The communications manager 1320 may be configured as or otherwise support a means for communicating with the UE via the second carrier based on a resource allocation provided with the first control information communication via the first carrier.

Additionally, or alternatively, the communications manager 1320 may support wireless communications at a network entity in accordance with examples as disclosed herein. For example, the communications manager 1320 may be configured as or otherwise support a means for transmitting configuration information to at least a first UE for at least a first carrier associated in a first DRX group, a second carrier in a second DRX group. The communications manager 1320 may be configured as or otherwise support a means for determining that the first DRX group and the second DRX group have different timers for associated active times at each respective DRX group. The communications manager 1320 may be configured as or otherwise support a means for transmitting, responsive to the determining, a first control information communication via the first carrier that indicates a resource allocation only for communications via one or more carriers in the first DRX group. The communications manager 1320 may be configured as or otherwise support a means for transmitting, responsive to the determining, a second control information communication via the second carrier that indicates a resource allocation only for communications via one or more carriers in the second DRX group.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for cross-carrier scheduling for different component carriers that may be configured in different DRX groups. Such techniques may provide for enhanced network efficiency through scheduling of multiple carriers via a scheduling carrier that may be located in a different frequency band and in a different DRX group than one or more scheduled carriers. Further, such techniques may provide for reduced power consumption, such as through reduced DRX active times on one or more carriers in a higher frequency band (e.g., one or more FR2 carriers) that consume relatively higher power than a carrier on a lower frequency band (e.g., a scheduling carrier on FR1).

Figure 14:
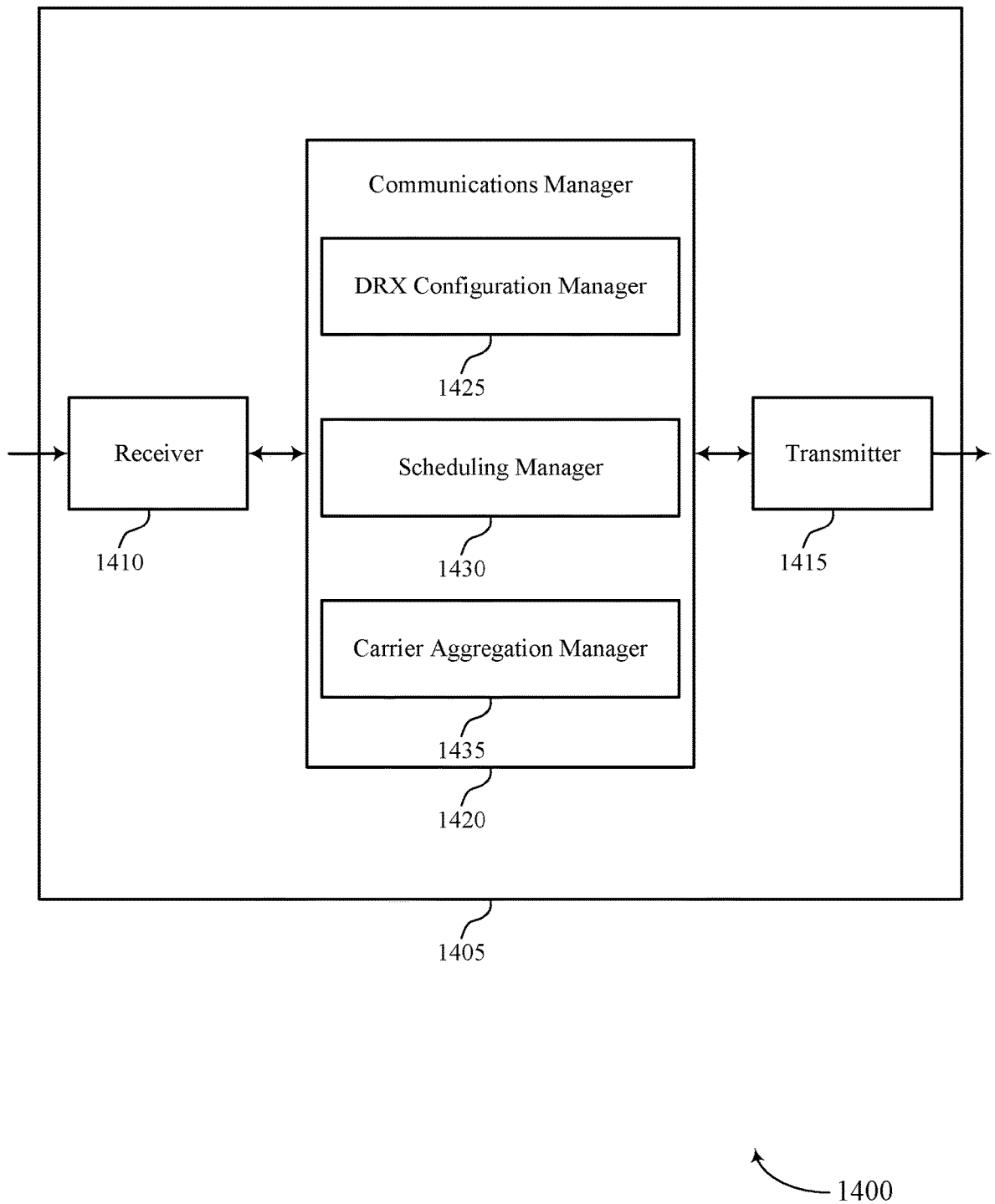

FIG. 14 illustrates a block diagram 1400 of a device 1405 that supports cross-carrier scheduling techniques for multiple DRX groups in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of cross-carrier scheduling techniques for multiple DRX groups as described herein. For example, the communications manager 1420 may include a DRX configuration manager 1425, a scheduling manager 1430, a carrier aggregation manager 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a network entity in accordance with examples as disclosed herein. The DRX configuration manager 1425 may be configured as or otherwise support a means for transmitting configuration information to at least a first UE for at least a first carrier in a first DRX group and a second carrier in a second DRX group, the configuration information including at least a first timer associated with the first DRX group and a second timer associated with the second DRX group, where scheduling information associated with the second carrier is provided via the first carrier. The scheduling manager 1430 may be configured as or otherwise support a means for transmitting, via the first carrier, a first control information communication that indicates a resource allocation for communications via the second carrier based on the first timer associated with the first DRX group, the second timer associated with the second DRX group, or both the first timer and the second timer. The carrier aggregation manager 1435 may be configured as or otherwise support a means for communicating with the UE via the second carrier based on a resource allocation provided with the first control information communication via the first carrier.

Additionally, or alternatively, the communications manager 1420 may support wireless communications at a network entity in accordance with examples as disclosed herein. The carrier aggregation manager 1435 may be configured as or otherwise support a means for transmitting configuration information to at least a first UE for at least a first carrier associated in a first DRX group, a second carrier in a second DRX group. The DRX configuration manager 1425 may be configured as or otherwise support a means for determining that the first DRX group and the second DRX group have different timers for associated active times at each respective DRX group. The scheduling manager 1430 may be configured as or otherwise support a means for transmitting, responsive to the determining, a first control information communication via the first carrier that indicates a resource allocation only for communications via one or more carriers in the first DRX group. The scheduling manager 1430 may be configured as or otherwise support a means for transmitting, responsive to the determining, a second control information communication via the second carrier that indicates a resource allocation only for communications via one or more carriers in the second DRX group.

Figure 15:
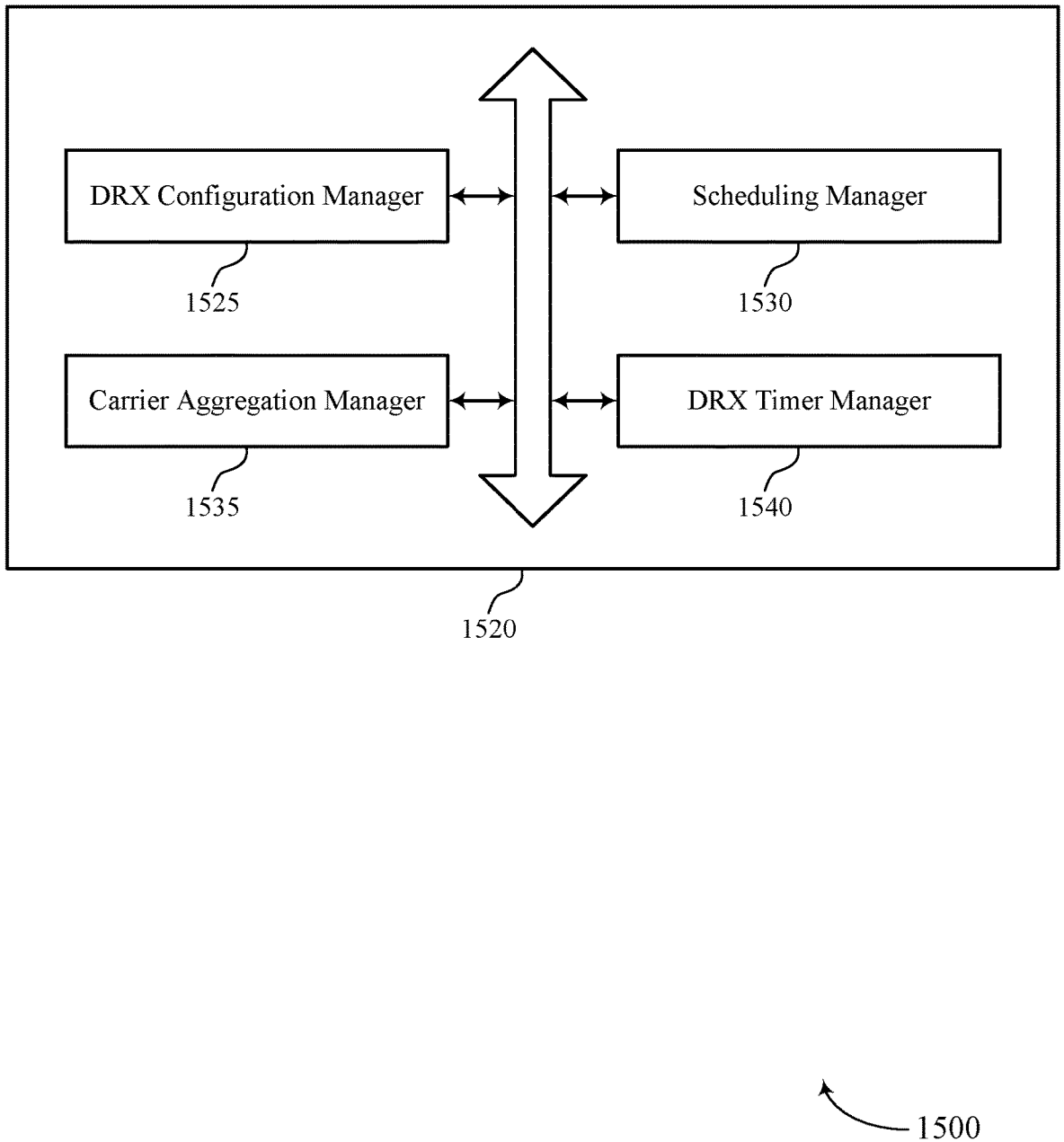
FIG. 15 illustrates a block diagram of a communications manager that supports cross-carrier scheduling techniques for multiple DRX groups in accordance with one or more aspects of the present disclosure.

FIG. 15 illustrates a block diagram 1500 of a communications manager 1520 that supports cross-carrier scheduling techniques for multiple DRX groups in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of cross-carrier scheduling techniques for multiple DRX groups as described herein. For example, the communications manager 1520 may include a DRX configuration manager 1525, a scheduling manager 1530, a carrier aggregation manager 1535, a DRX timer manager 1540, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communications at a network entity in accordance with examples as disclosed herein. The DRX configuration manager 1525 may be configured as or otherwise support a means for transmitting configuration information to at least a first UE for at least a first carrier in a first DRX group and a second carrier in a second DRX group, the configuration information including at least a first timer associated with the first DRX group and a second timer associated with the second DRX group, where scheduling information associated with the second carrier is provided via the first carrier. The scheduling manager 1530 may be configured as or otherwise support a means for transmitting, via the first carrier, a first control information communication that indicates a resource allocation for communications via the second carrier based on the first timer associated with the first DRX group, the second timer associated with the second DRX group, or both the first timer and the second timer. The carrier aggregation manager 1535 may be configured as or otherwise support a means for communicating with the UE via the second carrier based on a resource allocation provided with the first control information communication via the first carrier.

In some examples, the scheduling manager 1530 may be configured as or otherwise support a means for transmitting a second control information communication via at least one carrier of the second DRX group. In some examples, the DRX timer manager 1540 may be configured as or otherwise support a means for updating the second timer based on the second control information communication, where the first timer is updated based on the first control information communication irrespective of the second control information communication, and the second timer is updated based on the second control information communication irrespective of the first control information communication. In some examples, the first timer and the second timer include one or more of a DRX inactivity timer, a downlink acknowledgment feedback timer, an uplink acknowledgment feedback timer, or any combinations thereof, associated with the first DRX group or the second DRX group, that are started or restarted responsive to a control channel transmission on a serving cell of the associated first DRX group or second DRX group.

In some examples, the DRX timer manager 1540 may be configured as or otherwise support a means for updating the second timer based on the first control information communication. In some examples, the second timer includes one or more of a DRX inactivity timer, a downlink acknowledgment feedback timer, an uplink acknowledgment feedback timer, or any combinations thereof, associated with the second DRX group, that are started or restarted responsive to the first control information communication or a control information communication transmitted via a carrier in the second DRX group.

In some examples, the first control information communication is transmitted based on the second timer associated with the second DRX group, and where control information associated with the second carrier is not transmitted via the first carrier outside of an active time associated with the second DRX group. In some examples, the active time associated with the second DRX group is based on one or more of an on-duration timer, a DRX inactivity timer, a downlink acknowledgment feedback timer, an uplink acknowledgment feedback timer, or any combinations thereof, associated with the second DRX group. In some examples, scheduling information for the first carrier or one or more other carriers of the first DRX group is transmitted via the first carrier based on the first timer irrespective of whether the second carrier is inside or outside of the active time associated with the second DRX group. In some examples, the first control information communication is transmitted via the first carrier based on both the first timer associated with the first DRX group and the second timer associated with the second DRX group, and where control information associated with the second carrier is transmitted via the first carrier outside of an active time associated with the second DRX group when the first DRX group is active.

In some examples, the first control information communication is transmitted outside of the active time associated with the second DRX group and where the second timer is restarted to reinitiate the active time associated with the second DRX group. In some examples, the resource allocation for communications via the second carrier has an associated scheduling delay between a transmission time of the first control information communication and a start of communications via resources indicated in the resource allocation. In some examples, the scheduling delay is an indicated or predefined number of slots, and where a value of the number of slots is based on a subcarrier spacing of one or more of the first carrier or the second carrier. In some examples, the scheduling delay is applied for control information for the second carrier transmitted outside of the active time associated with the second DRX group, and is not applied subsequent to restarting the second timer.

In some examples, the first control information communication is transmitted via the first carrier based on the first timer associated with the first DRX group irrespective of whether the second timer associated with the second DRX group indicates the second DRX group is inside or outside of a DRX active time. In some examples, the first control information communication is transmitted via the first carrier during a period associated with an extended active time of the first DRX group. In some examples, the first control information communication is transmitted via the first carrier based on the second timer associated with the second DRX group irrespective of whether the first timer associated with the first DRX group indicates the first DRX group is inside or outside of a DRX active time. In some examples, the first control information communication is transmitted via the first carrier during a period associated with an extended active time of the second DRX group.

In some examples, scheduling information for the first carrier or one or more other carriers of the first DRX group is transmitted via the first carrier based on the first timer irrespective of whether the second carrier is inside or outside of the active time associated with the second DRX group. In some examples, scheduling information for the first carrier or one or more other carriers of the first DRX group is transmitted via the first carrier during a period associated with an extended active time of the second DRX group.

In some examples, to support transmitting the first control information communication, the scheduling manager 1530 may be configured as or otherwise support a means for transmitting, via the first carrier, scheduling information for the first carrier or the second carrier during periods in which the first DRX group and the second DRX group are both in an active time. In some examples, to support transmitting the first control information communication, the scheduling manager 1530 may be configured as or otherwise support a means for determining that at least one or the first DRX group or the second DRX group is inactive. In some examples, to support transmitting the first control information communication, the scheduling manager 1530 may be configured as or otherwise support a means for discontinuing transmissions of scheduling information via the first carrier for the second carrier responsive to the determining.

Additionally, or alternatively, the communications manager 1520 may support wireless communications at a network entity in accordance with examples as disclosed herein. In some examples, the carrier aggregation manager 1535 may be configured as or otherwise support a means for transmitting configuration information to at least a first UE for at least a first carrier associated in a first DRX group, a second carrier in a second DRX group. In some examples, the DRX configuration manager 1525 may be configured as or otherwise support a means for determining that the first DRX group and the second DRX group have different timers for associated active times at each respective DRX group. In some examples, the scheduling manager 1530 may be configured as or otherwise support a means for transmitting, responsive to the determining, a first control information communication via the first carrier that indicates a resource allocation only for communications via one or more carriers in the first DRX group. In some examples, the scheduling manager 1530 may be configured as or otherwise support a means for transmitting, responsive to the determining, a second control information communication via the second carrier that indicates a resource allocation only for communications via one or more carriers in the second DRX group.

In some examples, each of two or more carriers in each of the first DRX group and the second DRX group are within a same frequency band. In some examples, a first carrier of the first DRX group and a second carrier of the first DRX group are in different frequency bands. In some examples, each of two or more carriers in each of the first DRX group and the second DRX group have a same subcarrier spacing. In some examples, different carriers within one or more of the first DRX group or the second DRX group have different subcarrier spacings.

Figure 16:
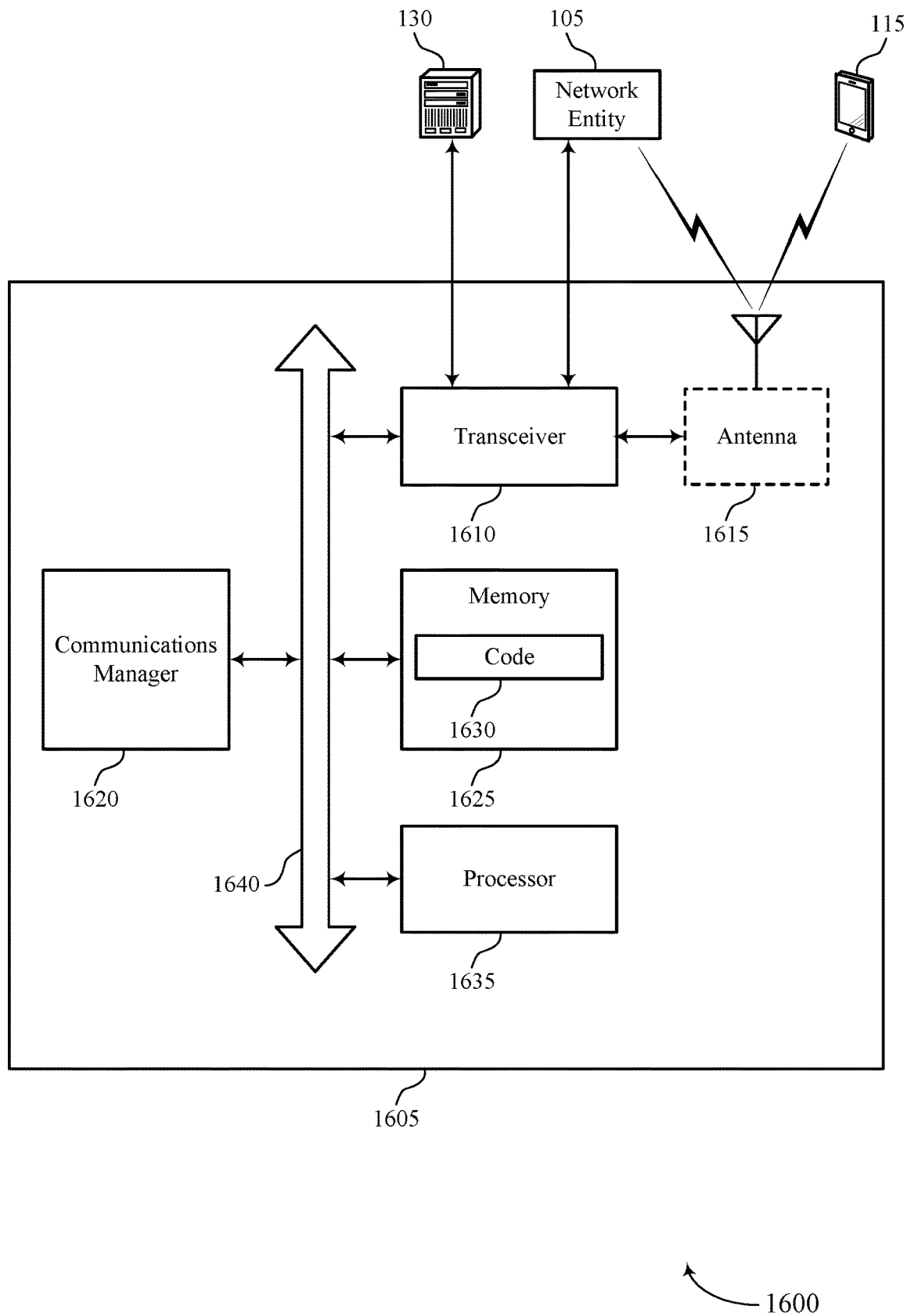
FIG. 16 illustrates a diagram of a system including a device that supports cross-carrier scheduling techniques for multiple DRX groups in accordance with one or more aspects of the present disclosure.

FIG. 16 illustrates a diagram of a system 1600 including a device 1605 that supports cross-carrier scheduling techniques for multiple DRX groups in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or memory components (for example, the processor 1635, or the memory 1625, or both), may be included in a chip or chip assembly that is installed in the device 1605. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting cross-carrier scheduling techniques for multiple DRX groups). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605. The processor 1635 may be any one or more suitable processors capable of executing scripts or instructions of one or more software programs stored in the device 1605 (such as within the memory 1625). In some implementations, the processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1605 may transmit information output from the chip or modem. Additionally, or alternatively, in some implementations, the one or more interfaces may refer to an interface between the processing system of the chip or modem and a receiver, such that the device 1605 may obtain information or signal inputs, and the information may be passed to the processing system. A person having ordinary skill in the art will readily recognize that a first interface also may obtain information or signal inputs, and a second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communications at a network entity in accordance with examples as disclosed herein. For example, the communications manager 1620 may be configured as or otherwise support a means for transmitting configuration information to at least a first UE for at least a first carrier in a first DRX group and a second carrier in a second DRX group, the configuration information including at least a first timer associated with the first DRX group and a second timer associated with the second DRX group, where scheduling information associated with the second carrier is provided via the first carrier. The communications manager 1620 may be configured as or otherwise support a means for transmitting, via the first carrier, a first control information communication that indicates a resource allocation for communications via the second carrier based on the first timer associated with the first DRX group, the second timer associated with the second DRX group, or both the first timer and the second timer. The communications manager 1620 may be configured as or otherwise support a means for communicating with the UE via the second carrier based on a resource allocation provided with the first control information communication via the first carrier.

Additionally, or alternatively, the communications manager 1620 may support wireless communications at a network entity in accordance with examples as disclosed herein. For example, the communications manager 1620 may be configured as or otherwise support a means for transmitting configuration information to at least a first UE for at least a first carrier associated in a first DRX group, a second carrier in a second DRX group. The communications manager 1620 may be configured as or otherwise support a means for determining that the first DRX group and the second DRX group have different timers for associated active times at each respective DRX group. The communications manager 1620 may be configured as or otherwise support a means for transmitting, responsive to the determining, a first control information communication via the first carrier that indicates a resource allocation only for communications via one or more carriers in the first DRX group. The communications manager 1620 may be configured as or otherwise support a means for transmitting, responsive to the determining, a second control information communication via the second carrier that indicates a resource allocation only for communications via one or more carriers in the second DRX group.

By including or configuring the communications manager 1620 in accordance with examples as described herein, the device 1605 may support techniques for cross-carrier scheduling for different component carriers that may be configured in different DRX groups. Such techniques may provide for enhanced network efficiency through scheduling of multiple carriers via a scheduling carrier that may be located in a different frequency band and in a different DRX group than one or more scheduled carriers. Further, such techniques may provide for reduced power consumption, such as through reduced DRX active times on one or more carriers in a higher frequency band (e.g., one or more FR2 carriers) that consume relatively higher power than a carrier on a lower frequency band (e.g., a scheduling carrier on FR1).

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, the processor 1635, the memory 1625, the code 1630, or any combination thereof. For example, the code 1630 may include instructions executable by the processor 1635 to cause the device 1605 to perform various aspects of cross-carrier scheduling techniques for multiple DRX groups as described herein, or the processor 1635 and the memory 1625 may be otherwise configured to perform or support such operations.

Figure 17:
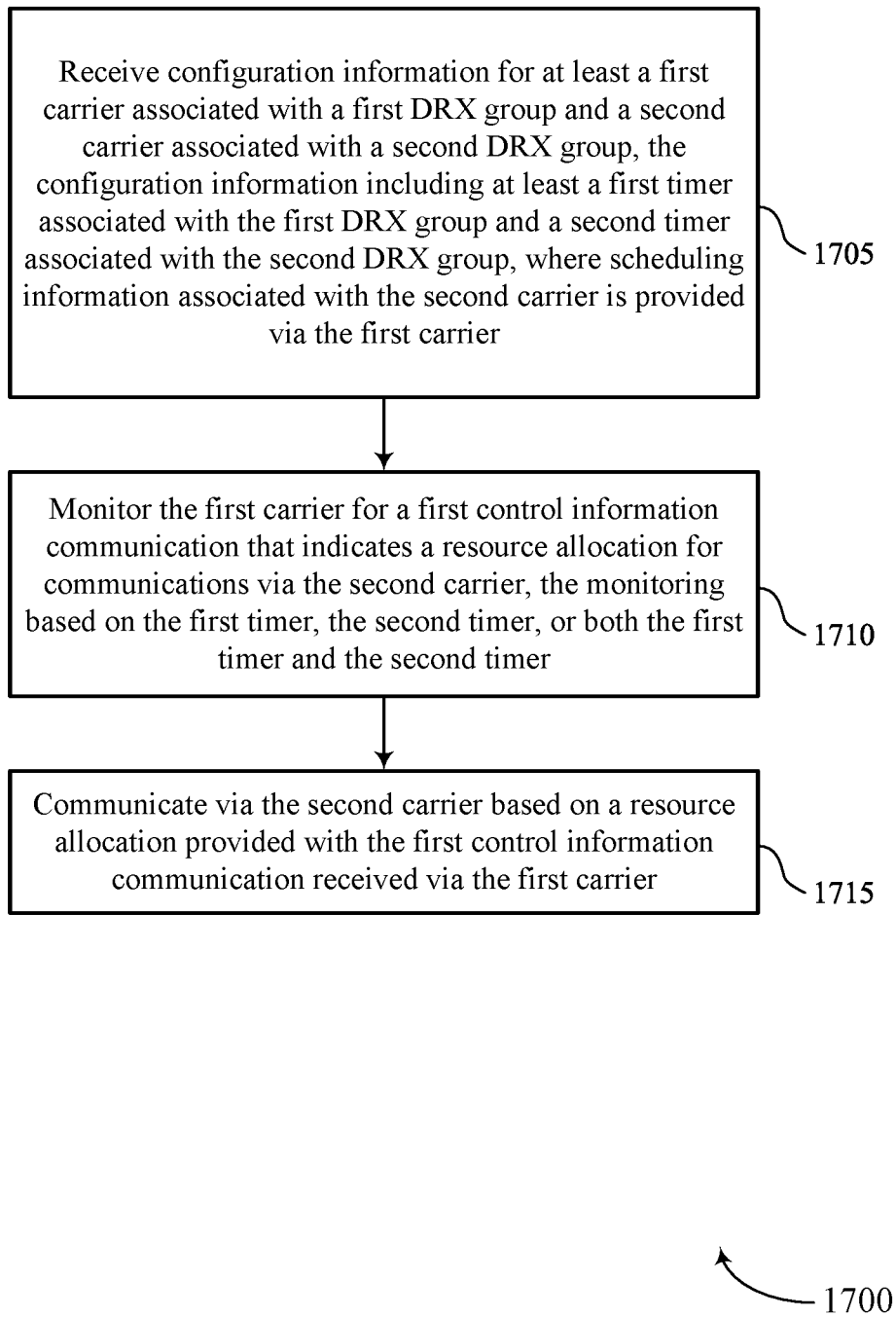
FIGS. 17 through 29 illustrate flowcharts showing methods that support cross-carrier scheduling techniques for multiple DRX groups in accordance with one or more aspects of the present disclosure.

FIG. 17 illustrates a flowchart illustrating a method 1700 that supports cross-carrier scheduling techniques for multiple DRX groups in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving configuration information for at least a first carrier associated with a first DRX group and a second carrier associated with a second DRX group, the configuration information including at least a first timer associated with the first DRX group and a second timer associated with the second DRX group, where scheduling information associated with the second carrier is provided via the first carrier. The operations of 1705 may be performed in accordance with examples as disclosed herein. In some examples, aspects of the operations of 1705 may be performed by a DRX configuration manager 1125 as described with reference to FIG. 11.

At 1710, the method may include monitoring the first carrier for a first control information communication that indicates a resource allocation for communications via the second carrier, the monitoring based on the first timer, the second timer, or both the first timer and the second timer. The operations of 1710 may be performed in accordance with examples as disclosed herein. In some examples, aspects of the operations of 1710 may be performed by a scheduling manager 1130 as described with reference to FIG. 11.

At 1715, the method may include communicating via the second carrier based on a resource allocation provided with the first control information communication received via the first carrier. The operations of 1715 may be performed in accordance with examples as disclosed herein. In some examples, aspects of the operations of 1715 may be performed by a carrier aggregation manager 1135 as described with reference to FIG. 11.

Figure 18:
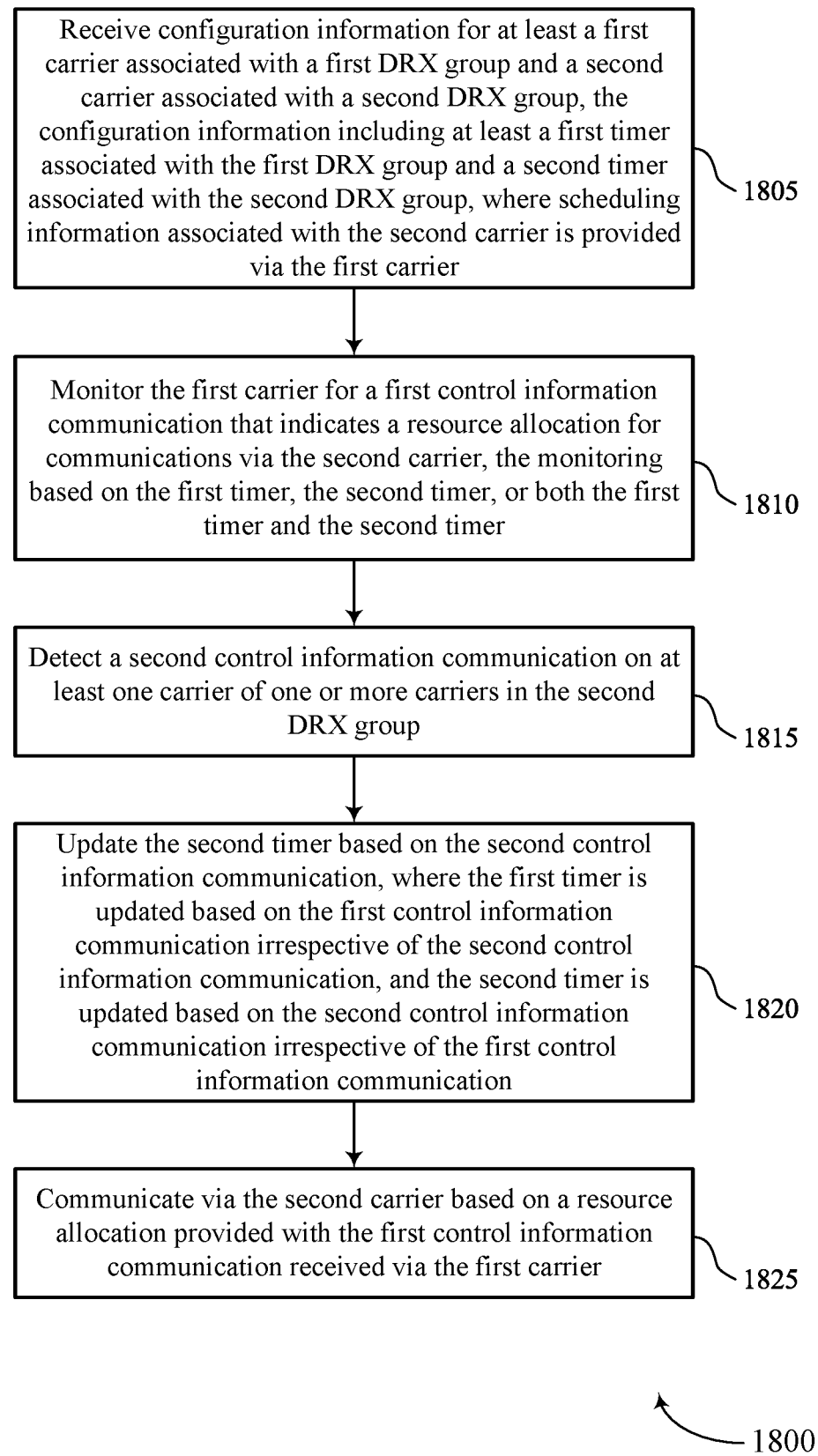

FIG. 18 illustrates a flowchart illustrating a method 1800 that supports cross-carrier scheduling techniques for multiple DRX groups in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving configuration information for at least a first carrier associated with a first DRX group and a second carrier associated with a second DRX group, the configuration information including at least a first timer associated with the first DRX group and a second timer associated with the second DRX group, where scheduling information associated with the second carrier is provided via the first carrier. The operations of 1805 may be performed in accordance with examples as disclosed herein. In some examples, aspects of the operations of 1805 may be performed by a DRX configuration manager 1125 as described with reference to FIG. 11.

At 1810, the method may include monitoring the first carrier for a first control information communication that indicates a resource allocation for communications via the second carrier, the monitoring based on the first timer, the second timer, or both the first timer and the second timer. The operations of 1810 may be performed in accordance with examples as disclosed herein. In some examples, aspects of the operations of 1810 may be performed by a scheduling manager 1130 as described with reference to FIG. 11.

At 1815, the method may include detecting a second control information communication on at least one carrier of one or more carriers in the second DRX group. The operations of 1815 may be performed in accordance with examples as disclosed herein. In some examples, aspects of the operations of 1815 may be performed by a scheduling manager 1130 as described with reference to FIG. 11.

At 1820, the method may include updating the second timer based on the second control information communication, where the first timer is updated based on the first control information communication irrespective of the second control information communication, and the second timer is updated based on the second control information communication irrespective of the first control information communication. The operations of 1820 may be performed in accordance with examples as disclosed herein. In some examples, aspects of the operations of 1820 may be performed by a DRX timer manager 1140 as described with reference to FIG. 11.

At 1825, the method may include communicating via the second carrier based on a resource allocation provided with the first control information communication received via the first carrier. The operations of 1825 may be performed in accordance with examples as disclosed herein. In some examples, aspects of the operations of 1825 may be performed by a carrier aggregation manager 1135 as described with reference to FIG. 11.

Figure 19:
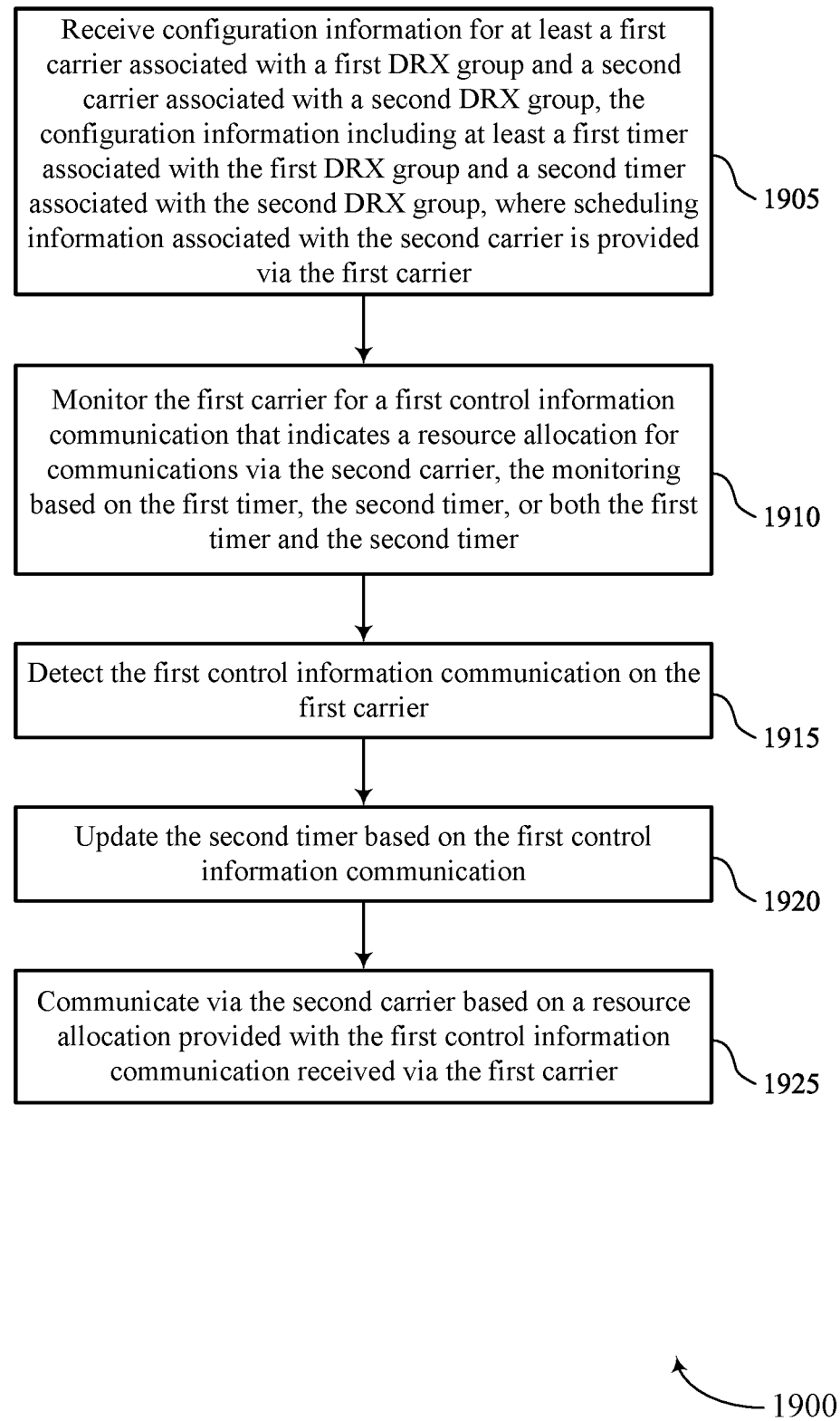

FIG. 19 illustrates a flowchart illustrating a method 1900 that supports cross-carrier scheduling techniques for multiple DRX groups in accordance with one or more aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1905, the method may include receiving configuration information for at least a first carrier associated with a first DRX group and a second carrier associated with a second DRX group, the configuration information including at least a first timer associated with the first DRX group and a second timer associated with the second DRX group, where scheduling information associated with the second carrier is provided via the first carrier. The operations of 1905 may be performed in accordance with examples as disclosed herein. In some examples, aspects of the operations of 1905 may be performed by a DRX configuration manager 1125 as described with reference to FIG. 11.

At 1910, the method may include monitoring the first carrier for a first control information communication that indicates a resource allocation for communications via the second carrier, the monitoring based on the first timer, the second timer, or both the first timer and the second timer. The operations of 1910 may be performed in accordance with examples as disclosed herein. In some examples, aspects of the operations of 1910 may be performed by a scheduling manager 1130 as described with reference to FIG. 11.

At 1915, the method may include detecting the first control information communication on the first carrier. The operations of 1915 may be performed in accordance with examples as disclosed herein. In some examples, aspects of the operations of 1915 may be performed by a scheduling manager 1130 as described with reference to FIG. 11.

At 1920, the method may include updating the second timer based on the first control information communication. The operations of 1920 may be performed in accordance with examples as disclosed herein. In some examples, aspects of the operations of 1920 may be performed by a DRX timer manager 1140 as described with reference to FIG. 11.

At 1925, the method may include communicating via the second carrier based on a resource allocation provided with the first control information communication received via the first carrier. The operations of 1925 may be performed in accordance with examples as disclosed herein. In some examples, aspects of the operations of 1925 may be performed by a carrier aggregation manager 1135 as described with reference to FIG. 11.

Figure 20:
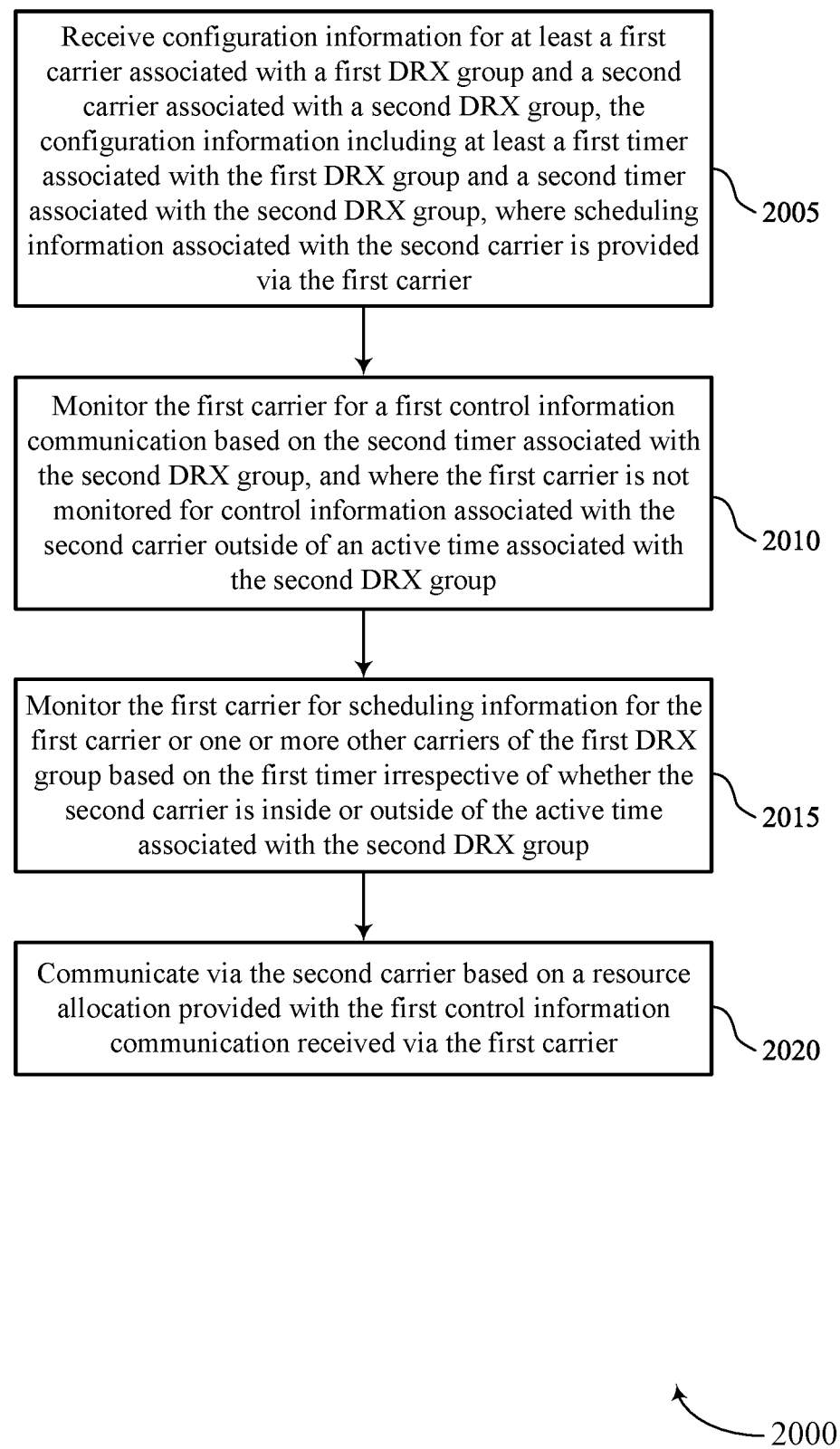

FIG. 20 illustrates a flowchart illustrating a method 2000 that supports cross-carrier scheduling techniques for multiple DRX groups in accordance with one or more aspects of the present disclosure. The operations of the method 2000 may be implemented by a UE or its components as described herein. For example, the operations of the method 2000 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2005, the method may include receiving configuration information for at least a first carrier associated with a first DRX group and a second carrier associated with a second DRX group, the configuration information including at least a first timer associated with the first DRX group and a second timer associated with the second DRX group, where scheduling information associated with the second carrier is provided via the first carrier. The operations of 2005 may be performed in accordance with examples as disclosed herein. In some examples, aspects of the operations of 2005 may be performed by a DRX configuration manager 1125 as described with reference to FIG. 11.

At 2010, the method may include monitoring the first carrier for a first control information communication based on the second timer associated with the second DRX group, and where the first carrier is not monitored for control information associated with the second carrier outside of an active time associated with the second DRX group. The operations of 2010 may be performed in accordance with examples as disclosed herein. In some examples, aspects of the operations of 2010 may be performed by a DRX timer manager 1140 as described with reference to FIG. 11.

At 2015, the method may include monitoring the first carrier for scheduling information for the first carrier or one or more other carriers of the first DRX group based on the first timer irrespective of whether the second carrier is inside or outside of the active time associated with the second DRX group. The operations of 2015 may be performed in accordance with examples as disclosed herein. In some examples, aspects of the operations of 2015 may be performed by a scheduling manager 1130 as described with reference to FIG. 11.

At 2020, the method may include communicating via the second carrier based on a resource allocation provided with the first control information communication received via the first carrier. The operations of 2020 may be performed in accordance with examples as disclosed herein. In some examples, aspects of the operations of 2020 may be performed by a carrier aggregation manager 1135 as described with reference to FIG. 11.

Figure 21:
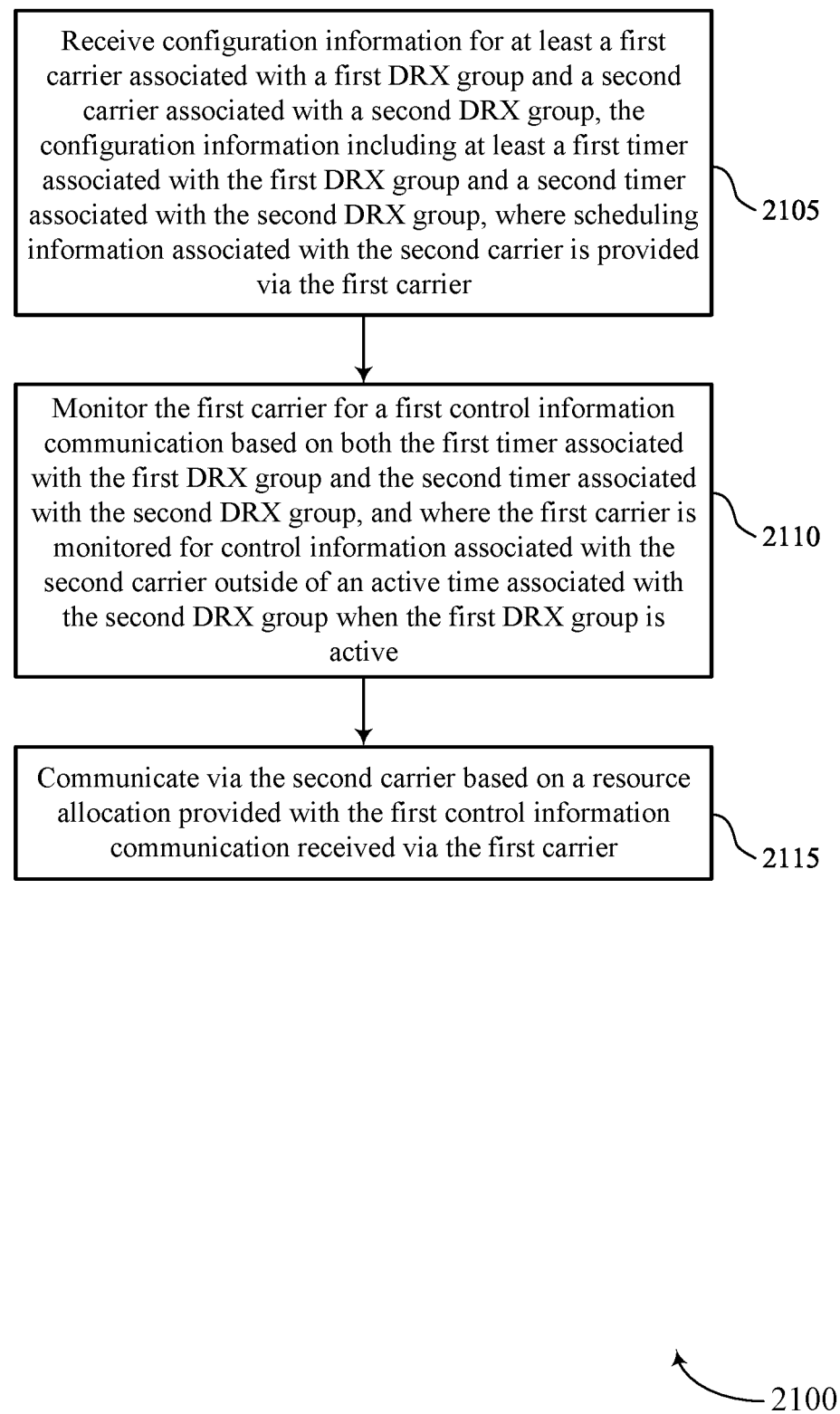

FIG. 21 illustrates a flowchart illustrating a method 2100 that supports cross-carrier scheduling techniques for multiple DRX groups in accordance with one or more aspects of the present disclosure. The operations of the method 2100 may be implemented by a UE or its components as described herein. For example, the operations of the method 2100 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2105, the method may include receiving configuration information for at least a first carrier associated with a first DRX group and a second carrier associated with a second DRX group, the configuration information including at least a first timer associated with the first DRX group and a second timer associated with the second DRX group, where scheduling information associated with the second carrier is provided via the first carrier. The operations of 2105 may be performed in accordance with examples as disclosed herein. In some examples, aspects of the operations of 2105 may be performed by a DRX configuration manager 1125 as described with reference to FIG. 11.

At 2110, the method may include monitoring the first carrier for a first control information communication based on both the first timer associated with the first DRX group and the second timer associated with the second DRX group, and where the first carrier is monitored for control information associated with the second carrier outside of an active time associated with the second DRX group when the first DRX group is active. The operations of 2110 may be performed in accordance with examples as disclosed herein. In some examples, aspects of the operations of 2110 may be performed by a DRX timer manager 1140 as described with reference to FIG. 11.

At 2115, the method may include communicating via the second carrier based on a resource allocation provided with the first control information communication received via the first carrier. The operations of 2115 may be performed in accordance with examples as disclosed herein. In some examples, aspects of the operations of 2115 may be performed by a carrier aggregation manager 1135 as described with reference to FIG. 11.

Figure 22:
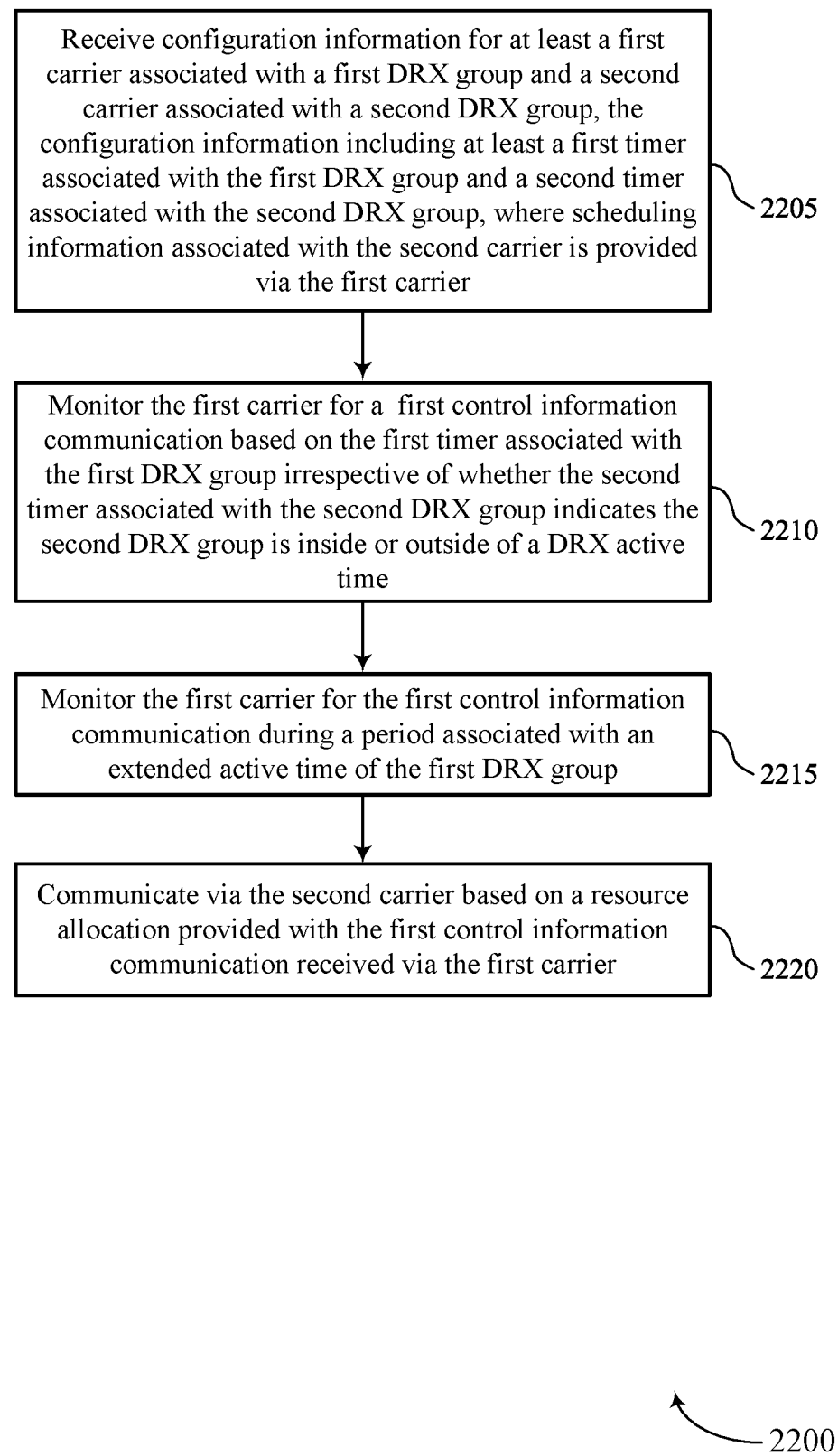

FIG. 22 illustrates a flowchart illustrating a method 2200 that supports cross-carrier scheduling techniques for multiple DRX groups in accordance with one or more aspects of the present disclosure. The operations of the method 2200 may be implemented by a UE or its components as described herein. For example, the operations of the method 2200 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2205, the method may include receiving configuration information for at least a first carrier associated with a first DRX group and a second carrier associated with a second DRX group, the configuration information including at least a first timer associated with the first DRX group and a second timer associated with the second DRX group, where scheduling information associated with the second carrier is provided via the first carrier. The operations of 2205 may be performed in accordance with examples as disclosed herein. In some examples, aspects of the operations of 2205 may be performed by a DRX configuration manager 1125 as described with reference to FIG. 11.

At 2210, the method may include monitoring the first carrier for a first control information communication based on the first timer associated with the first DRX group irrespective of whether the second timer associated with the second DRX group indicates the second DRX group is inside or outside of a DRX active time. The operations of 2210 may be performed in accordance with examples as disclosed herein. In some examples, aspects of the operations of 2210 may be performed by a DRX timer manager 1140 as described with reference to FIG. 11.

At 2215, the method may include monitoring the first carrier for the first control information communication during a period associated with an extended active time of the first DRX group. The operations of 2215 may be performed in accordance with examples as disclosed herein. In some examples, aspects of the operations of 2215 may be performed by a DRX timer manager 1140 as described with reference to FIG. 11.

At 2220, the method may include communicating via the second carrier based on a resource allocation provided with the first control information communication received via the first carrier. The operations of 2220 may be performed in accordance with examples as disclosed herein. In some examples, aspects of the operations of 2220 may be performed by a carrier aggregation manager 1135 as described with reference to FIG. 11.

Figure 23:
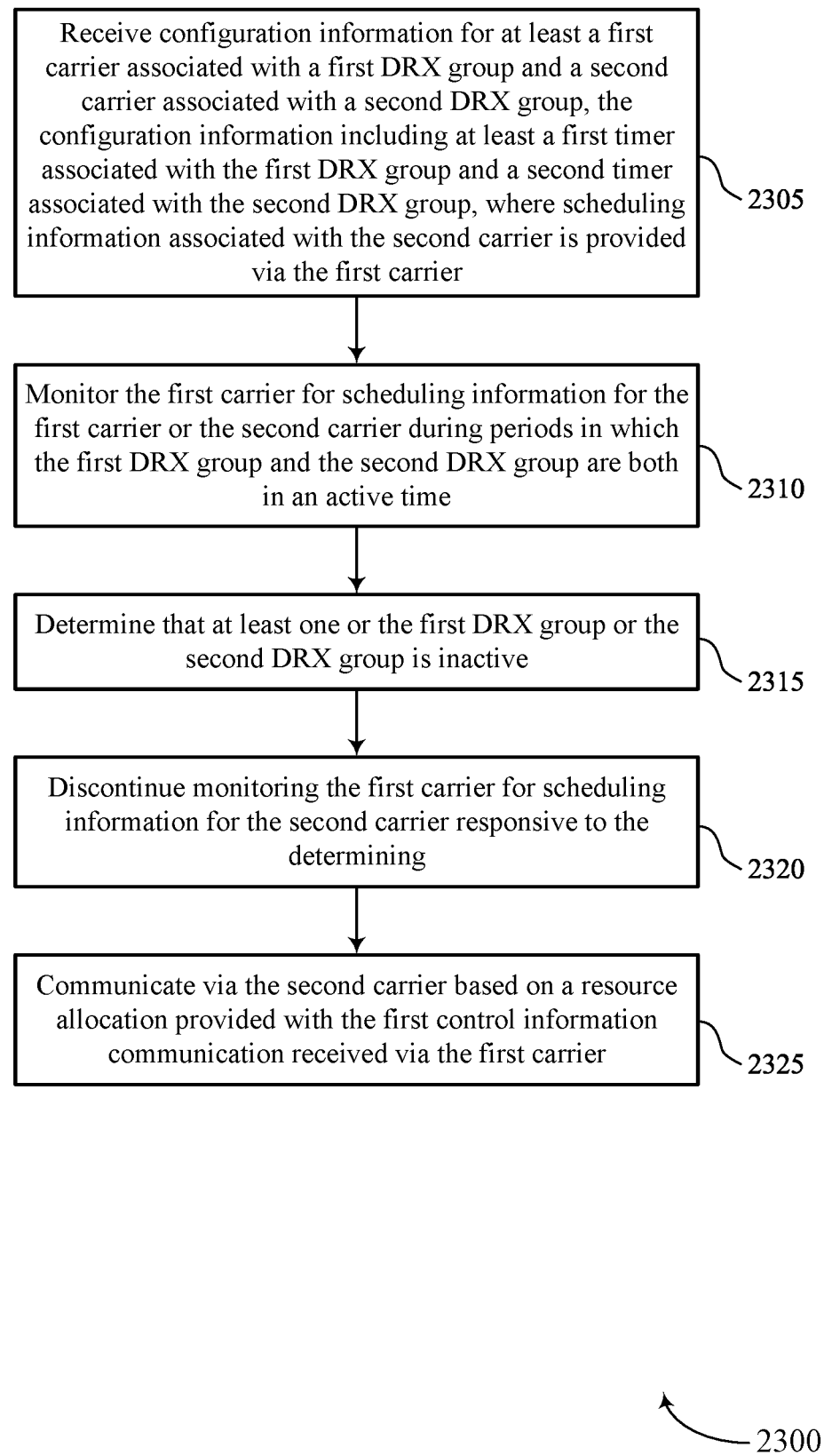

FIG. 23 illustrates a flowchart illustrating a method 2300 that supports cross-carrier scheduling techniques for multiple DRX groups in accordance with one or more aspects of the present disclosure. The operations of the method 2300 may be implemented by a UE or its components as described herein. For example, the operations of the method 2300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2305, the method may include receiving configuration information for at least a first carrier associated with a first DRX group and a second carrier associated with a second DRX group, the configuration information including at least a first timer associated with the first DRX group and a second timer associated with the second DRX group, where scheduling information associated with the second carrier is provided via the first carrier. The operations of 2305 may be performed in accordance with examples as disclosed herein. In some examples, aspects of the operations of 2305 may be performed by a DRX configuration manager 1125 as described with reference to FIG. 11.

At 2310, the method may include monitoring the first carrier for scheduling information for the first carrier or the second carrier during periods in which the first DRX group and the second DRX group are both in an active time. The operations of 2310 may be performed in accordance with examples as disclosed herein. In some examples, aspects of the operations of 2310 may be performed by a scheduling manager 1130 as described with reference to FIG. 11.

At 2315, the method may include determining that at least one of the first DRX group or the second DRX group is inactive. The operations of 2315 may be performed in accordance with examples as disclosed herein. In some examples, aspects of the operations of 2315 may be performed by a scheduling manager 1130 as described with reference to FIG. 11.

At 2320, the method may include discontinuing monitoring the first carrier for scheduling information for the second carrier responsive to the determining. The operations of 2320 may be performed in accordance with examples as disclosed herein. In some examples, aspects of the operations of 2320 may be performed by a scheduling manager 1130 as described with reference to FIG. 11.

At 2325, the method may include communicating via the second carrier based on a resource allocation provided with the first control information communication received via the first carrier. The operations of 2325 may be performed in accordance with examples as disclosed herein. In some examples, aspects of the operations of 2325 may be performed by a carrier aggregation manager 1135 as described with reference to FIG. 11.

Figure 24:
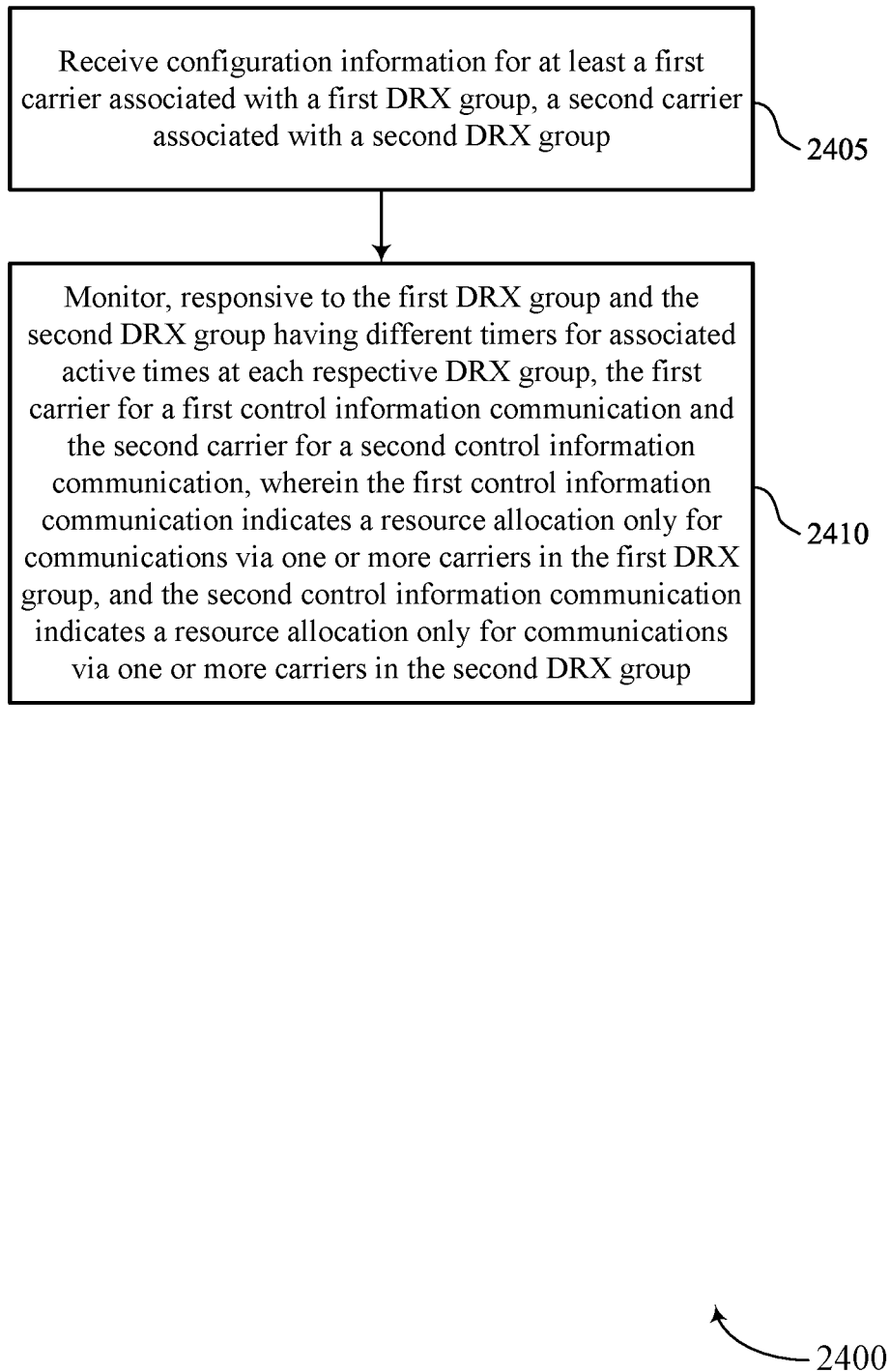

FIG. 24 illustrates a flowchart illustrating a method 2400 that supports cross-carrier scheduling techniques for multiple DRX groups in accordance with one or more aspects of the present disclosure. The operations of the method 2400 may be implemented by a UE or its components as described herein. For example, the operations of the method 2400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2405, the method may include receiving configuration information for at least a first carrier associated with a first DRX group, a second carrier associated with a second DRX group. The operations of 2405 may be performed in accordance with examples as disclosed herein. In some examples, aspects of the operations of 2405 may be performed by a carrier aggregation manager 1135 as described with reference to FIG. 11.

At 2410, the method may include monitoring, responsive to the first DRX group and the second DRX group having different timers for associated active times at each respective DRX group, the first carrier for a first control information communication and the second carrier for a second control information communication, wherein the first control information communication indicates a resource allocation only for communications via one or more carriers in the first DRX group, and the second control information communication indicates a resource allocation only for communications via one or more carriers in the second DRX group. The operations of 2410 may be performed in accordance with examples as disclosed herein. In some examples, aspects of the operations of 2410 may be performed by a scheduling manager 1130 as described with reference to FIG. 11.

Figure 25:
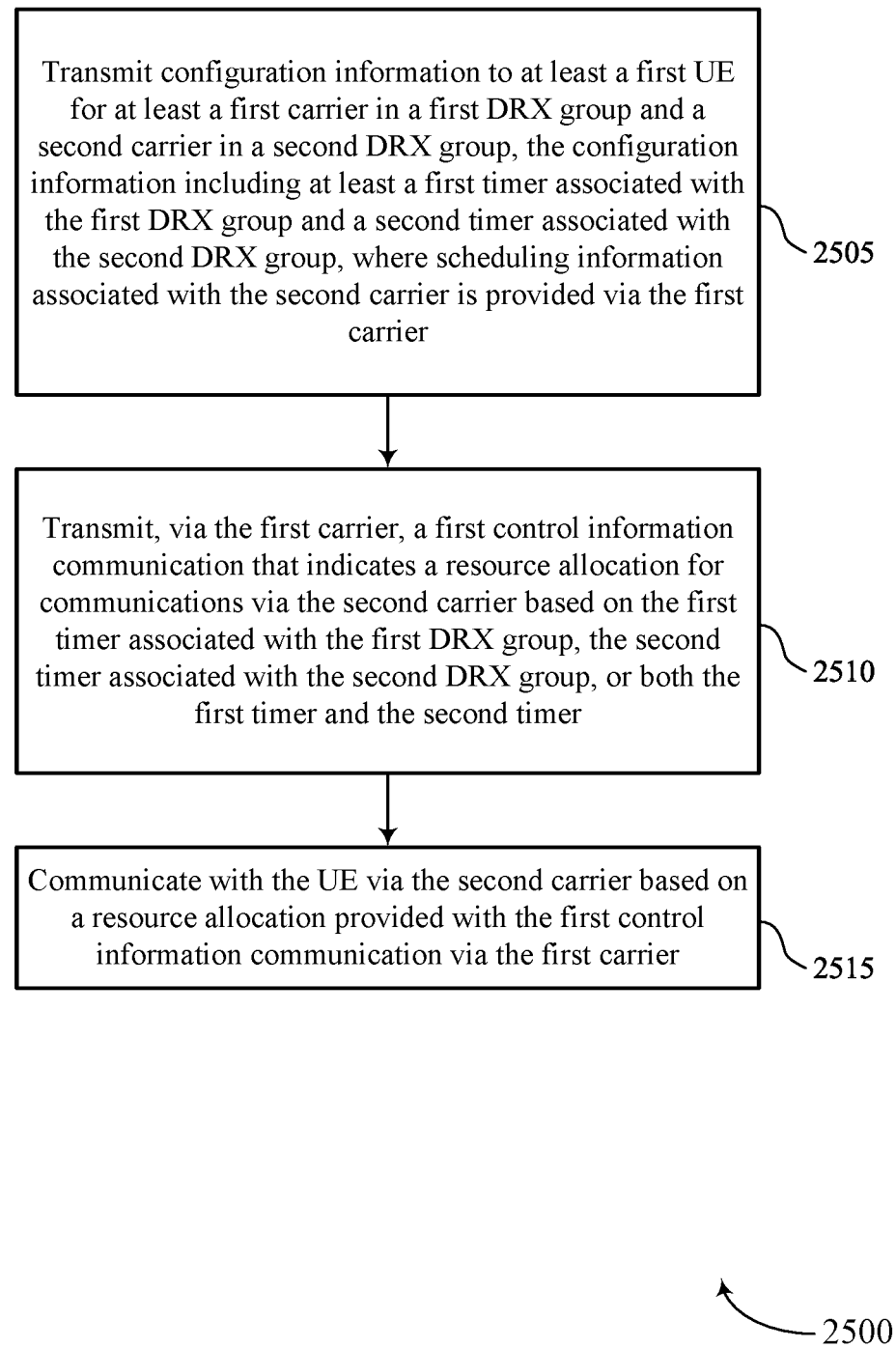

FIG. 25 illustrates a flowchart illustrating a method 2500 that supports cross-carrier scheduling techniques for multiple DRX groups in accordance with one or more aspects of the present disclosure. The operations of the method 2500 may be implemented by a network entity or its components as described herein. For example, the operations of the method 2500 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2505, the method may include transmitting configuration information to at least a first UE for at least a first carrier in a first DRX group and a second carrier in a second DRX group, the configuration information including at least a first timer associated with the first DRX group and a second timer associated with the second DRX group, where scheduling information associated with the second carrier is provided via the first carrier. The operations of 2505 may be performed in accordance with examples as disclosed herein. In some examples, aspects of the operations of 2505 may be performed by a DRX configuration manager 1525 as described with reference to FIG. 15.

At 2510, the method may include transmitting, via the first carrier, a first control information communication that indicates a resource allocation for communications via the second carrier based on the first timer associated with the first DRX group, the second timer associated with the second DRX group, or both the first timer and the second timer. The operations of 2510 may be performed in accordance with examples as disclosed herein. In some examples, aspects of the operations of 2510 may be performed by a scheduling manager 1530 as described with reference to FIG. 15.

At 2515, the method may include communicating with the UE via the second carrier based on a resource allocation provided with the first control information communication via the first carrier. The operations of 2515 may be performed in accordance with examples as disclosed herein. In some examples, aspects of the operations of 2515 may be performed by a carrier aggregation manager 1535 as described with reference to FIG. 15.

Figure 26:
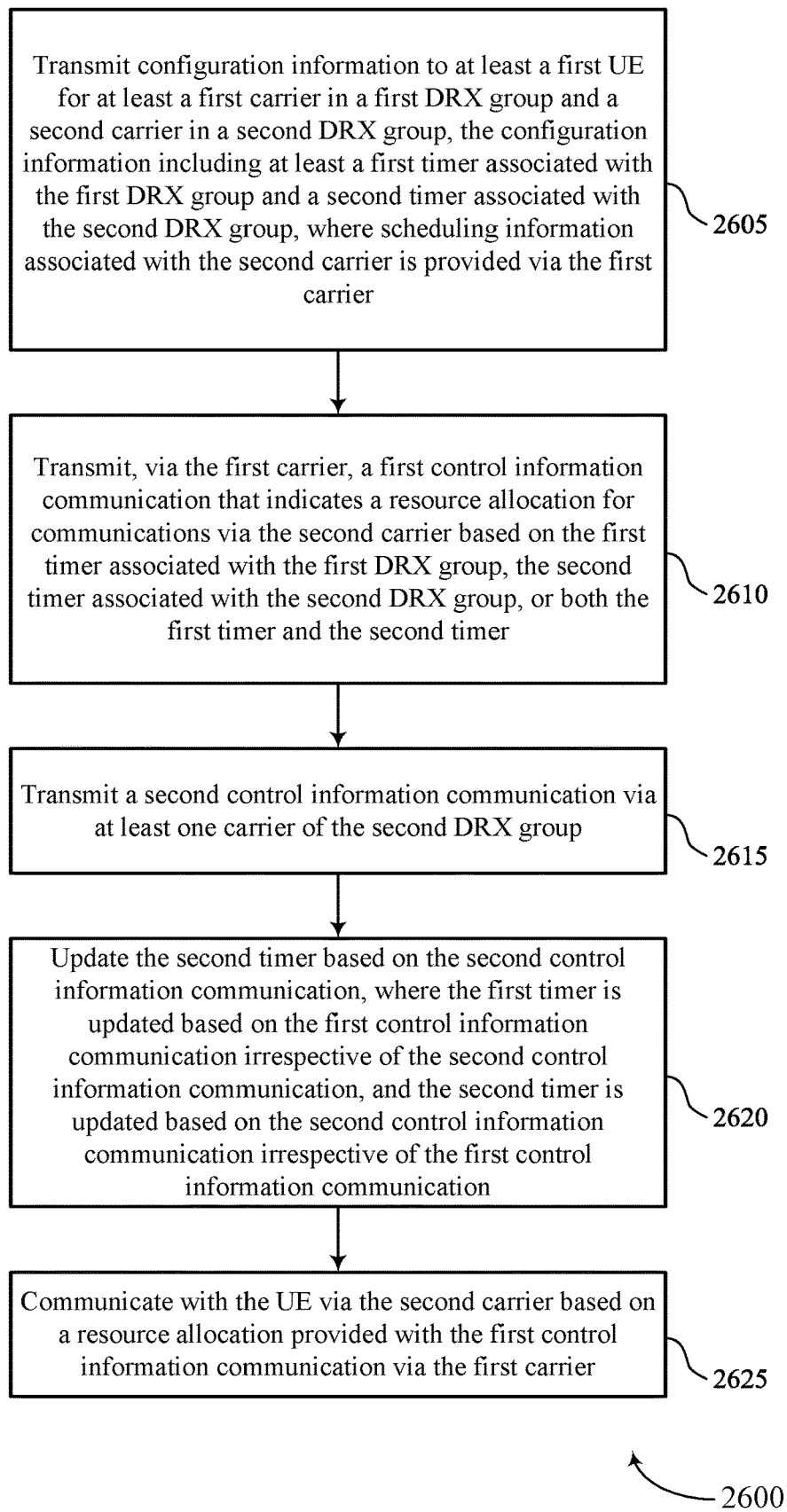

FIG. 26 illustrates a flowchart illustrating a method 2600 that supports cross-carrier scheduling techniques for multiple DRX groups in accordance with one or more aspects of the present disclosure. The operations of the method 2600 may be implemented by a network entity or its components as described herein. For example, the operations of the method 2600 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2605, the method may include transmitting configuration information to at least a first UE for at least a first carrier in a first DRX group and a second carrier in a second DRX group, the configuration information including at least a first timer associated with the first DRX group and a second timer associated with the second DRX group, where scheduling information associated with the second carrier is provided via the first carrier. The operations of 2605 may be performed in accordance with examples as disclosed herein. In some examples, aspects of the operations of 2605 may be performed by a DRX configuration manager 1525 as described with reference to FIG. 15.

At 2610, the method may include transmitting, via the first carrier, a first control information communication that indicates a resource allocation for communications via the second carrier based on the first timer associated with the first DRX group, the second timer associated with the second DRX group, or both the first timer and the second timer. The operations of 2610 may be performed in accordance with examples as disclosed herein. In some examples, aspects of the operations of 2610 may be performed by a scheduling manager 1530 as described with reference to FIG. 15.

At 2615, the method may include transmitting a second control information communication via at least one carrier of the second DRX group. The operations of 2615 may be performed in accordance with examples as disclosed herein. In some examples, aspects of the operations of 2615 may be performed by a scheduling manager 1530 as described with reference to FIG. 15.

At 2620, the method may include updating the second timer based on the second control information communication, where the first timer is updated based on the first control information communication irrespective of the second control information communication, and the second timer is updated based on the second control information communication irrespective of the first control information communication. The operations of 2620 may be performed in accordance with examples as disclosed herein. In some examples, aspects of the operations of 2620 may be performed by a DRX timer manager 1540 as described with reference to FIG. 15.

At 2625, the method may include communicating with the UE via the second carrier based on a resource allocation provided with the first control information communication via the first carrier. The operations of 2625 may be performed in accordance with examples as disclosed herein. In some examples, aspects of the operations of 2625 may be performed by a carrier aggregation manager 1535 as described with reference to FIG. 15.

Figure 27:
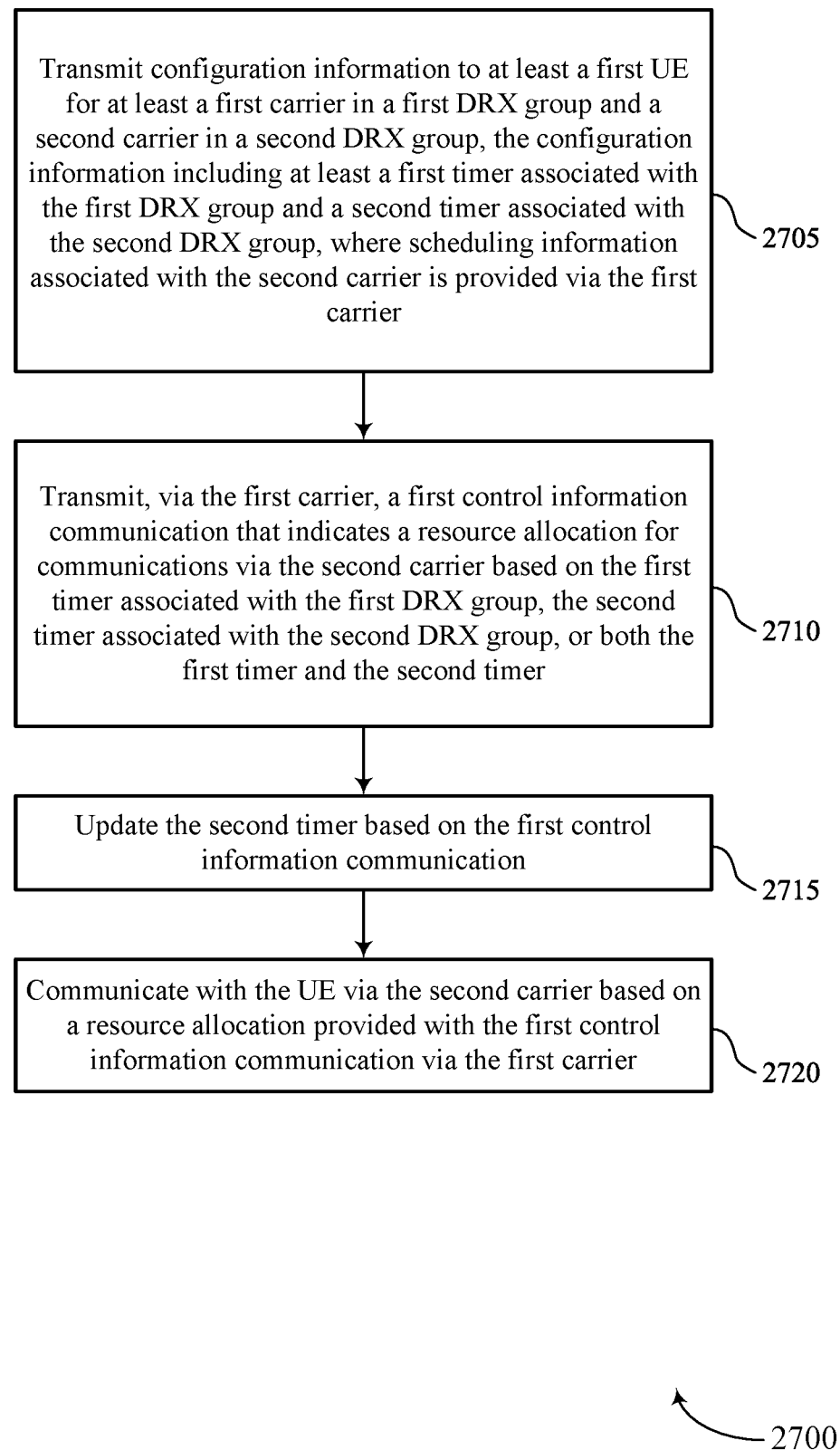

FIG. 27 illustrates a flowchart illustrating a method 2700 that supports cross-carrier scheduling techniques for multiple DRX groups in accordance with one or more aspects of the present disclosure. The operations of the method 2700 may be implemented by a network entity or its components as described herein. For example, the operations of the method 2700 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2705, the method may include transmitting configuration information to at least a first UE for at least a first carrier in a first DRX group and a second carrier in a second DRX group, the configuration information including at least a first timer associated with the first DRX group and a second timer associated with the second DRX group, where scheduling information associated with the second carrier is provided via the first carrier. The operations of 2705 may be performed in accordance with examples as disclosed herein. In some examples, aspects of the operations of 2705 may be performed by a DRX configuration manager 1525 as described with reference to FIG. 15.

At 2710, the method may include transmitting, via the first carrier, a first control information communication that indicates a resource allocation for communications via the second carrier based on the first timer associated with the first DRX group, the second timer associated with the second DRX group, or both the first timer and the second timer. The operations of 2710 may be performed in accordance with examples as disclosed herein. In some examples, aspects of the operations of 2710 may be performed by a scheduling manager 1530 as described with reference to FIG. 15.

At 2715, the method may include updating the second timer based on the first control information communication. The operations of 2715 may be performed in accordance with examples as disclosed herein. In some examples, aspects of the operations of 2715 may be performed by a DRX timer manager 1540 as described with reference to FIG. 15.

At 2720, the method may include communicating with the UE via the second carrier based on a resource allocation provided with the first control information communication via the first carrier. The operations of 2720 may be performed in accordance with examples as disclosed herein. In some examples, aspects of the operations of 2720 may be performed by a carrier aggregation manager 1535 as described with reference to FIG. 15.

Figure 28:
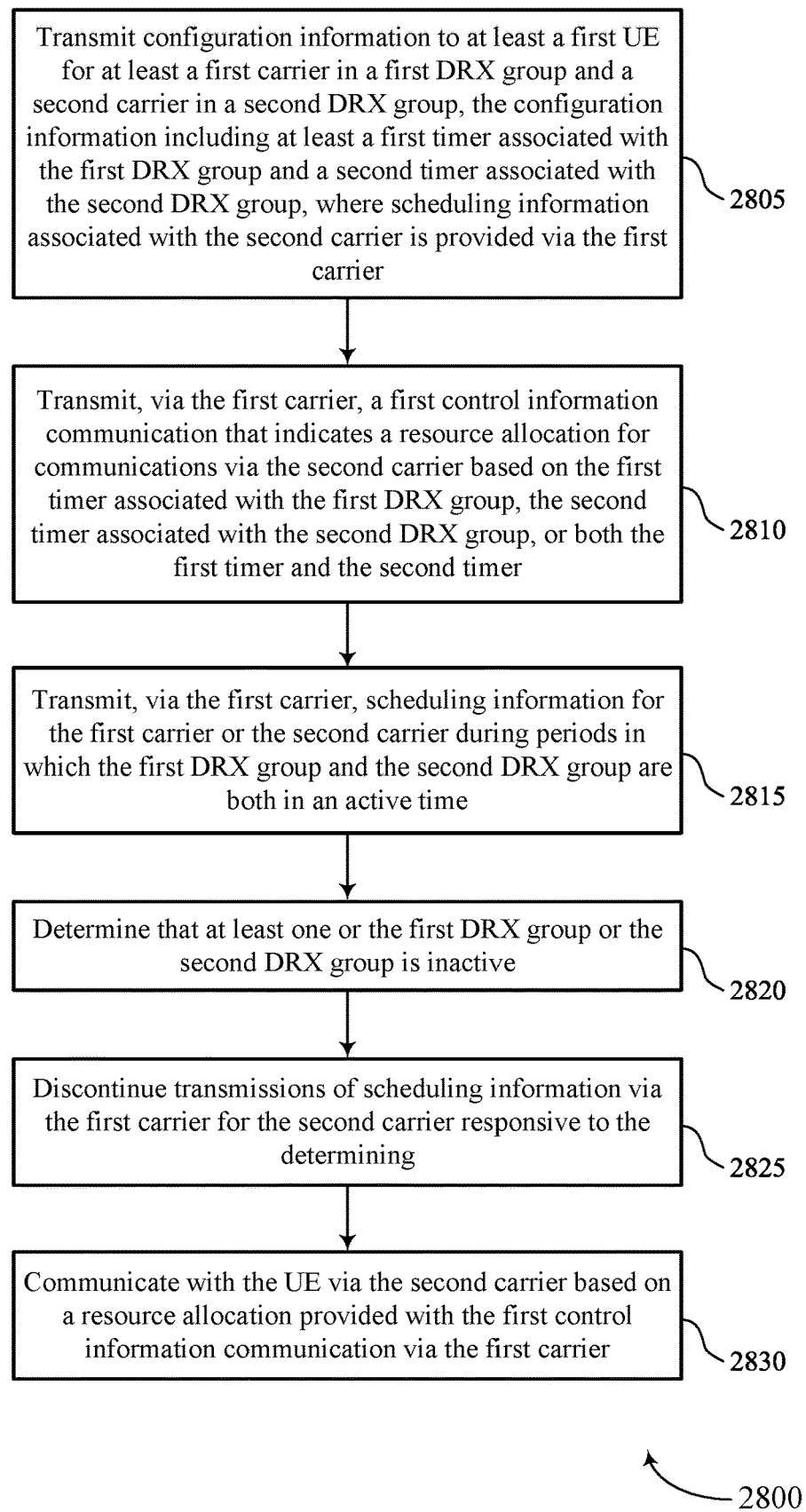

FIG. 28 illustrates a flowchart illustrating a method 2800 that supports cross-carrier scheduling techniques for multiple DRX groups in accordance with one or more aspects of the present disclosure. The operations of the method 2800 may be implemented by a network entity or its components as described herein. For example, the operations of the method 2800 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2805, the method may include transmitting configuration information to at least a first UE for at least a first carrier in a first DRX group and a second carrier in a second DRX group, the configuration information including at least a first timer associated with the first DRX group and a second timer associated with the second DRX group, where scheduling information associated with the second carrier is provided via the first carrier. The operations of 2805 may be performed in accordance with examples as disclosed herein. In some examples, aspects of the operations of 2805 may be performed by a DRX configuration manager 1525 as described with reference to FIG. 15.

At 2810, the method may include transmitting, via the first carrier, a first control information communication that indicates a resource allocation for communications via the second carrier based on the first timer associated with the first DRX group, the second timer associated with the second DRX group, or both the first timer and the second timer. The operations of 2810 may be performed in accordance with examples as disclosed herein. In some examples, aspects of the operations of 2810 may be performed by a scheduling manager 1530 as described with reference to FIG. 15.

At 2815, the method may include transmitting, via the first carrier, scheduling information for the first carrier or the second carrier during periods in which the first DRX group and the second DRX group are both in an active time. The operations of 2815 may be performed in accordance with examples as disclosed herein. In some examples, aspects of the operations of 2815 may be performed by a scheduling manager 1530 as described with reference to FIG. 15.

At 2820, the method may include determining that at least one or the first DRX group or the second DRX group is inactive. The operations of 2820 may be performed in accordance with examples as disclosed herein. In some examples, aspects of the operations of 2820 may be performed by a scheduling manager 1530 as described with reference to FIG. 15.

At 2825, the method may include discontinuing transmissions of scheduling information via the first carrier for the second carrier responsive to the determining. The operations of 2825 may be performed in accordance with examples as disclosed herein. In some examples, aspects of the operations of 2825 may be performed by a scheduling manager 1530 as described with reference to FIG. 15.

At 2830, the method may include communicating with the UE via the second carrier based on a resource allocation provided with the first control information communication via the first carrier. The operations of 2830 may be performed in accordance with examples as disclosed herein. In some examples, aspects of the operations of 2830 may be performed by a carrier aggregation manager 1535 as described with reference to FIG. 15.

Figure 29:
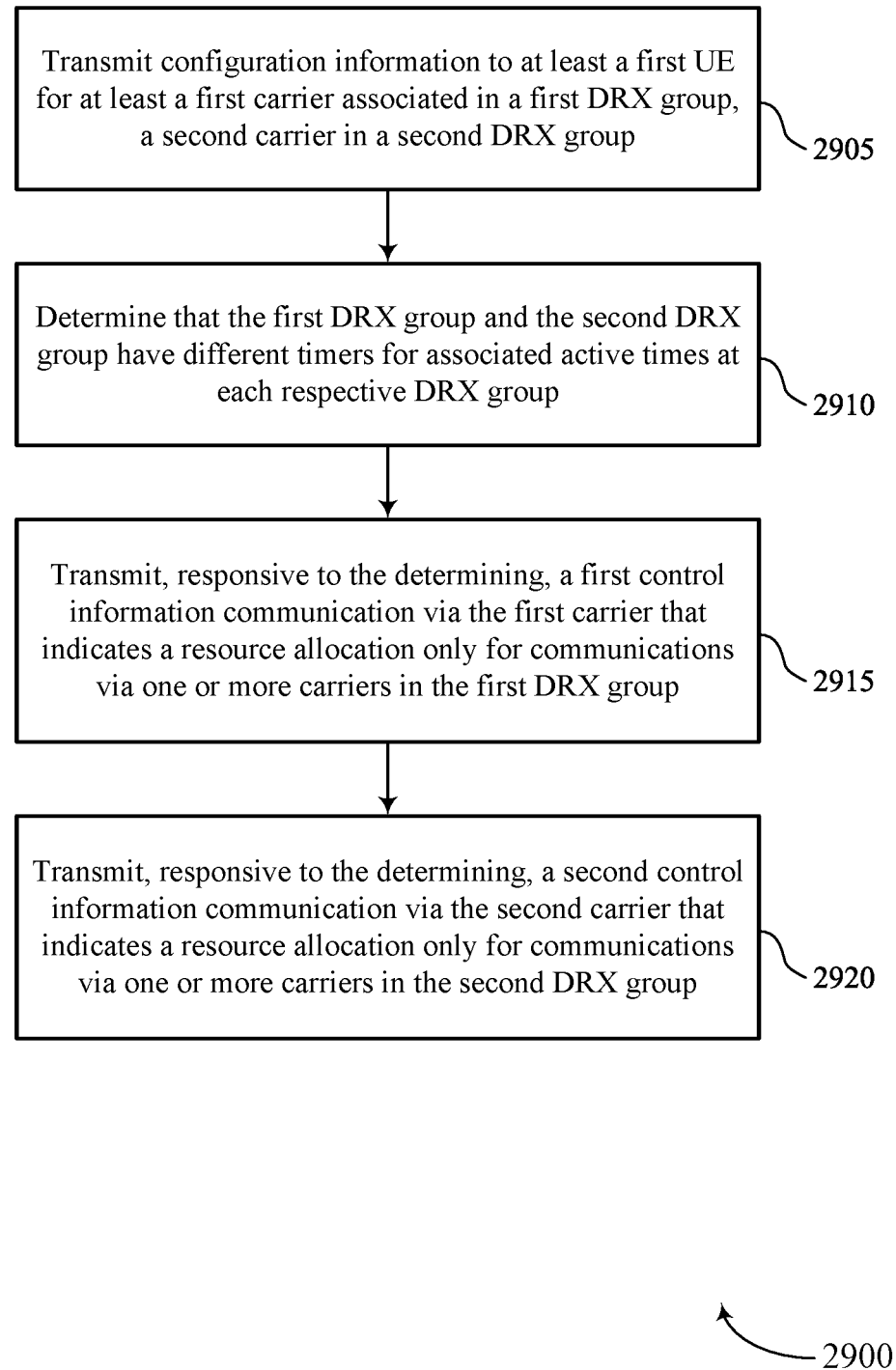

FIG. 29 illustrates a flowchart illustrating a method 2900 that supports cross-carrier scheduling techniques for multiple DRX groups in accordance with one or more aspects of the present disclosure. The operations of the method 2900 may be implemented by a network entity or its components as described herein. For example, the operations of the method 2900 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2905, the method may include transmitting configuration information to at least a first UE for at least a first carrier associated in a first DRX group, a second carrier in a second DRX group. The operations of 2905 may be performed in accordance with examples as disclosed herein. In some examples, aspects of the operations of 2905 may be performed by a carrier aggregation manager 1535 as described with reference to FIG. 15.

At 2910, the method may include determining that the first DRX group and the second DRX group have different timers for associated active times at each respective DRX group. The operations of 2910 may be performed in accordance with examples as disclosed herein. In some examples, aspects of the operations of 2910 may be performed by a DRX configuration manager 1525 as described with reference to FIG. 15.

At 2915, the method may include transmitting, responsive to the determining, a first control information communication via the first carrier that indicates a resource allocation only for communications via one or more carriers in the first DRX group. The operations of 2915 may be performed in accordance with examples as disclosed herein. In some examples, aspects of the operations of 2915 may be performed by a scheduling manager 1530 as described with reference to FIG. 15.

At 2920, the method may include transmitting, responsive to the determining, a second control information communication via the second carrier that indicates a resource allocation only for communications via one or more carriers in the second DRX group. The operations of 2920 may be performed in accordance with examples as disclosed herein. In some examples, aspects of the operations of 2920 may be performed by a scheduling manager 1530 as described with reference to FIG. 15.

The following provides an overview of aspects of the present disclosure:

Aspect 1: A method for wireless communications at a UE, comprising: receiving configuration information for at least a first carrier associated with a first discontinuous reception group and a second carrier associated with a second discontinuous reception group, the configuration information including at least a first timer associated with the first discontinuous reception group and a second timer associated with the second discontinuous reception group, wherein scheduling information associated with the second carrier is provided via the first carrier; monitoring the first carrier for a first control information communication that indicates a resource allocation for communications via the second carrier, the monitoring based at least in part on the first timer, the second timer, or both the first timer and the second timer; and communicating via the second carrier based at least in part on a resource allocation provided with the first control information communication received via the first carrier.

Aspect 2: The method of aspect 1, further comprising: detecting a second control information communication on at least one carrier of one or more carriers in the second discontinuous reception group; and updating the second timer based at least in part on the second control information communication, wherein the first timer is updated based on the first control information communication irrespective of the second control information communication, and the second timer is updated based on the second control information communication irrespective of the first control information communication.

Aspect 3: The method of aspect 2, wherein the first timer and the second timer include one or more of a discontinuous reception inactivity timer, a downlink acknowledgment feedback timer, an uplink acknowledgment feedback timer, or any combinations thereof, associated with the first discontinuous reception group or the second discontinuous reception group, that are started or restarted responsive to a control channel transmission on a serving cell of the associated first discontinuous reception group or second discontinuous reception group.

Aspect 4: The method of any of aspects 1 through 3, further comprising: detecting the first control information communication on the first carrier; and updating the second timer based at least in part on the first control information communication.

Aspect 5: The method of aspect 4, wherein the second timer includes one or more of a discontinuous reception inactivity timer, a downlink acknowledgment feedback timer, an uplink acknowledgment feedback timer, or any combinations thereof, associated with the second discontinuous reception group, that are started or restarted responsive to the first control information communication or a control information communication received via a carrier in the second discontinuous reception group.

Aspect 6: The method of aspect 1, wherein the monitoring the first carrier comprises: monitoring the first carrier for the first control information communication based at least in part on the second timer associated with the second discontinuous reception group, and wherein the first carrier is not monitored for control information associated with the second carrier outside of an active time associated with the second discontinuous reception group.

Aspect 7: The method of aspect 6, wherein the active time associated with the second discontinuous reception group is based at least in part on one or more of an on-duration timer, a discontinuous reception inactivity timer, a downlink acknowledgment feedback timer, an uplink acknowledgment feedback timer, or any combinations thereof, associated with the second discontinuous reception group.

Aspect 8: The method of any of aspects 6 through 7, further comprising: monitoring the first carrier for scheduling information for the first carrier or one or more other carriers of the first discontinuous reception group based on the first timer irrespective of whether the second carrier is inside or outside of the active time associated with the second discontinuous reception group.

Aspect 9: The method of aspect 1, wherein the monitoring the first carrier comprises: monitoring the first carrier for the first control information communication based at least in part on both the first timer associated with the first discontinuous reception group and the second timer associated with the second discontinuous reception group, and wherein the first carrier is monitored for control information associated with the second carrier outside of an active time associated with the second discontinuous reception group when the first discontinuous reception group is active.

Aspect 10: The method of aspect 9, wherein the first control information communication is received outside of the active time associated with the second discontinuous reception group and wherein the second timer is restarted to reinitiate the active time associated with the second discontinuous reception group.

Aspect 11: The method of aspect 10, wherein the resource allocation for communications via the second carrier has an associated scheduling delay between a reception time of the first control information communication and a start of communications via resources indicated in the resource allocation.

Aspect 12: The method of aspect 11, wherein the scheduling delay is an indicated or predefined number of slots, and wherein a value of the number of slots is based at least in part on a subcarrier spacing of one or more of the first carrier or the second carrier.

Aspect 13: The method of any of aspects 11 through 12, wherein the scheduling delay is applied for control information received for the second carrier outside of the active time associated with the second discontinuous reception group, and is not applied subsequent to restarting the second timer.

Aspect 14: The method of aspect 1, wherein the monitoring the first carrier comprises: monitoring the first carrier for the first control information communication based at least in part on the first timer associated with the first discontinuous reception group irrespective of whether the second timer associated with the second discontinuous reception group indicates the second discontinuous reception group in inside or outside of a discontinuous reception active time.

Aspect 15: The method of aspect 14, wherein the monitoring the first carrier further comprises: monitoring the first carrier for the first control information communication during a period associated with an extended active time of the first discontinuous reception group.

Aspect 16: The method of aspect 1, wherein the monitoring the first carrier comprises: monitoring the first carrier for the first control information communication based at least in part on the second timer associated with the second discontinuous reception group irrespective of whether the first timer associated with the first discontinuous reception group indicates the first discontinuous reception group in inside or outside of a discontinuous reception active time.

Aspect 17: The method of aspect 16, wherein the monitoring the first carrier further comprises: monitoring the first carrier for the first control information communication during a period associated with an extended active time of the second discontinuous reception group.

Aspect 18: The method of any of aspects 16 through 17, wherein the monitoring the first carrier further comprises: monitoring the first carrier for scheduling information for the first carrier or one or more other carriers of the first discontinuous reception group based on the first timer irrespective of whether the second carrier is inside or outside of the active time associated with the second discontinuous reception group.

Aspect 19: The method of any of aspects 16 through 18, wherein the monitoring the first carrier further comprises: monitoring the first carrier for scheduling information for the first carrier or one or more other carriers of the first discontinuous reception group during a period associated with an extended active time of the second discontinuous reception group.

Aspect 20: The method of aspect 1, wherein the monitoring the first carrier comprises: monitoring the first carrier for scheduling information for the first carrier or the second carrier during periods in which the first discontinuous reception group and the second discontinuous reception group are both in an active time; determining that at least one or the first discontinuous reception group or the second discontinuous reception group is inactive; and discontinuing monitoring the first carrier for scheduling information for the second carrier responsive to the determining.

Aspect 21: A method for wireless communications at a UE, comprising: receiving configuration information for at least a first carrier associated with a first discontinuous reception group, a second carrier associated with a second discontinuous reception group; and monitoring, responsive to the first DRX group and the second DRX group having different timers for associated active times at each respective DRX group, the first carrier for a first control information communication and the second carrier for a second control information communication, wherein the first control information communication indicates a resource allocation only for communications via one or more carriers in the first DRX group, and the second control information communication indicates a resource allocation only for communications via one or more carriers in the second DRX group.

Aspect 22: The method of aspect 21, wherein each of two or more carriers in each of the first discontinuous reception group and the second discontinuous reception group are within a same frequency band.

Aspect 23: The method of aspect 21, wherein a first carrier of the first discontinuous reception group and a second carrier of the first discontinuous reception group are in different frequency bands.

Aspect 24: The method of any of aspects 21 through 23, wherein each of two or more carriers in each of the first discontinuous reception group and the second discontinuous reception group have a same subcarrier spacing.

Aspect 25: The method of any of aspects 21 through 23, wherein different carriers within one or more of the first discontinuous reception group or the second discontinuous reception group have different subcarrier spacings.

Aspect 26: A method for wireless communications at a network entity, comprising: transmitting configuration information to at least a first UE for at least a first carrier in a first discontinuous reception group and a second carrier in a second discontinuous reception group, the configuration information including at least a first timer associated with the first discontinuous reception group and a second timer associated with the second discontinuous reception group, wherein scheduling information associated with the second carrier is provided via the first carrier; transmitting, via the first carrier, a first control information communication that indicates a resource allocation for communications via the second carrier based at least in part on the first timer associated with the first discontinuous reception group, the second timer associated with the second discontinuous reception group, or both the first timer and the second timer; and communicating with the UE via the second carrier based at least in part on a resource allocation provided with the first control information communication via the first carrier.

Aspect 27: The method of aspect 26, further comprising: transmitting a second control information communication via at least one carrier of the second discontinuous reception group; and updating the second timer based at least in part on the second control information communication, wherein the first timer is updated based on the first control information communication irrespective of the second control information communication, and the second timer is updated based on the second control information communication irrespective of the first control information communication.

Aspect 28: The method of aspect 27, wherein the first timer and the second timer include one or more of a discontinuous reception inactivity timer, a downlink acknowledgment feedback timer, an uplink acknowledgment feedback timer, or any combinations thereof, associated with the first discontinuous reception group or the second discontinuous reception group, that are started or restarted responsive to a control channel transmission on a serving cell of the associated first discontinuous reception group or second discontinuous reception group.

Aspect 29: The method of aspect 26, further comprising: updating the second timer based at least in part on the first control information communication.

Aspect 30: The method of aspect 29, wherein the second timer includes one or more of a discontinuous reception inactivity timer, a downlink acknowledgment feedback timer, an uplink acknowledgment feedback timer, or any combinations thereof, associated with the second discontinuous reception group, that are started or restarted responsive to the first control information communication or a control information communication transmitted via a carrier in the second discontinuous reception group.

Aspect 31: The method of aspect 26, wherein the first control information communication is transmitted based at least in part on the second timer associated with the second discontinuous reception group, and wherein control information associated with the second carrier is not transmitted via the first carrier outside of an active time associated with the second discontinuous reception group.

Aspect 32: The method of aspect 31, wherein the active time associated with the second discontinuous reception group is based at least in part on one or more of an on-duration timer, a discontinuous reception inactivity timer, a downlink acknowledgment feedback timer, an uplink acknowledgment feedback timer, or any combinations thereof, associated with the second discontinuous reception group.

Aspect 33: The method of any of aspects 31 through 32, wherein scheduling information for the first carrier or one or more other carriers of the first discontinuous reception group is transmitted via the first carrier based on the first timer irrespective of whether the second carrier is inside or outside of the active time associated with the second discontinuous reception group.

Aspect 34: The method of aspect 26, wherein the first control information communication is transmitted via the first carrier based at least in part on both the first timer associated with the first discontinuous reception group and the second timer associated with the second discontinuous reception group, and wherein control information associated with the second carrier is transmitted via the first carrier outside of an active time associated with the second discontinuous reception group when the first discontinuous reception group is active.

Aspect 35: The method of aspect 34, wherein the first control information communication is transmitted outside of the active time associated with the second discontinuous reception group and wherein the second timer is restarted to reinitiate the active time associated with the second discontinuous reception group.

Aspect 36: The method of aspect 35, wherein the resource allocation for communications via the second carrier has an associated scheduling delay between a transmission time of the first control information communication and a start of communications via resources indicated in the resource allocation.

Aspect 37: The method of aspect 36, wherein the scheduling delay is an indicated or predefined number of slots, and wherein a value of the number of slots is based at least in part on a subcarrier spacing of one or more of the first carrier or the second carrier.

Aspect 38: The method of any of aspects 36 through 37, wherein the scheduling delay is applied for control information for the second carrier transmitted outside of the active time associated with the second discontinuous reception group, and is not applied subsequent to restarting the second timer.

Aspect 39: The method of aspect 26, wherein the first control information communication is transmitted via the first carrier based at least in part on the first timer associated with the first discontinuous reception group irrespective of whether the second timer associated with the second discontinuous reception group indicates the second discontinuous reception group in inside or outside of a discontinuous reception active time.

Aspect 40: The method of aspect 39, wherein the first control information communication is transmitted via the first carrier during a period associated with an extended active time of the first discontinuous reception group.

Aspect 41: The method of aspect 26, wherein the first control information communication is transmitted via the first carrier based at least in part on the second timer associated with the second discontinuous reception group irrespective of whether the first timer associated with the first discontinuous reception group indicates the first discontinuous reception group in inside or outside of a discontinuous reception active time.

Aspect 42: The method of aspect 41, wherein the first control information communication is transmitted via the first carrier during a period associated with an extended active time of the second discontinuous reception group.

Aspect 43: The method of any of aspects 41 through 42, wherein scheduling information for the first carrier or one or more other carriers of the first discontinuous reception group is transmitted via the first carrier based on the first timer irrespective of whether the second carrier is inside or outside of the active time associated with the second discontinuous reception group.

Aspect 44: The method of any of aspects 41 through 43, wherein scheduling information for the first carrier or one or more other carriers of the first discontinuous reception group is transmitted via the first carrier during a period associated with an extended active time of the second discontinuous reception group.

Aspect 45: The method of aspect 26, wherein the transmitting the first control information communication comprises: transmitting, via the first carrier, scheduling information for the first carrier or the second carrier during periods in which the first discontinuous reception group and the second discontinuous reception group are both in an active time; determining that at least one or the first discontinuous reception group or the second discontinuous reception group is inactive; and discontinuing transmissions of scheduling information via the first carrier for the second carrier responsive to the determining.

Aspect 46: A method for wireless communications at a network entity, comprising: transmitting configuration information to at least a first UE for at least a first carrier associated in a first discontinuous reception group, a second carrier in a second discontinuous reception group; determining that the first discontinuous reception group and the second discontinuous reception group have different timers for associated active times at each respective discontinuous reception group; transmitting, responsive to the determining, a first control information communication via the first carrier that indicates a resource allocation only for communications via one or more carriers in the first discontinuous reception group; and transmitting, responsive to the determining, a second control information communication via the second carrier that indicates a resource allocation only for communications via one or more carriers in the second discontinuous reception group.

Aspect 47: The method of aspect 46, wherein each of two or more carriers in each of the first discontinuous reception group and the second discontinuous reception group are within a same frequency band.

Aspect 48: The method of aspect 46, wherein a first carrier of the first discontinuous reception group and a second carrier of the first discontinuous reception group are in different frequency bands.

Aspect 49: The method of any of aspects 46 through 48, wherein each of two or more carriers in each of the first discontinuous reception group and the second discontinuous reception group have a same subcarrier spacing.

Aspect 50: The method of any of aspects 46 through 48, wherein different carriers within one or more of the first discontinuous reception group or the second discontinuous reception group have different subcarrier spacings.

Aspect 51: A UE for wireless communication, comprising one or more memories storing processor-executable code; and one or more processors coupled with the one or more memories and individually or collectively operable to execute the code to cause the UE to perform a method of any of aspects 1 through 20.

Aspect 52: A UE for wireless communication, comprising at least one means for performing a method of any of aspects 1 through 20.

Aspect 53: A non-transitory computer-readable medium storing code for wireless communications at a UE, the code comprising instructions executable by one or more processors to perform a method of any of aspects 1 through 20.

Aspect 54: A UE for wireless communication, comprising one or more memories storing processor-executable code; and one or more processors coupled with the one or more memories and individually or collectively operable to execute the code to cause the UE to perform a method of any of aspects 21 through 25.

Aspect 55: A UE for wireless communication, comprising at least one means for performing a method of any of aspects 21 through 25.

Aspect 56: A non-transitory computer-readable medium storing code for wireless communications at a UE, the code comprising instructions executable by one or more processors to perform a method of any of aspects 21 through 25.

Aspect 57: A network entity for wireless communication, comprising one or more memories storing processor-executable code; and one or more processors coupled with the one or more memories and individually or collectively operable to execute the code to cause the network entity to perform a method of any of aspects 26 through 45.

Aspect 58: A network entity for wireless communication, comprising at least one means for performing a method of any of aspects 26 through 45.

Aspect 59: A non-transitory computer-readable medium storing code for wireless communications at a network entity, the code comprising instructions executable by one or more processors to perform a method of any of aspects 26 through 45.

Aspect 60: A network entity for wireless communication, comprising one or more memories storing processor-executable code; and one or more processors coupled with the one or more memories and individually or collectively operable to execute the code to cause the network entity to perform a method of any of aspects 46 through 50.

Aspect 61: A network entity for wireless communication, comprising at least one means for performing a method of any of aspects 46 through 50.

Aspect 62: A non-transitory computer-readable medium storing code for wireless communications at a network entity, the code comprising instructions executable by one or more processors to perform a method of any of aspects 46 through 50.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   one or more memories storing processor-executable code; and one or more processors coupled with the one or more memories and individually or collectively operable to execute the code to cause the UE to:
  receive configuration information for at least a first carrier associated with a first discontinuous reception group and a second carrier associated with a second discontinuous reception group, the configuration information including at least a first timer associated with the first discontinuous reception group and a second timer associated with the second discontinuous reception group, wherein scheduling information associated with the second carrier is provided via the first carrier;
  monitor the first carrier for a first control information communication that indicates a resource allocation for communications via the second carrier, the first carrier monitored for the first control information communication based at least in part on the first timer, the second timer, or both the first timer and the second timer; and
  communicate via the second carrier based at least in part on a resource allocation provided with the first control information communication received via the first carrier.

2. The UE of claim 1, wherein the one or more processors are individually or collectively further operable to execute the code to cause the UE to:
  detect a second control information communication on at least one carrier of one or more carriers in the second discontinuous reception group; and
  update the second timer based at least in part on the second control information communication, wherein the first timer is updated based on the first control information communication irrespective of the second control information communication, and the second timer is updated based on the second control information communication irrespective of the first control information communication.

3. The UE of claim 2, wherein the first timer and the second timer include one or more of a discontinuous reception inactivity timer, a downlink acknowledgment feedback timer, an uplink acknowledgment feedback timer, or any combinations thereof, associated with the first discontinuous reception group or the second discontinuous reception group, that are started or restarted responsive to a control channel transmission on a serving cell of the associated first discontinuous reception group or second discontinuous reception group.

4. The UE of claim 1, wherein the one or more processors are individually or collectively further operable to execute the code to cause the UE to:
  detect the first control information communication on the first carrier; and
  update the second timer based at least in part on the first control information communication.

5. The UE of claim 4, wherein the second timer includes one or more of a discontinuous reception inactivity timer, a downlink acknowledgment feedback timer, an uplink acknowledgment feedback timer, or any combinations thereof, associated with the second discontinuous reception group, that are started or restarted responsive to the first control information communication or a control information communication received via a carrier in the second discontinuous reception group.

6. The UE of claim 1, wherein, to monitor the first carrier, the one or more processors are individually or collectively operable to execute the code to cause the UE to:
  monitor the first carrier for the first control information communication based at least in part on the second timer associated with the second discontinuous reception group, and wherein the first carrier is not monitored for control information associated with the second carrier outside of an active time associated with the second discontinuous reception group.

7. The UE of claim 6, wherein the active time associated with the second discontinuous reception group is based at least in part on one or more of an on-duration timer, a discontinuous reception inactivity timer, a downlink acknowledgment feedback timer, an uplink acknowledgment feedback timer, or any combinations thereof, associated with the second discontinuous reception group.

8. The UE of claim 6, wherein the one or more processors are individually or collectively further operable to execute the code to cause the UE to:
  monitor the first carrier for scheduling information for the first carrier or one or more other carriers of the first discontinuous reception group based on the first timer irrespective of whether the second carrier is inside or outside of the active time associated with the second discontinuous reception group.

9. The UE of claim 1, wherein, to monitor the first carrier, the one or more processors are individually or collectively operable to execute the code to cause the UE to:
  monitor the first carrier for the first control information communication based at least in part on both the first timer associated with the first discontinuous reception group and the second timer associated with the second discontinuous reception group, and wherein the first carrier is monitored for control information associated with the second carrier outside of an active time associated with the second discontinuous reception group when the first discontinuous reception group is active.

10. The UE of claim 9, wherein the first control information communication is received outside of the active time associated with the second discontinuous reception group and wherein the second timer is restarted to reinitiate the active time associated with the second discontinuous reception group.

11. The UE of claim 10, wherein the resource allocation for communications via the second carrier has an associated scheduling delay between a reception time of the first control information communication and a start of communications via resources indicated in the resource allocation, wherein the scheduling delay is an indicated or predefined number of slots and a value of the number of slots is based at least in part on a subcarrier spacing of one or more of the first carrier or the second carrier, and wherein the scheduling delay is applied for control information received for the second carrier outside of the active time associated with the second discontinuous reception group, and is not applied subsequent to restarting the second timer.

12. The UE of claim 1, wherein, to monitor the first carrier, the one or more processors are individually or collectively operable to execute the code to cause the UE to:
  monitor the first carrier for the first control information communication based at least in part on the first timer associated with the first discontinuous reception group irrespective of whether the second timer associated with the second discontinuous reception group indicates the second discontinuous reception group is inside or outside of a discontinuous reception active time; and monitor the first carrier for the first control information communication during a period associated with an extended active time of the first discontinuous reception group.

13. The UE of claim 1, wherein, to monitor the first carrier, the one or more processors are individually or collectively operable to execute the code to cause the UE to:
monitor the first carrier for the first control information communication based at least in part on the second timer associated with the second discontinuous reception group irrespective of whether the first timer associated with the first discontinuous reception group indicates the first discontinuous reception group is inside or outside of a discontinuous reception active time, wherein the first carrier is monitored for the first control information communication during a period associated with an extended active time of the second discontinuous reception group; and
monitor the first carrier for scheduling information for the first carrier or one or more other carriers of the first discontinuous reception group based on the first timer irrespective of whether the second carrier is inside or outside of the active time associated with the second discontinuous reception group, wherein the first carrier is monitored for the scheduling information during the period associated with the extended active time of the second discontinuous reception group.

14. The UE of claim 1, wherein, to monitor the first carrier, the one or more processors are individually or collectively operable to execute the code to cause the UE to:
monitor the first carrier for scheduling information for the first carrier or the second carrier during periods in which the first discontinuous reception group and the second discontinuous reception group are both in an active time;
determine that at least one or the first discontinuous reception group or the second discontinuous reception group is inactive; and
discontinue monitoring the first carrier for scheduling information for the second carrier responsive to the determination.

15. A user equipment (UE) for wireless communication, comprising:
one or more memories storing processor-executable code; and
one or more processors coupled with the one or more memories and individually or collectively operable to execute the code to cause the UE to:
receive configuration information for at least a first carrier associated with a first discontinuous reception group, a second carrier associated with a second discontinuous reception group; and
monitor, responsive to the first discontinuous reception group and the second discontinuous reception group having different timers for associated active times at each respective discontinuous reception group, the first carrier for a first control information communication and the second carrier for a second control information communication, wherein the first control information communication indicates a resource allocation only for communications via one or more carriers in the first discontinuous reception group, and the second control information communication indicates a resource allocation only for communications via one or more carriers in the second discontinuous reception group.

16. The UE of claim 15, wherein each of two or more carriers in each of the first discontinuous reception group and the second discontinuous reception group are within a same frequency band, have a same subcarrier spacing, or any combinations thereof.

17. The UE of claim 15, wherein a first carrier of the first discontinuous reception group and a second carrier of the first discontinuous reception group are in different frequency bands, have different subcarrier spacings, or any combination thereof.

18. A method for wireless communication by a user equipment (UE), comprising:
receiving configuration information for at least a first carrier associated with a first discontinuous reception group and a second carrier associated with a second discontinuous reception group, the configuration information including at least a first timer associated with the first discontinuous reception group and a second timer associated with the second discontinuous reception group, wherein scheduling information associated with the second carrier is provided via the first carrier;
monitoring the first carrier for a first control information communication that indicates a resource allocation for communications via the second carrier, the monitoring based at least in part on the first timer, the second timer, or both the first timer and the second timer; and
communicating via the second carrier based at least in part on a resource allocation provided with the first control information communication received via the first carrier.

19. The method of claim 18, further comprising:
detecting a second control information communication on at least one carrier of one or more carriers in the second discontinuous reception group; and
updating the second timer based at least in part on the second control information communication, wherein the first timer is updated based on the first control information communication irrespective of the second control information communication, and the second timer is updated based on the second control information communication irrespective of the first control information communication.

20. The method of claim 19, wherein the first timer and the second timer include one or more of a discontinuous reception inactivity timer, a downlink acknowledgment feedback timer, an uplink acknowledgment feedback timer, or any combinations thereof, associated with the first discontinuous reception group or the second discontinuous reception group, that are started or restarted responsive to a control channel transmission on a serving cell of the associated first discontinuous reception group or second discontinuous reception group.

21. The method of claim 18, further comprising:
detecting the first control information communication on the first carrier; and
updating the second timer based at least in part on the first control information communication.

22. The method of claim 21, wherein the second timer includes one or more of a discontinuous reception inactivity timer, a downlink acknowledgment feedback timer, an uplink acknowledgment feedback timer, or any combinations thereof, associated with the second discontinuous reception group, that are started or restarted responsive to the first control information communication or a control information communication received via a carrier in the second discontinuous reception group.

23. The method of claim 18, further comprising:
monitoring the first carrier for the first control information communication based at least in part on the second timer associated with the second discontinuous reception group, and wherein the first carrier is not monitored for control information associated with the second carrier outside of an active time associated with the second discontinuous reception group.

24. The method of claim 23, further comprising:
monitoring the first carrier for scheduling information for the first carrier or one or more other carriers of the first discontinuous reception group based on the first timer irrespective of whether the second carrier is inside or outside of the active time associated with the second discontinuous reception group.

25. The method of claim 18, further comprising:
monitoring the first carrier for the first control information communication based at least in part on both the first timer associated with the first discontinuous reception group and the second timer associated with the second discontinuous reception group, and wherein the first carrier is monitored for control information associated with the second carrier outside of an active time associated with the second discontinuous reception group when the first discontinuous reception group is active.

26. The method of claim 25, wherein the first control information communication is received outside of the active time associated with the second discontinuous reception group and wherein the second timer is restarted to reinitiate the active time associated with the second discontinuous reception group.

27. The method of claim 18, further comprising:
monitoring the first carrier for the first control information communication based at least in part on the first timer associated with the first discontinuous reception group irrespective of whether the second timer associated with the second discontinuous reception group indicates the second discontinuous reception group is inside or outside of a discontinuous reception active time.

28. A method for wireless communication by a user equipment (UE), comprising:
receiving configuration information for at least a first carrier associated with a first discontinuous reception group, a second carrier associated with a second discontinuous reception group; and
monitoring, responsive to the first discontinuous reception group and the second discontinuous reception group having different timers for associated active times at each respective discontinuous reception group, the first carrier for a first control information communication and the second carrier for a second control information communication, wherein the first control information communication indicates a resource allocation only for communications via one or more carriers in the first discontinuous reception group, and the second control information communication indicates a resource allocation only for communications via one or more carriers in the second discontinuous reception group.

29. The method of claim 28, wherein each of two or more carriers in each of the first discontinuous reception group and the second discontinuous reception group are within a same frequency band, have a same subcarrier spacing, or any combinations thereof.

30. The method of claim 28, wherein a first carrier of the first discontinuous reception group and a second carrier of the first discontinuous reception group are in different frequency bands, have different subcarrier spacings, or any combination thereof.

* * * * *